US012569804B2

(12) United States Patent
Sniady et al.

(10) Patent No.: US 12,569,804 B2
(45) Date of Patent: *Mar. 10, 2026

(54) METHODS AND SYSTEMS FOR RECOVERING TERPENE COMPOSITIONS FROM WOOD DRYING EXHAUST

(71) Applicant: BAKELITE CHEMICALS LLC, Atlanta, GA (US)

(72) Inventors: Adam Krzysztof Sniady, Lilburn, GA (US); Kim Kristine Tutin, East Point, GA (US); Stephen Douglas Prout, Murfreesboro, NC (US); Harold R Cowles, Scottsdale, AZ (US); Jim P Arduino, Smyrna, GA (US); Lawrence P Otwell, Fayetteville, GA (US)

(73) Assignee: BAKELITE CHEMICALS LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/500,265

(22) Filed: Nov. 2, 2023

(65) Prior Publication Data

US 2024/0149216 A1 May 9, 2024

Related U.S. Application Data

(63) Continuation of application No. 16/965,538, filed as application No. PCT/US2019/015729 on Jan. 29, 2019, now Pat. No. 11,806,666.

(Continued)

(51) Int. Cl.
 B01D 53/02 (2006.01)
 B01D 53/047 (2006.01)

(Continued)

(52) U.S. Cl.
 CPC ........... B01D 53/72 (2013.01); B01D 53/047 (2013.01); B01D 53/08 (2013.01); B01D 53/81 (2013.01);

(Continued)

(58) Field of Classification Search
 CPC ........ B01D 2253/102; B01D 2257/504; B01D 2257/702; B01D 2257/708;

(Continued)

(56) References Cited

U.S. PATENT DOCUMENTS

| 4,964,885 A | 10/1990 | Wieser-linhart |
| 8,999,202 B2 | 4/2015 | Mulik et al. |

(Continued)

FOREIGN PATENT DOCUMENTS

CN 106182281 A 12/2016

OTHER PUBLICATIONS

Declaration of Harold R. Cowles, U.S. Appl. No. 16/965,538, dated Oct. 25, 2022.

(Continued)

*Primary Examiner* — Christopher P Jones
(74) *Attorney, Agent, or Firm* — Edmonds & Cmaidalka, P.C.

(57) ABSTRACT

Methods and systems for recovering terpenes and controlling the composition of terpenes collected from wood drying processes are provided. In particular, a sorbent having adsorbed materials, including terpenes, from a wood drying process can be desorbed in a desorber, resulting in a gaseous stream containing terpenes, which can be condensed and collected from the gaseous stream. The conditions of desorption can be controlled to ensure a desirable amount of alpha-pinene and beta-pinene relative to other terpenes, such as dipentene and camphene, in the collected terpenes.

20 Claims, 42 Drawing Sheets

Related U.S. Application Data

(60) Provisional application No. 62/623,204, filed on Jan. 29, 2018, provisional application No. 62/623,192, filed on Jan. 29, 2018, provisional application No. 62/623,211, filed on Jan. 29, 2018.

(51) Int. Cl.

| | |
|---|---|
| *B01D 53/08* | (2006.01) |
| *B01D 53/72* | (2006.01) |
| *B01D 53/81* | (2006.01) |
| *B27K 5/00* | (2006.01) |

(52) U.S. Cl.
CPC ........ *B27K 5/009* (2013.01); *B01D 2253/102* (2013.01); *B01D 2257/504* (2013.01); *B01D 2257/702* (2013.01); *B01D 2257/708* (2013.01); *B01D 2257/80* (2013.01); *B01D 2259/40088* (2013.01); *B01D 2259/402* (2013.01); *B27K 2240/10* (2013.01)

(58) Field of Classification Search
CPC ...... B01D 2257/80; B01D 2259/40088; B01D 2259/402; B01D 53/047; B01D 53/08; B01D 53/72; B01D 53/81; B27K 2240/10; B27K 5/009; Y02A 50/20; Y02C 20/40
See application file for complete search history.

(56) References Cited

U.S. PATENT DOCUMENTS

| | | | |
|---|---|---|---|
| 9,133,295 | B2 | 9/2015 | Qureshi et al. |
| 9,133,337 | B2 | 9/2015 | Ludvik et al. |
| 9,464,162 | B2 | 10/2016 | Kron et al. |
| 9,598,525 | B2 | 3/2017 | Dong et al. |
| 9,714,172 | B2 | 7/2017 | Geramita et al. |
| 11,806,666 | B2 * | 11/2023 | Sniady ................... B27K 5/009 |
| 2002/0169068 | A1 | 11/2002 | Dai et al. |
| 2013/0209348 | A1 | 8/2013 | Ludvik et al. |
| 2015/0329364 | A1 | 11/2015 | Dong et al. |
| 2017/0233784 | A1 | 8/2017 | Moularat |
| 2021/0046420 | A1 | 2/2021 | Otwell et al. |

OTHER PUBLICATIONS

Declaration2 of Harold R. Cowles, U.S. Appl. No. 16/965,551, dated Oct. 25, 2022.

Bycer & Marion, Letter to Dean Shahriari, dated Nov. 3, 2022, re: U.S. Appl. No. 16/965,538 and U.S. Appl. No. 16/965,551, from the Attorney for Mr. Harold R. Cowles.

Exhibit A, Sales presentation offering for sale VOC abatement systems to Norbord, May 13, 2004, for a system and method for control and capture of terpenes as VOCs collected from a wood drying process.

Exhibit B, is an offer for sale of such systems for control and capture of terpenes from a wood drying process dated Aug. 30, 2004.

Exhibit C, Press Vent VOC Adsorption Unit, Summary sheet offered for sale to Georgia-Pacific circa 2002. Engaged in sales discussion with Georgia Pacific as well as industry consultants, suppliers, circa 2004 to provide design efforts, engineering support and components for collecting terpenes as VOCs from wood processing.

Exhibit D, Ford Oakville Plant, Excerpt from Ford fabrication drawings, Apr. 10, 2007, prepared for FORD installation using a set of views of various components for a system to employ a method to capture or control emissions and/or a composition of VOCs that may be removed or collected from a drying process.

Exhibit E, Mar. 25, 2013, Akzo Nobel, Proposal for Fluidized Bed Concentrator Abatement System Components for Application in Chanzhou, Jiangsu Province, People's Republic of China, pp. 1-10.

Exhibit E, Process Instrumentation Diagram (PID), Mar. 27, 2007, demonstrating the process flow schematic for a system and method of controlling emissions and/or a composition of VOCs that may be removed and/or collected from a drying process.

Exhibit F, Environmental C&B Inc., Side Stream Reactivator P&ID Model, Nov. 22, 1997. Design model for Intel Fab 12 in Chandler, Arizona, demonstrating the use of SSR treated mass carbon (BAC) to the actual working volume of BAC.

Exhibit F, Process Instrumentation Diagram Drawing, 100,000 CFM System PID, Mar. 27, 2007.

Exhibit G, Side Stream Reactivator P&ID Model, dated Nov. 22, 1997, for Intel Fab 12 in Chandler, Arizona demonstrating the use of SSR treated mass of carbon (BAC) to the actual working volume of BAC.

Exhibit G, Heat Exchanger, Flow Deflector, Ford Oakville Plant, dated Mar. 5, 2007.

Exhibit H, VOC abatement System for Denso, 2" Airlift Nozzle, dated Sep. 24, 2015, an excerpt from design schematics demonstrating an eductor diagram.

Exhibit H, Desorber Assembly Layout, Ford Oakville Plant, dated Mar. 21, 2007.

Exhibit I, Flow Defector, Ford Oakville Plant, excerpts from PID demonstrating cooling system dated Mar. 5, 2007.

Exhibit I, Kureha Corp. Japan, Kureha Brochure, Bead-shaped Activated Carbon (BAC), Rev. Jan. 2006 advertising bead-shaped activated carbon with sorbent beads used in adsorber/desorber VOC abatement.

Exhibit J, Master Training Document—Intel, pp. 1-20, circa 1998, described as Best Known Methodology for use of fluidized bed adsorbers and SSRs.

Exhibit J, Kureha Brochure, Bead-shaped Activated Carbon (BAC), Rev. Jan. 2006.

Exhibit K, VOC Abatement System, Intel FAB 12 Facility, Operation and Maintenance Manual, Apr. 1997, pp. 1-23. See p. 18, daily check list, item 1 refers to the inlet diffuser pressure. p. 20 discusses the "specific gravity" procedure, a.k.a. the adsorber/desorber procedure.

Exhibit K, Master Training Document—Intel, pp. 1-20, circa 1998, see p. 3, provides information about carbon apparent density (AD) or bulk density. p. 16, item 1 for inlet differential pressure.

Exhibit L, Intel FAB 12 Facility, Operation and Maintenance Manual, Chandler AZ, Apr. 1997, pp. 1-23. See p. 18, and p. 20.

Exhibit L, Gastak, Technical Improvement, 018, Oct. 1976, Taiyo Kaken Co., Ltd., GUT Project, pp. 1-50.

Exhibit M, Mar. 25, 2013, Akzo Nobel, Proposal for Fluidized Bed Concentrator Abatement System Components for Application in Chanzhou, Jiangsu Province, People's Republic of China, pp. 1-10.

Exhibit M, Gastak, Technical Improvement, 018, Oct. 1976, Taiyo Kaken Co., Ltd., GUT Project, pp. 1-50.

International Search Report and Written Opinion for PCT application No. PCT/US2019/015729 mailed on Apr. 25, 2019.

International Preliminary Report on Patentability for PCT application No. PCT/US2019/015729 mailed Feb. 4, 2020,19 pages.

* cited by examiner

CONFIRM SIDE STREAM REACTION ON EMISSIONS CONTROL

METHODS AND SYSTEMS FOR RECOVERING TERPENE COMPOSITIONS FROM WOOD DRYING EXHAUST

CROSS-REFERENCE TO RELATED APPLICATIONS

This application is a Continuation Application of U.S. Ser. No. 16/965,538, filed Jul. 28, 2020, which is a national phase application based on PCT/US2019/015729, filed Jan. 29, 2019, which claims priority to U.S. Provisional Application No. 62/623,192, filed Jan. 29, 2019; and U.S. Provisional Application No. 62/623,204, filed Jan. 29, 2019; and U.S. Provisional Application No. 62/623,211, filed Jan. 29, 2018, all of which are incorporated by reference herein, in their entireties.

1. FIELD OF THE INVENTION

Methods and systems for recovering and controlling the compositions of terpenes extracted from exhaust streams are provided. The present disclosure provides various treatments that can be applied to process exhaust streams from wood dryers to obtain an exhaust stream suitable for downstream recovery of terpenes from the exhaust stream. Additionally, the disclosed methods and systems use a fluidized bed containing a sorbent to reduce and/or remove volatile components from wood drying processes.

2. BACKGROUND OF THE INVENTION

Turpentine is an important raw material in many industries and can be obtained from trees, usually pine trees, or citrus crops, for example by distilling a resin or extracting the turpentine during the digestion of wood products. Turpentine can be used as fuel or as a solvent in many end products, including paints and varnishes. Additionally, turpentine, and constituent components thereof, can be used as a precursor in organic synthesis to create valuable organic compounds. These compounds are frequently used as flavors and fragrances in a variety of consumer products.

Turpentine contains a mixture of different terpenes, primarily monoterpenes. Turpentine is particularly valuable for organic synthesis applications because it contains predominantly higher value terpenes, such as alpha-pinene and beta-pinene. Turpentine also contains lower value terpenes, such as dipentene and camphene, but to a lesser degree. Because of the valuable uses for turpentine, it is desirable to create terpene compositions derived from other sources that similarly have high amounts of alpha-pinene and beta-pinene.

Because terpenes are found in wood products, emissions from wood drying operations generate exhaust containing such terpenes, which are regulated under emissions standards as volatile organic compounds (VOCs). Wood drying exhaust also contains a number of other regulated pollutants, including other hazardous air pollutants (HAPs), carbon monoxide (CO) emissions, carbon dioxide ($CO_2$) emissions, $NO_x$ emissions, and particulate matter. Per regulations applicable to new "major" sources of air pollutants or "major modifications" at existing major sources, such pollutants must be controlled using the Best Available Control Technology (BACT). Current industry standards require exhaust from wood drying processes to meet applicable emissions standards and/or to be treated with a control device to reduce emissions. The control device most commonly used to reduce HAPs and VOCs from wood drying processes is a Regenerative Thermal Oxidizer (RTO), which combusts volatile components from the exhaust stream prior to emission into the atmosphere. Combustion in RTOs is energy intensive, consuming large amounts of fuel and electricity. Combustion also results in large amounts of $NO_x$ emissions and greenhouse gases, such as $CO_2$. Moreover, RTOs destroy any VOCs that could otherwise be recovered from the wood drying exhaust. It would be advantageous if these VOCs, and specifically terpenes, could instead be recovered from the wood drying process exhaust.

Thus, there remains a need in the art for methods and systems for recovering terpenes having a desirable composition from wood drying operations. The disclosed subject matter addresses these and other needs.

3. SUMMARY

The presently disclosed subject matter provides techniques for recovering and controlling the composition of terpenes, and in particular, terpenes collected from exhaust streams from wood drying processes. A sorbent having adsorbed materials, including terpenes, from a wood drying process can be desorbed in a desorber, resulting in a gaseous stream containing terpenes. The conditions of desorption can be controlled to ensure a desirable amount of alpha-pinene and beta-pinene relative to other terpenes, such as dipentene and camphene, in the collected terpenes.

Thus, in certain aspects, the present disclosure provides methods of controlling the composition of terpenes collected from a wood drying process that include providing a sorbent having adsorbed materials from the wood drying process at a first temperature, heating the sorbent to a second temperature to release the adsorbed materials into a gaseous stream comprising terpenes, and collecting a terpene stream from the gaseous stream, wherein the terpene stream comprises alpha-pinene and/or beta-pinene.

In certain embodiments, the terpene stream can include from about 0 wt-% to about 100 wt-% alpha-pinene and from about 0 wt-% to about 50 wt-% beta-pinene. In certain embodiments, the terpene stream can include from about 1 wt-% to about 20 wt-% alpha-pinene and from about 0 wt-% to about 20 wt-% beta-pinene.

In certain embodiments, the method can include maintaining the sorbent at the second temperature for less than about 2 hours. For example, the sorbent can be maintained at the second temperature for from about 30 minutes to about 1.5 hours.

In certain embodiments, the second temperature can be less than about 450° F. or less than about 430° F. Alternatively, the second temperature can range from about 390° F. to about 420° F.

Under such conditions, a terpene stream having enhanced alpha-pinene and/or beta-pinene content can be recovered. For example, as embodied herein, the terpene stream can include from about 50 wt-% to about 97 wt-% of alpha-pinene and beta-pinene combined. The terpene stream can contain alpha-pinene in amount of from about 20 wt-% to about 97 wt-%. Additionally or alternatively, the terpene stream can include beta-pinene in an amount of from about 5 wt-% to about 60 wt-%. In certain embodiments, the terpene stream comprises from about 0 wt-% to about 20 wt-% of dipentene and/or from about 0 wt-% to about 15 wt-% of camphene.

The presently disclosed terpene streams can be sulfur-free. In certain embodiments, the gaseous stream of the present disclosure can further comprise nitrogen and/or steam. For example and not limitation, the gaseous stream can comprise at least 95 wt-% nitrogen. Additionally or alternatively, in addition to terpenes, the gaseous stream can include a hazardous air pollutant selected from the group consisting of formaldehyde, methanol, phenol, acrolein, acetaldehyde, propionaldehyde, fatty acids, acetic acid, and combinations thereof. In certain embodiments, the sorbent can comprise activated carbon. Additionally, the desorber can be heated to the second temperature within a desorber including one or more packed moving beds. Additionally or alternatively, in certain embodiments, the desorber can include one or more access panels, e.g., to provide access to the interior of the desorber during cleaning and/or maintenance operations. As embodied herein, collecting the terpene stream from the gaseous stream can include condensing the terpene stream through a cooling system optionally comprising a condenser.

As embodied herein, methods of controlling the composition of terpenes collected from a wood drying process can include providing a sorbent having adsorbed materials from the wood drying process at a first temperature, heating the sorbent to a second temperature to release the adsorbed materials into a gaseous stream comprising terpenes, and collecting a terpene stream from the gaseous stream, wherein the terpene stream comprises alpha-pinene and/or beta-pinene. The sorbent can be heated to the second temperature within a desorber comprising one or more packed moving beds.

In other aspects, the present disclosure provides systems for controlling the composition of terpenes collected from a wood drying process. Such systems can include a sorbent at a first temperature having adsorbed materials from the wood drying process, a desorber at a second temperature for receiving the sorbent and desorbing the adsorbed materials to form a gaseous stream comprising terpenes, and a cooling system, coupled to the desorber, wherein the cooling system is configured to condense a terpene stream from the gaseous stream, wherein the terpene stream comprises alpha-pinene and/or beta-pinene.

In certain embodiments, the sorbent can comprise activated carbon. Additionally, the desorber can include one or more packed moving beds. In certain embodiments, the second temperature can be less than about 572° F. Alternatively, the second temperature can range from about 302° F. to about 572° F. As embodied herein, the cooling system can include a condenser. In certain embodiments, the system can further include a fire suppression system. Additionally or alternatively, in certain embodiments, the desorber can include one or more access panels, e.g., to provide access to the interior of the desorber during cleaning and/or maintenance operations.

In certain embodiments, the sorbent can be maintained in the system at the second temperature for less than about 2 hours. For example, the sorbent can be maintained at the second temperature for from about 30 minutes to about 1.5 hours. The presently disclosed terpene streams in systems of the present disclosure can be sulfur-free. In certain embodiments, the gaseous stream of the present disclosure can further comprise nitrogen and/or steam. For example and not limitation, the gaseous stream can comprise at least 95 wt-% nitrogen. Additionally or alternatively, in addition to terpenes, the gaseous stream can include a hazardous air pollutant selected from the group consisting of formaldehyde, methanol, phenol, acrolein, acetaldehyde, propionaldehyde, fatty acids, acetic acid, and combinations thereof.

As embodied herein, systems for controlling the composition of terpenes collected from a wood drying process. Such systems can include a sorbent at a first temperature having adsorbed materials from the wood drying process, a desorber at a second temperature for receiving the sorbent and desorbing the adsorbed materials to form a gaseous stream comprising terpenes, and a cooling system, coupled to the desorber, wherein the cooling system is configured to condense a terpene stream from the gaseous stream, wherein the terpene stream comprises alpha-pinene and/or beta-pinene. The desorber can include one or more packed moving beds.

Additional aspects of the present disclosure provide the following embodiments.

Embodiment I: A method of controlling a composition of terpenes collected from a wood drying process, comprising: providing a sorbent having adsorbed materials from the wood drying process at a first temperature; heating the sorbent to a second temperature to release the adsorbed materials into a gaseous stream comprising terpenes; and collecting a terpene stream from the gaseous stream, wherein the terpene stream comprises alpha-pinene and/or beta-pinene.

Embodiment II: The method of Embodiment I, wherein the second temperature is less than about 450° F.

Embodiment III: The method of any of Embodiments I or II, wherein the terpene stream comprises from about 0 wt-% to about 100 wt-% alpha-pinene and from about 0 wt-% to about 50 wt-% beta-pinene.

Embodiment IV: The method of any of Embodiments I through III, wherein the terpene stream comprises from about 1 wt-% to about 20 wt-% alpha-pinene and from about 0 wt-% to about 20 wt-% beta-pinene.

Embodiment V: The method of any of Embodiments I through IV, further comprising maintaining the sorbent at the second temperature for less than about 2 hours.

Embodiment VI: The method of any of Embodiments I through V, wherein the sorbent is maintained at the second temperature for from about 30 minutes to about 1.5 hours.

Embodiment VII: The method of any of Embodiments I through VI, wherein the second temperature is less than about 430° F.

Embodiment VIII: The method of any of Embodiments I through VII, wherein the second temperature is from about 390° F. to about 420° F.

Embodiment IX: The method of any of Embodiments I through VIII, wherein the terpene stream comprises from about 50 wt-% to about 97 wt-% of alpha-pinene and beta-pinene combined.

Embodiment X: The method of any of Embodiments I through IX, wherein the terpene stream comprises alpha-pinene in an amount of from about 20 wt-% to about 97 wt-%.

Embodiment XI: The method of any of Embodiments I through X, wherein the terpene stream comprises beta-pinene in an amount of from about 5 wt-% to about 60 wt-%.

Embodiment XII: The method of any of Embodiments I through XI, wherein the terpene stream comprises from about 0 wt-% to about 20 wt-% of dipentene.

Embodiment XIII: The method of any of Embodiments I through XII, wherein the terpene stream comprises from about 0 wt-% to about 15 wt-% of camphene.

Embodiment XIV: The method of any of Embodiments I through XIII, wherein the terpene stream is free of sulfur.

Embodiment XV: The method of any of Embodiments I through XIV, wherein the gaseous stream further comprises nitrogen and/or steam.

Embodiment XVI: The method of any of Embodiments I through XV, wherein the gaseous stream comprises at least 95 wt-% nitrogen.

Embodiment XVII: The method of any of Embodiments I through XVI, wherein the gaseous stream further comprises a hazardous air pollutant selected from the group consisting of formaldehyde, methanol, phenol, acrolein, acetaldehyde, propionaldehyde, fatty acids, acetic acid, and combinations thereof.

Embodiment XVIII: The method of any of Embodiments I through XVII, wherein the sorbent comprises activated carbon.

Embodiment XIX: The method of any of Embodiments I through XVIII, wherein the sorbent is heated to the second temperature within a desorber comprising one or more packed moving beds.

Embodiment XX: The method of any of Embodiments I through XIX, wherein the desorber includes one or more access panels.

Embodiment XXI: The method of any of Embodiments I through XX, wherein collecting the terpene stream from the gaseous stream comprises condensing the terpene stream through a cooling system.

Embodiment XXII: The method of any of Embodiments I through XXI, wherein the cooling system comprises a condenser.

Embodiment XXIII: A system for controlling a composition of terpenes collected from a wood drying process, comprising: a sorbent at a first temperature having adsorbed materials from the wood drying process; a desorber at a second temperature for receiving the sorbent and desorbing the adsorbed materials to form a gaseous stream comprising terpenes; and a cooling system, coupled to the desorber, wherein the cooling system is configured to condense a terpene stream from the gaseous stream, wherein the terpene stream comprises alpha-pinene and/or beta-pinene.

Embodiment XXIV: The system of Embodiment XXIII, wherein the sorbent comprises activated carbon.

Embodiment XXV: The system of any of Embodiments XXIII or XXIV, wherein the desorber comprises one or more packed moving beds.

Embodiment XXVI: The system of any of Embodiments XXIII through XXV, wherein the second temperature is less than about 572° F.

Embodiment XXVII: The system of any of Embodiments XXIII through XXVI, wherein the second temperature is from about 302° F. to about 572° F.

Embodiment XXVIII: The system of any of Embodiments XXIII through XXVII, wherein the cooling system comprises a condenser.

Embodiment XXIX: The system of any of Embodiments XXIII through XXVIII, further comprising a fire suppression system.

Embodiment XXX: The system of any of Embodiments XXIII through XXIX, wherein the desorber comprises one or more access panels.

Embodiment XXXI: The system of any of Embodiments XXIII through XXX, wherein the sorbent is maintained at the second temperature for less than about 2 hours.

Embodiment XXXII: The system of any of Embodiments XXIII through XXXI, wherein the sorbent is maintained at the second temperature for from about 30 minutes to about 1.5 hours.

Embodiment XXXIII: The system of any of Embodiments XXIII through XXXII, wherein the terpene stream is free of sulfur.

Embodiment XXXIV: The system of any of Embodiments XXIII through XXXIII, wherein the gaseous stream comprises at least 95 wt-% nitrogen.

Embodiment XXXV: The system of any of Embodiments XXIII through XXXIV, wherein the gaseous stream further comprises a hazardous air pollutant selected from the group consisting of formaldehyde, methanol, phenol, acrolein, acetaldehyde, propionaldehyde, fatty acids, acetic acid, and combinations thereof.

Embodiment XXXVI: A method of controlling a composition of terpenes collected from a wood drying process, comprising: providing a sorbent having adsorbed materials from the wood drying process at a first temperature; heating the sorbent to a second temperature to release the adsorbed materials into a gaseous stream comprising terpenes; and collecting a terpene stream from the gaseous stream, wherein the terpene stream comprises alpha-pinene and/or beta-pinene, wherein the sorbent is heated to the second temperature within a desorber comprising one or more packed moving beds.

Embodiment XXXVII: A system for controlling a composition of terpenes collected from a wood drying process, comprising: a sorbent at a first temperature having adsorbed materials from the wood drying process; a desorber at a second temperature for receiving the sorbent and desorbing the adsorbed materials to form a gaseous stream comprising terpenes; and a cooling system, coupled to the desorber, wherein the cooling system is configured to condense a terpene stream from the gaseous stream, wherein the terpene stream comprises alpha-pinene and/or beta-pinene, wherein the desorber comprises one or more packed moving beds.

The foregoing has outlined broadly the features and technical advantages of the present application in order that the detailed description that follows can be better understood. Additional features and advantages of the application will be described hereinafter which form the subject of the claims of the application. It should be appreciated by those skilled in the art that the conception and specific embodiment disclosed can be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of the application, both as to its organization and method of operation, together with further objects and advantages will be better understood from the following description.

4. BRIEF DESCRIPTION OF THE DRAWINGS

FIG. 1 provides an illustration of a non-limiting example of an overall process flow schematic in accordance with certain embodiments of the presently disclosed methods and systems.

FIG. 2 provides a schematic illustration of a non-limiting example of a desorber in accordance with certain embodiments of the presently disclosed methods and systems.

FIG. 3 provides a schematic illustration of a non-limiting example of a cooling system, including a condenser, in accordance with certain embodiments of the presently disclosed methods and systems.

FIG. 4 provides a schematic illustration of a non-limiting example of an adsorber in accordance with certain embodiments and Example 1 of the present disclosure.

FIGS. 5A and 5B provide images of sorbent beads used in Example 1 of the present disclosure at 50× magnification. FIG. 5A shows an image of new (i.e., virgin) beads whereas FIG. 5B shows an image of spent beads.

Figure 7A:
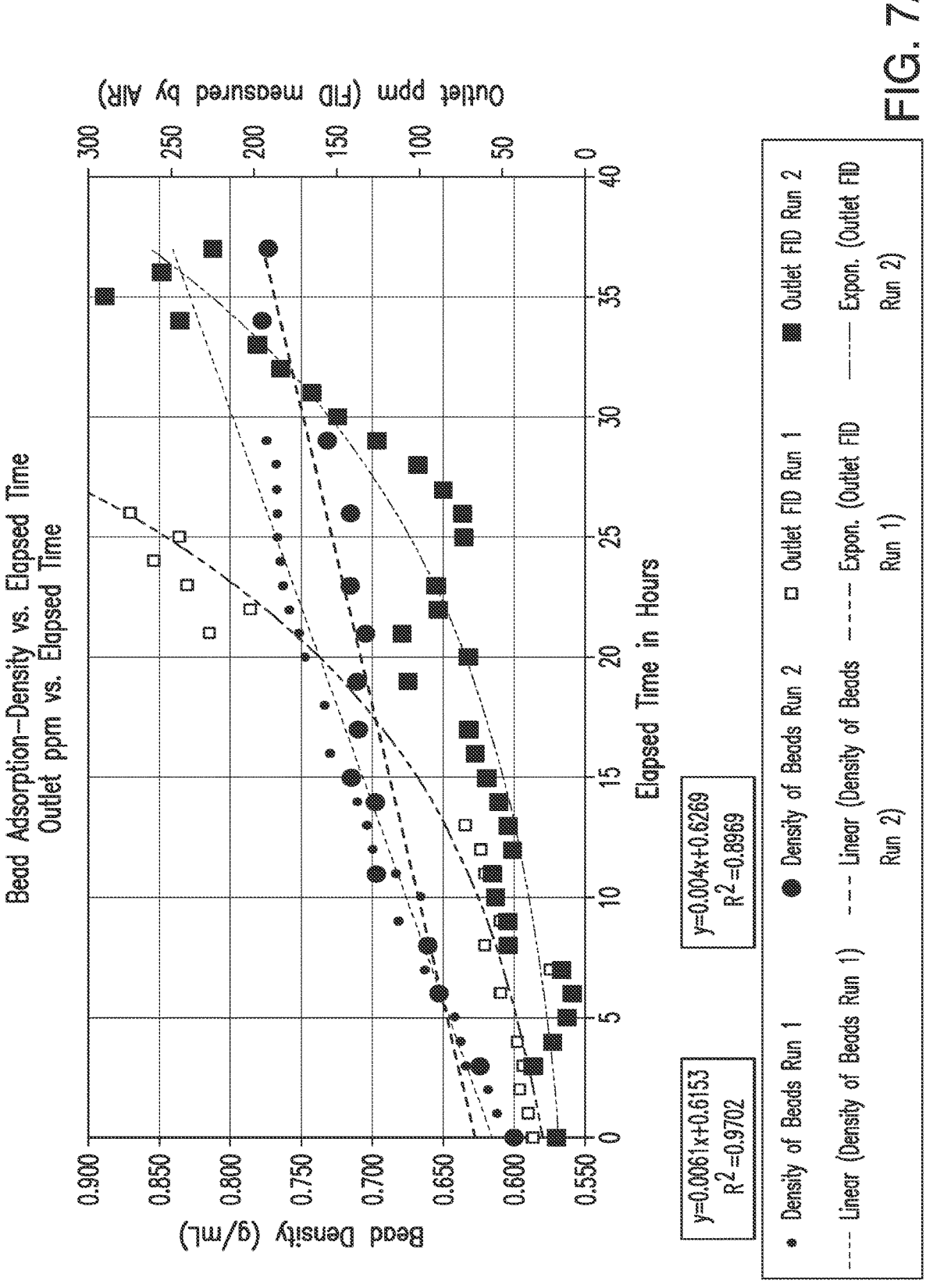
FIG. 7A shows sorbent bead density and hydrocarbon concentration at the outlet of a fluidized bed over time, as measured during the pilot trials of Example 2 of the present disclosure.
Figure 7B:
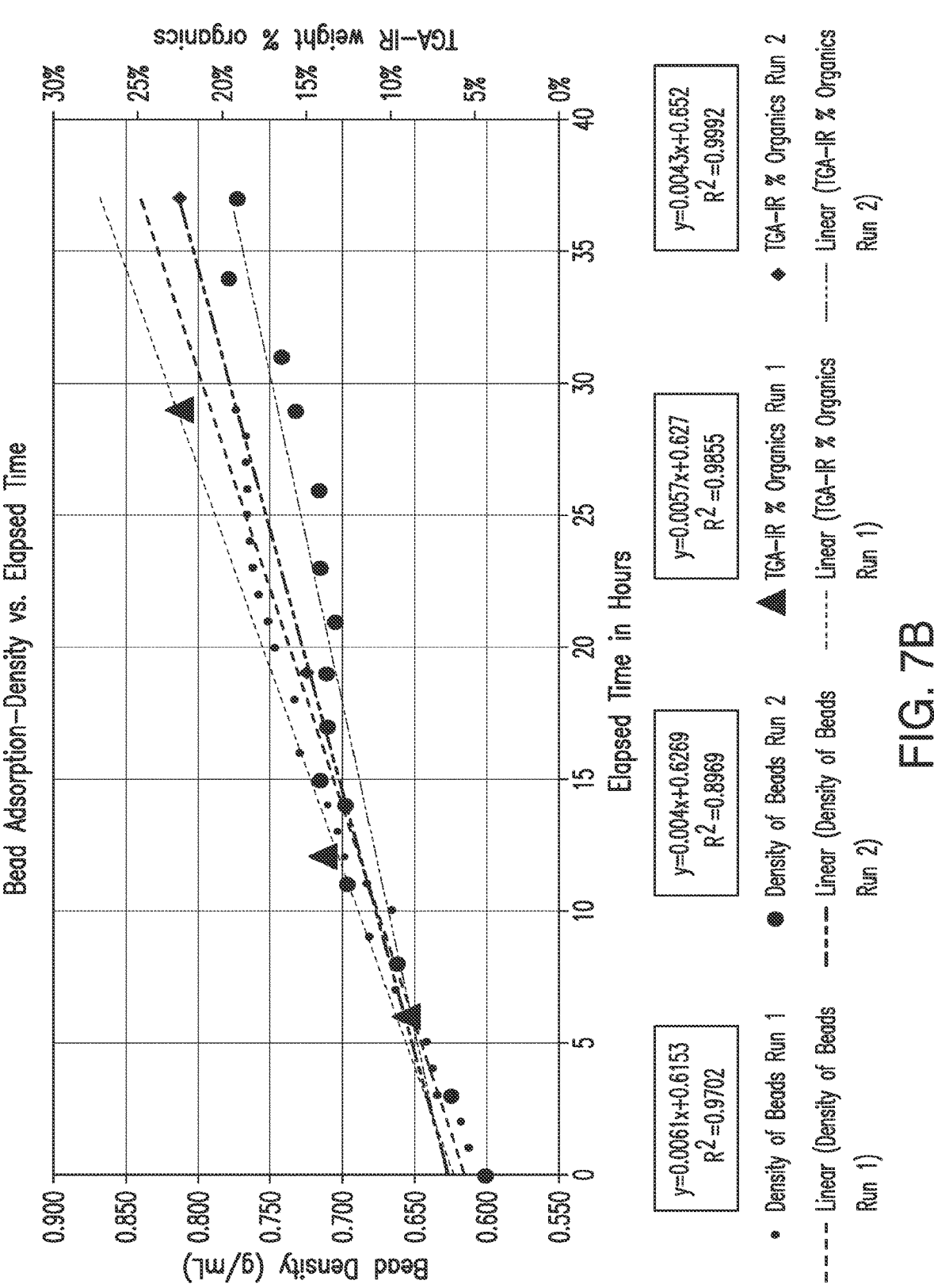
Figure 7B:
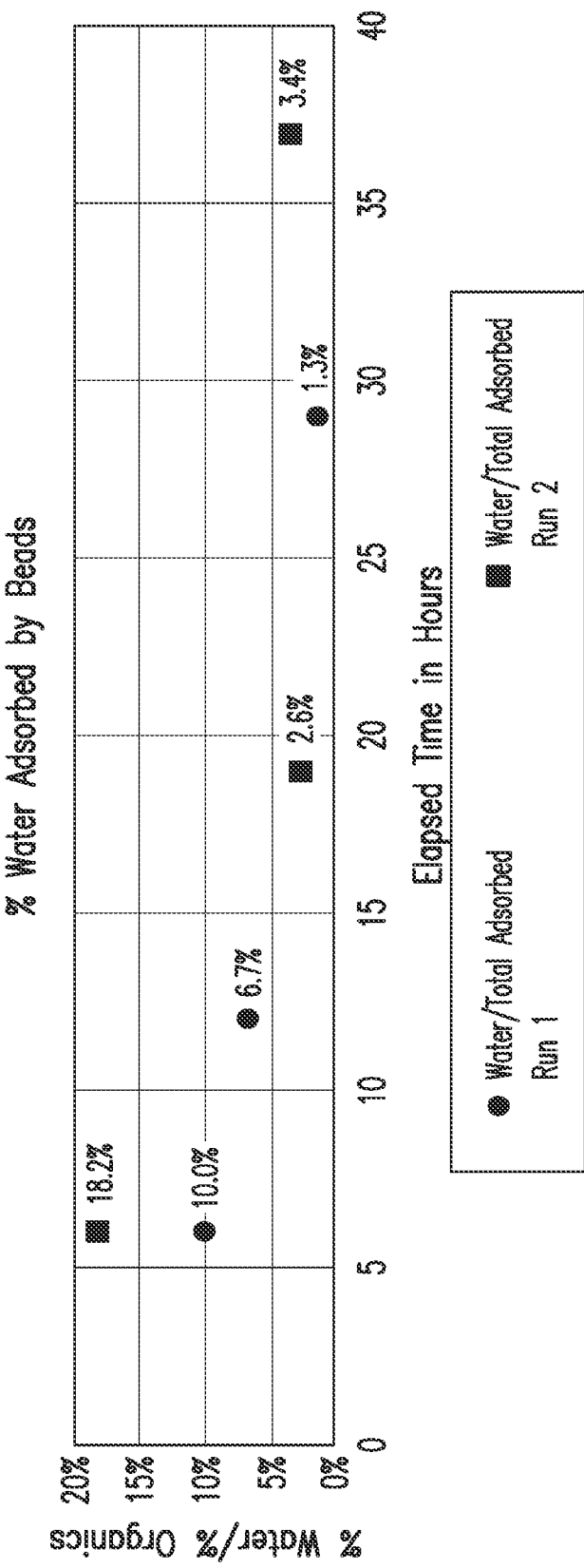

FIG. 7B shows the results of thermal gravimetric analysis on adsorbed sorbent, as described in Example 2 of the present disclosure. In the top panel of FIG. 7B, the percentage organics as measured by thermal gravimetric analysis is overlaid with bead density. The bottom panel FIG. 7B shows the percentage of water adsorbed by the beads over time as measured by thermal gravimetric analysis.

Figure 7C:
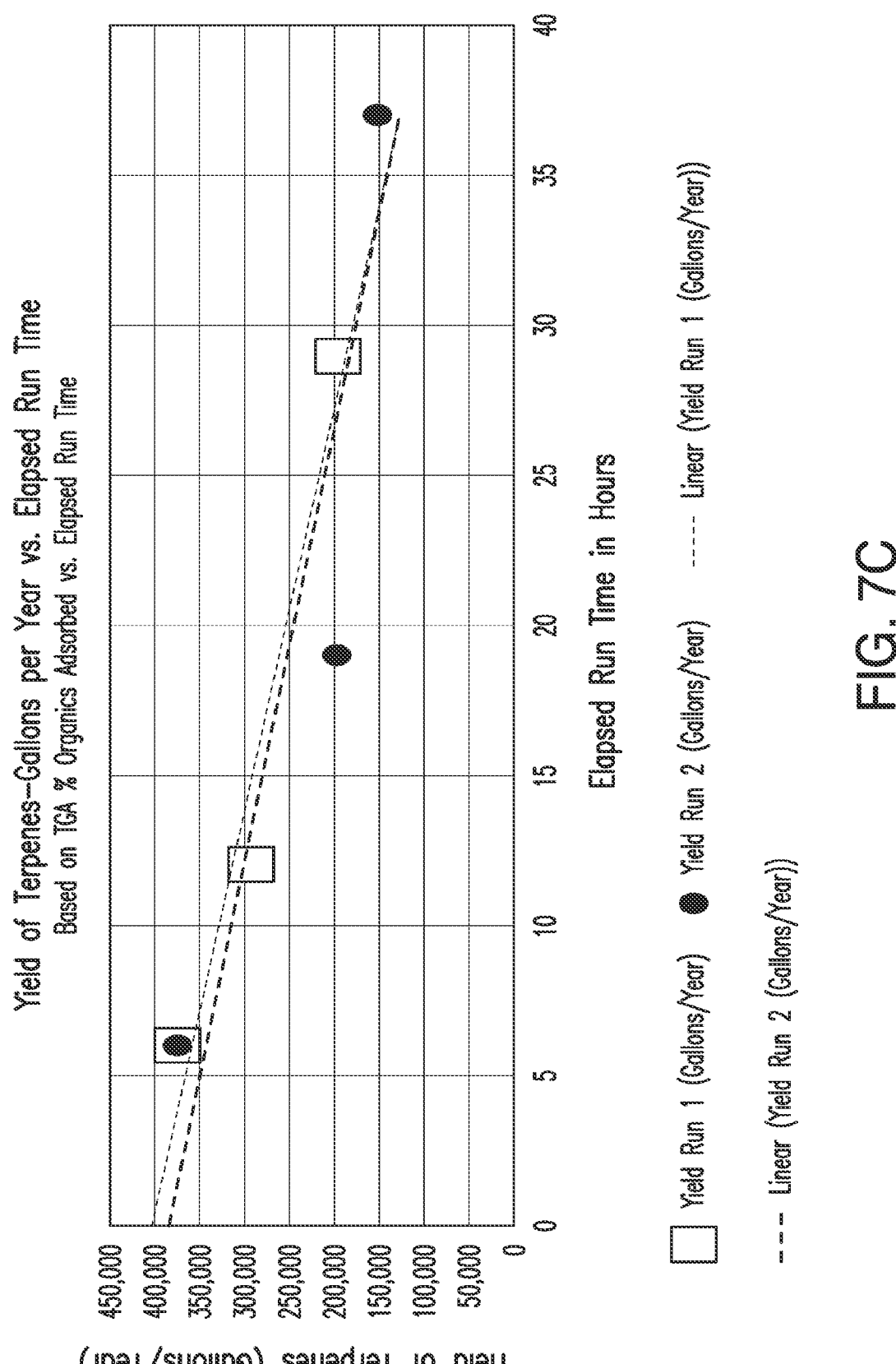

FIG. 7C provides the terpenes yield, extrapolated over a year as a function of run time, as calculated in Example 2 of the present disclosure.

Figure 7D:
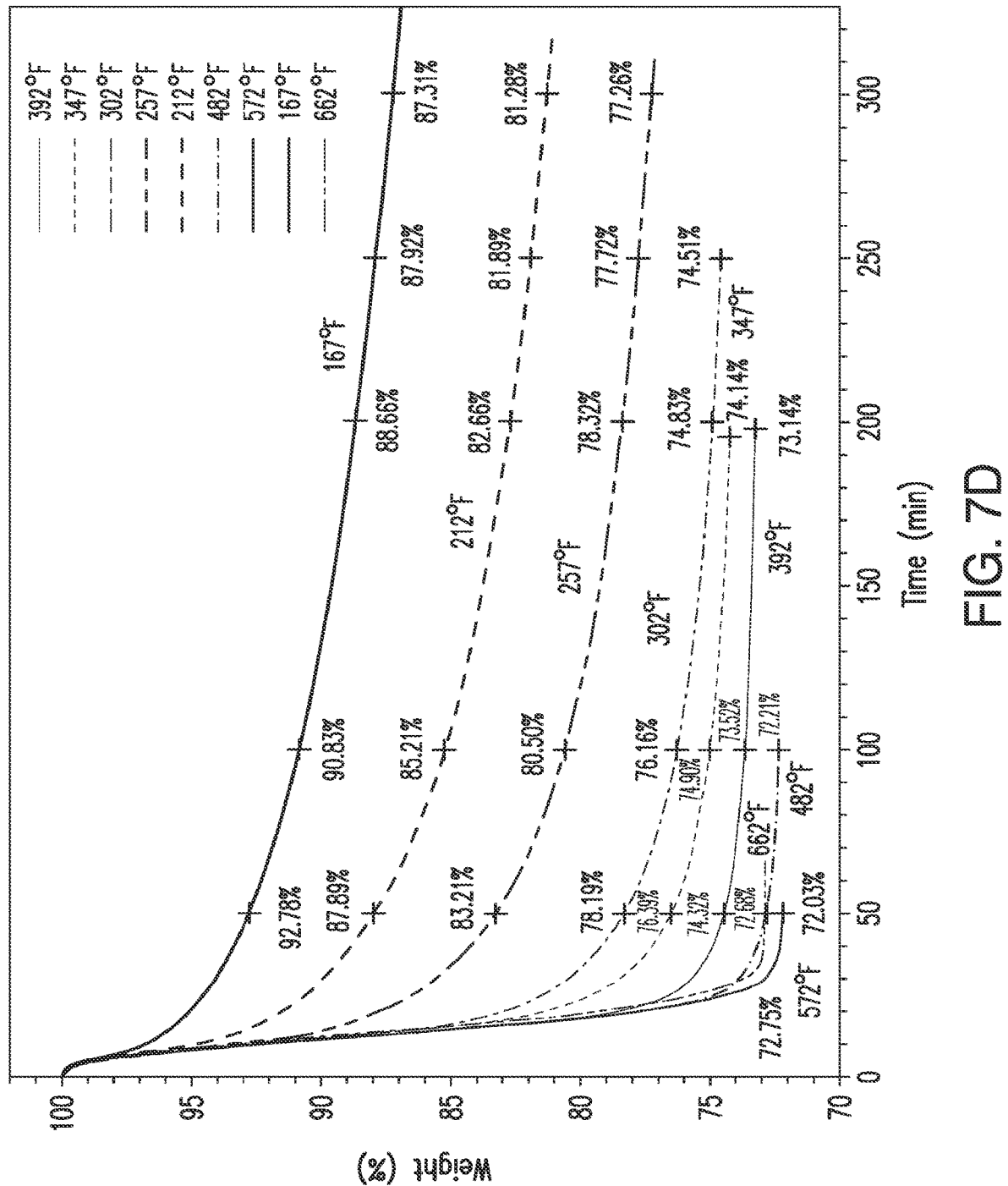

FIG. 7D shows the results of thermal gravimetric analysis, carried out isothermally, on adsorbed sorbent as described in Example 2 of the present disclosure.

Figure 7E:
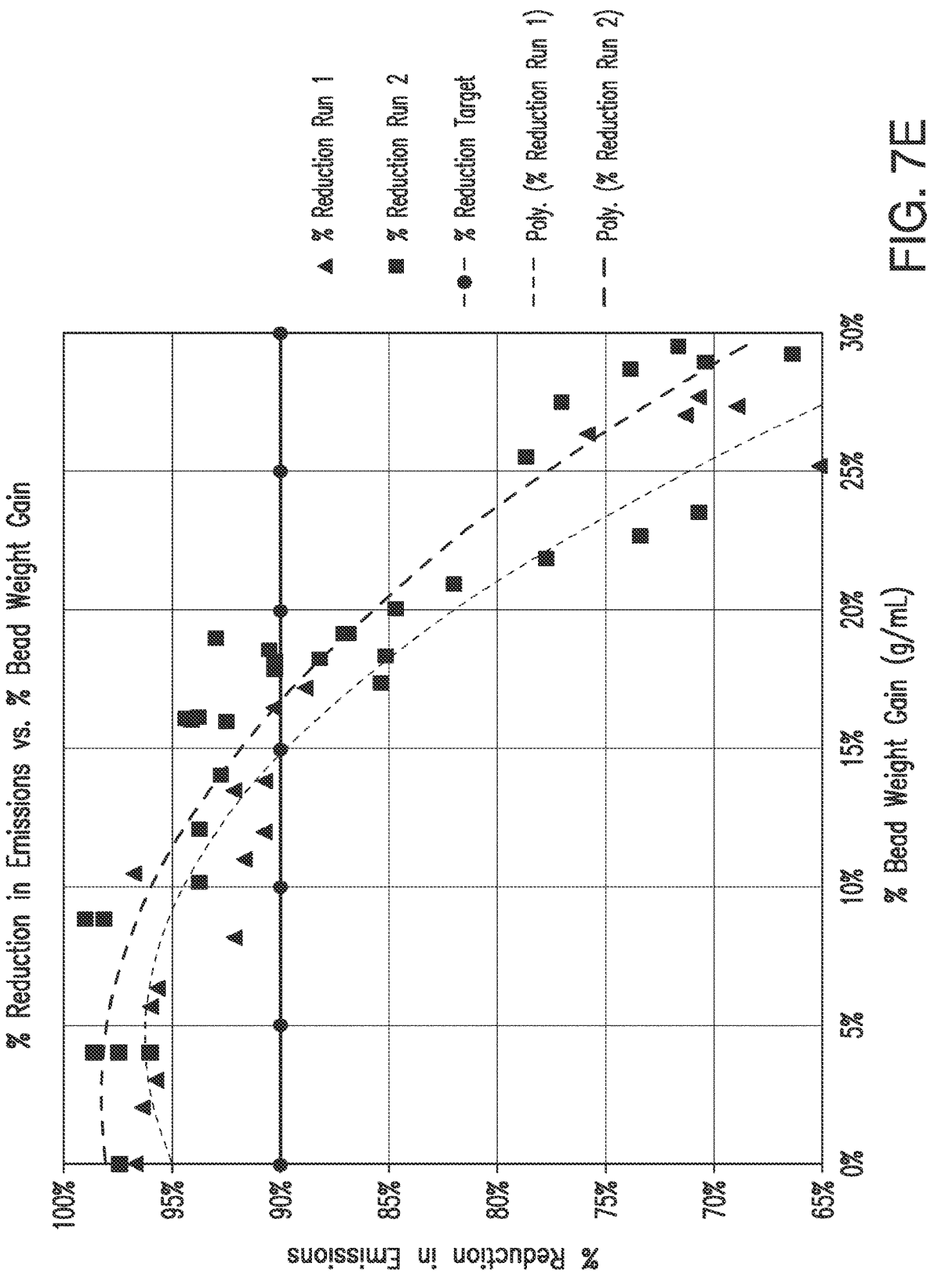

FIG. 7E compares the percentage reduction in volatile organic compounds (VOCs) (based on FID analysis) in a dryer exhaust stream after adsorption and the percentage weight gain of the sorbent used for adsorption, as described in Example 2 of the present disclosure.

Figure 7F:
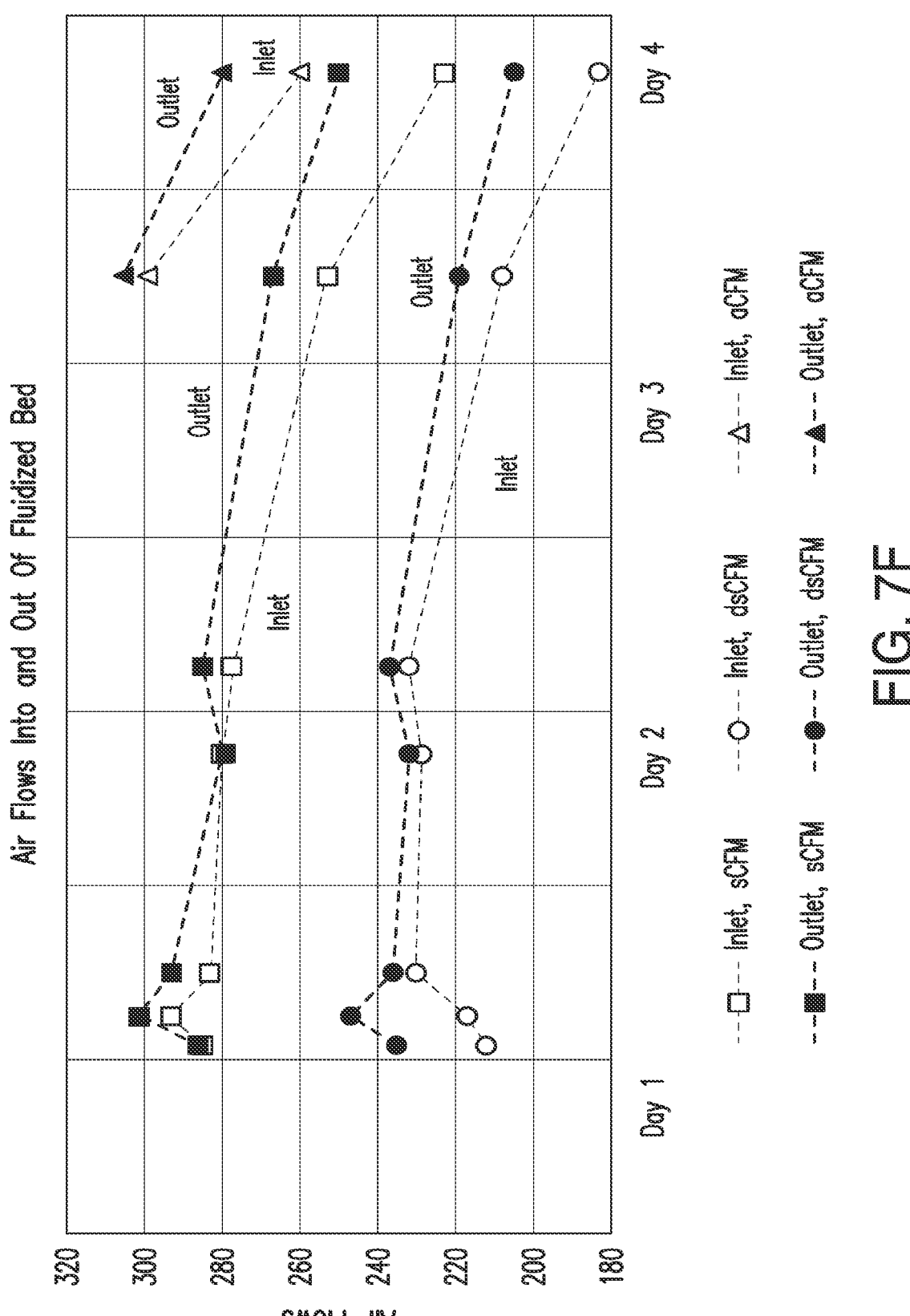

FIG. 7F shows the air flow at the inlet and outlet of the fluidized bed in terms of standard cubic feet per minute (scfm), dry standard cubic feet per minute (dscfm), and actual cubic feet per minute (acfm) in accordance with Example 2 of the present disclosure.

Figure 7G:
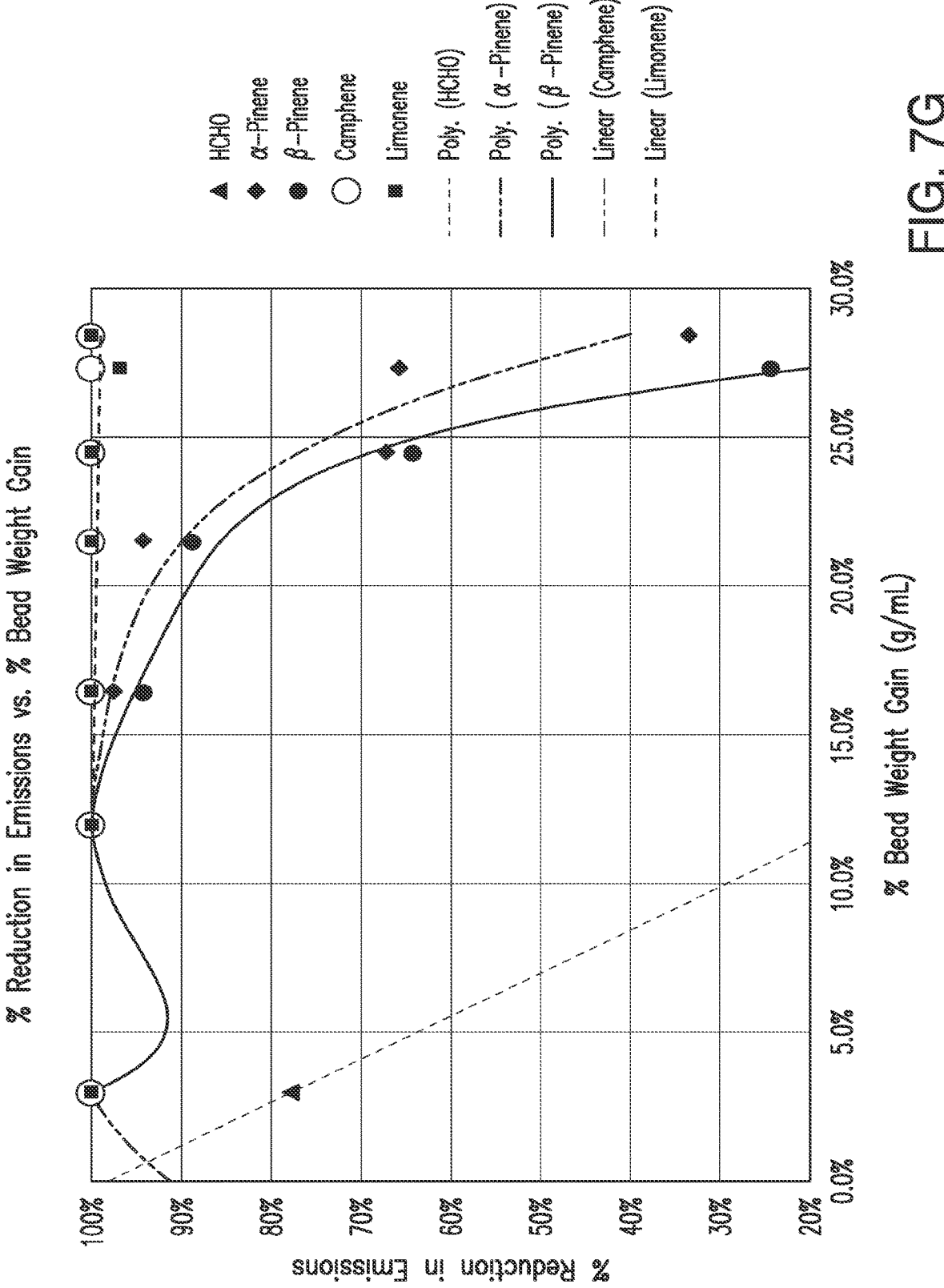

FIG. 7G compares the percentage reduction in VOCs (based on air samples from impingers) in a dryer exhaust stream after adsorption and the percentage weight gain of the sorbent used for adsorption, as described in Example 2 of the present disclosure.

Figure 7H:
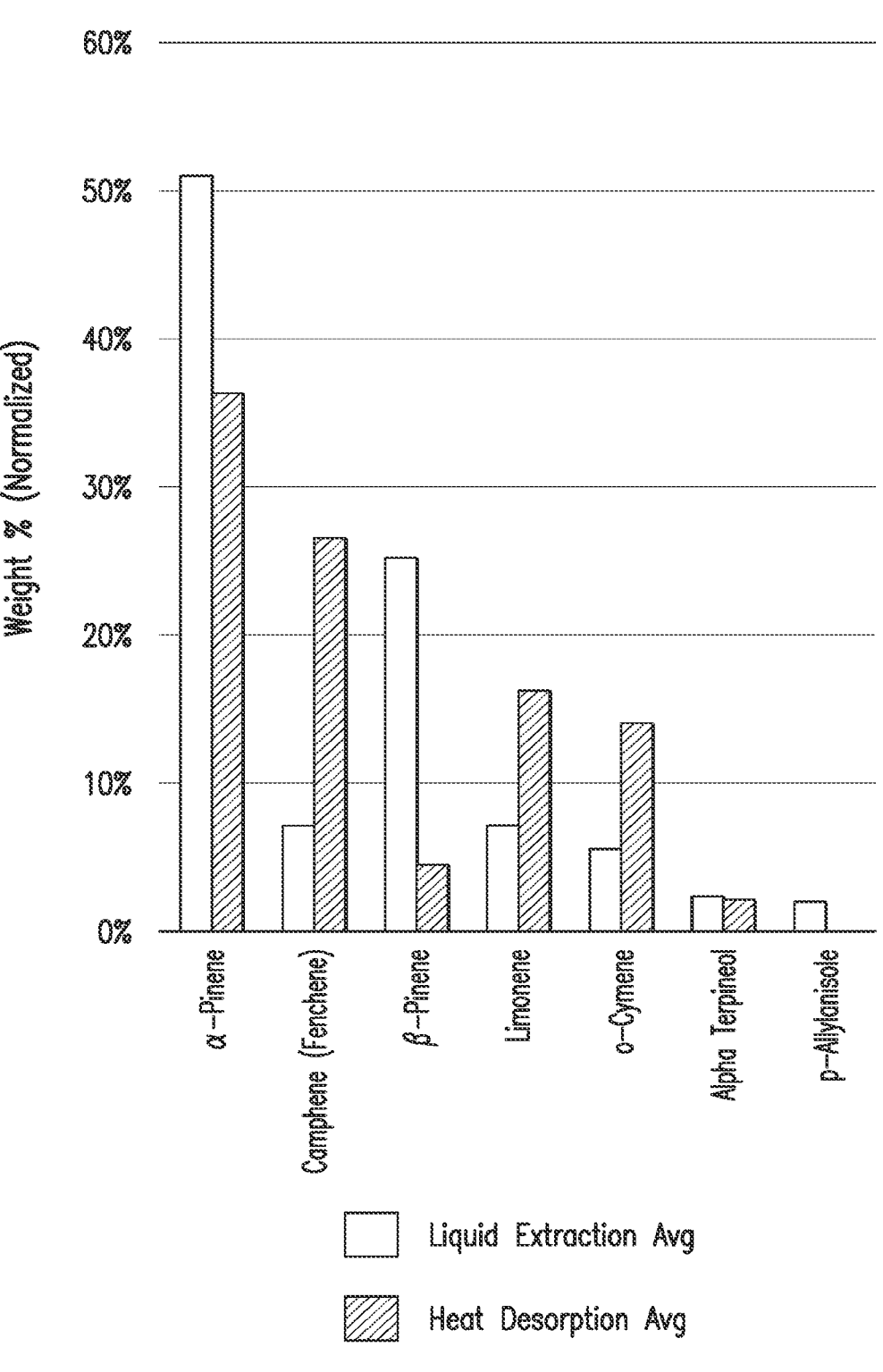

FIG. 7H compares the normalized terpene compositions in terpenes extracted from sorbent using thermal desorption as compared to liquid-liquid extraction at room temperature, as described in Example 2 of the present disclosure.

Figure 8A:
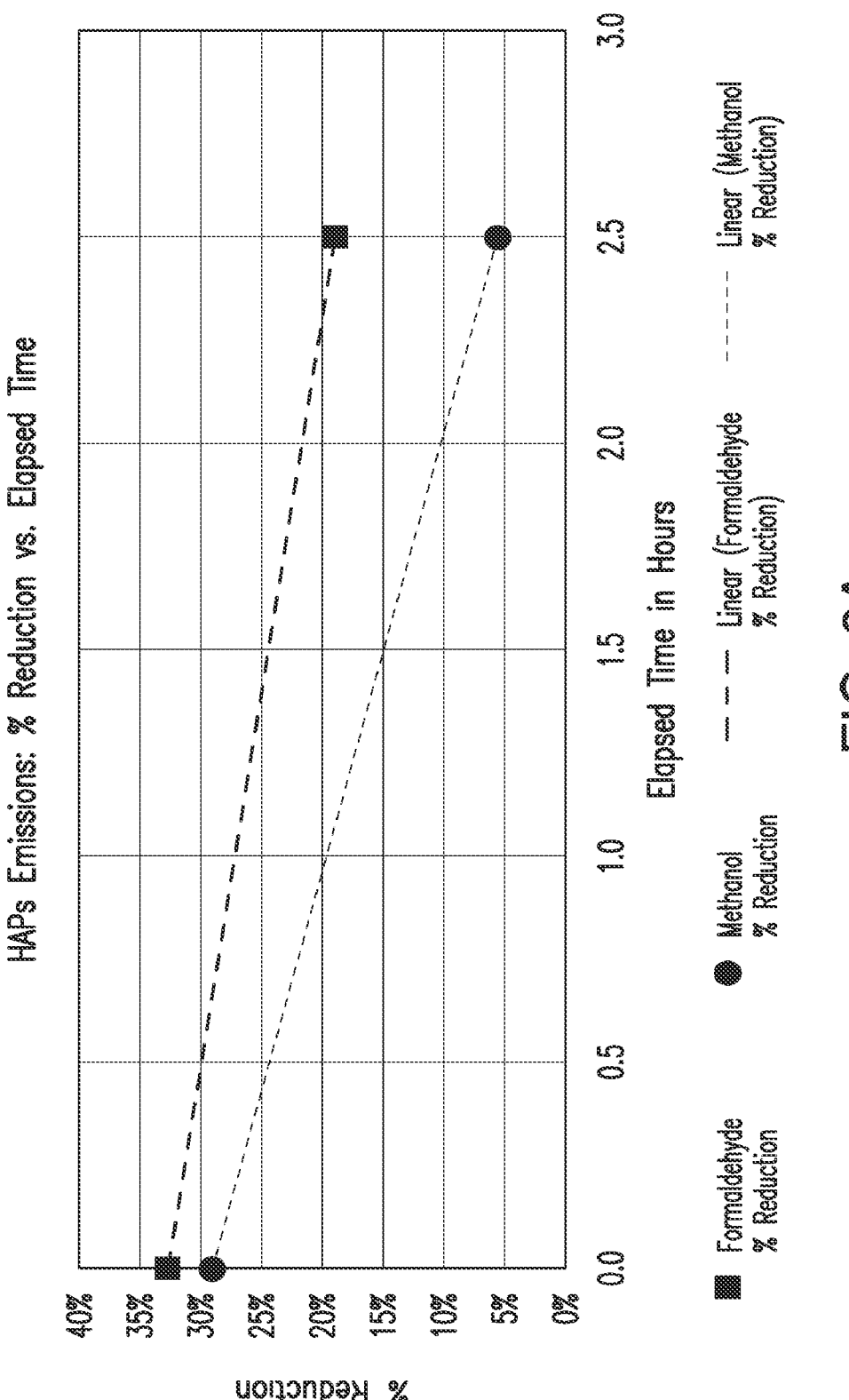

FIG. 8A shows the percentage reduction in hazardous air pollutants (HAPs) methanol and formaldehyde over a 2.5 hour run time, as measured by impingers in accordance with Example 3 of the present disclosure.

Figure 8B:
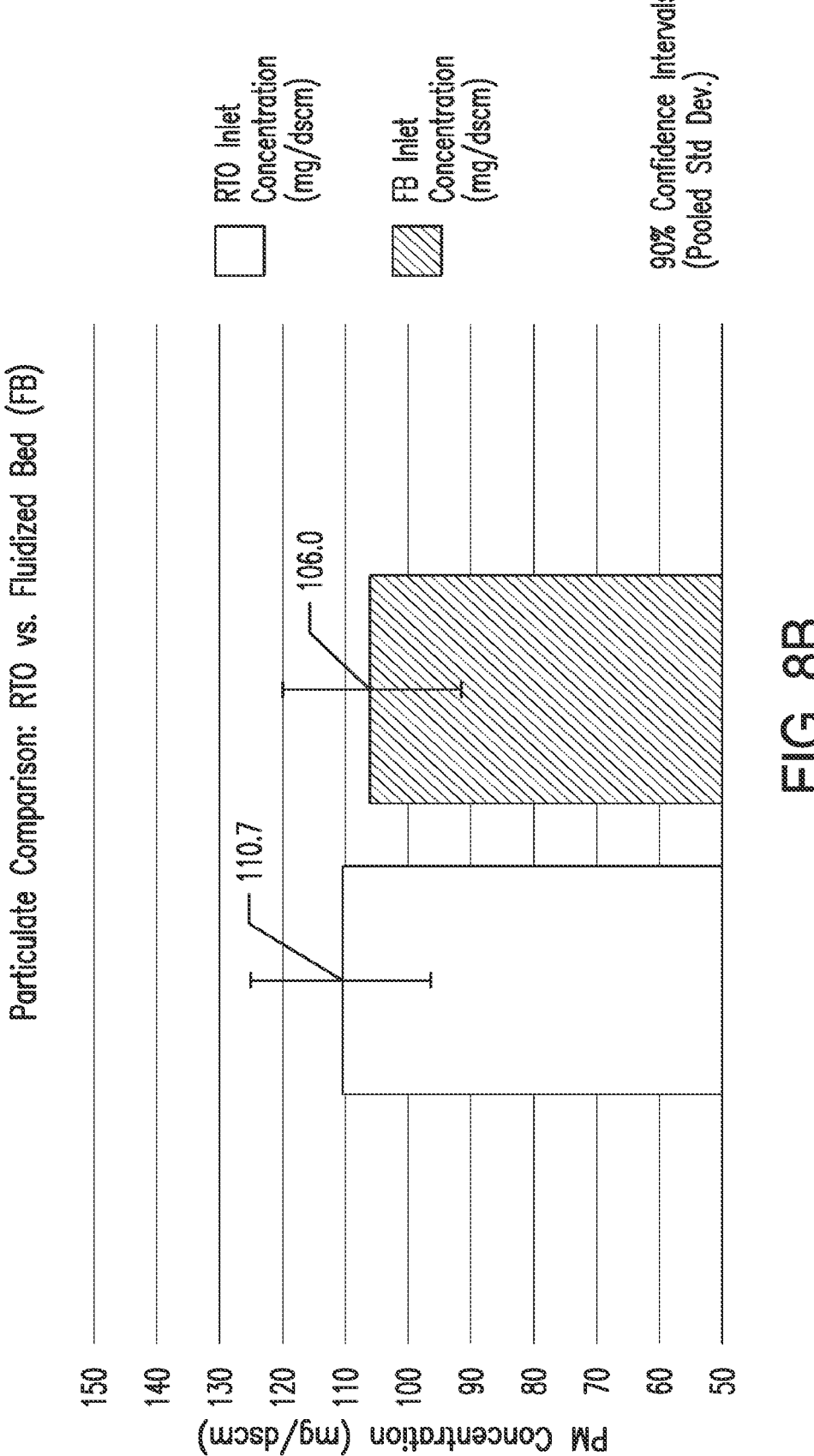

FIG. 8B compares the particulate matter concentration at the inlet of the fluidized bed and a conventional regenerative thermal oxidizer (RTO), as described in Example 3 of the present disclosure.

Figure 8C:
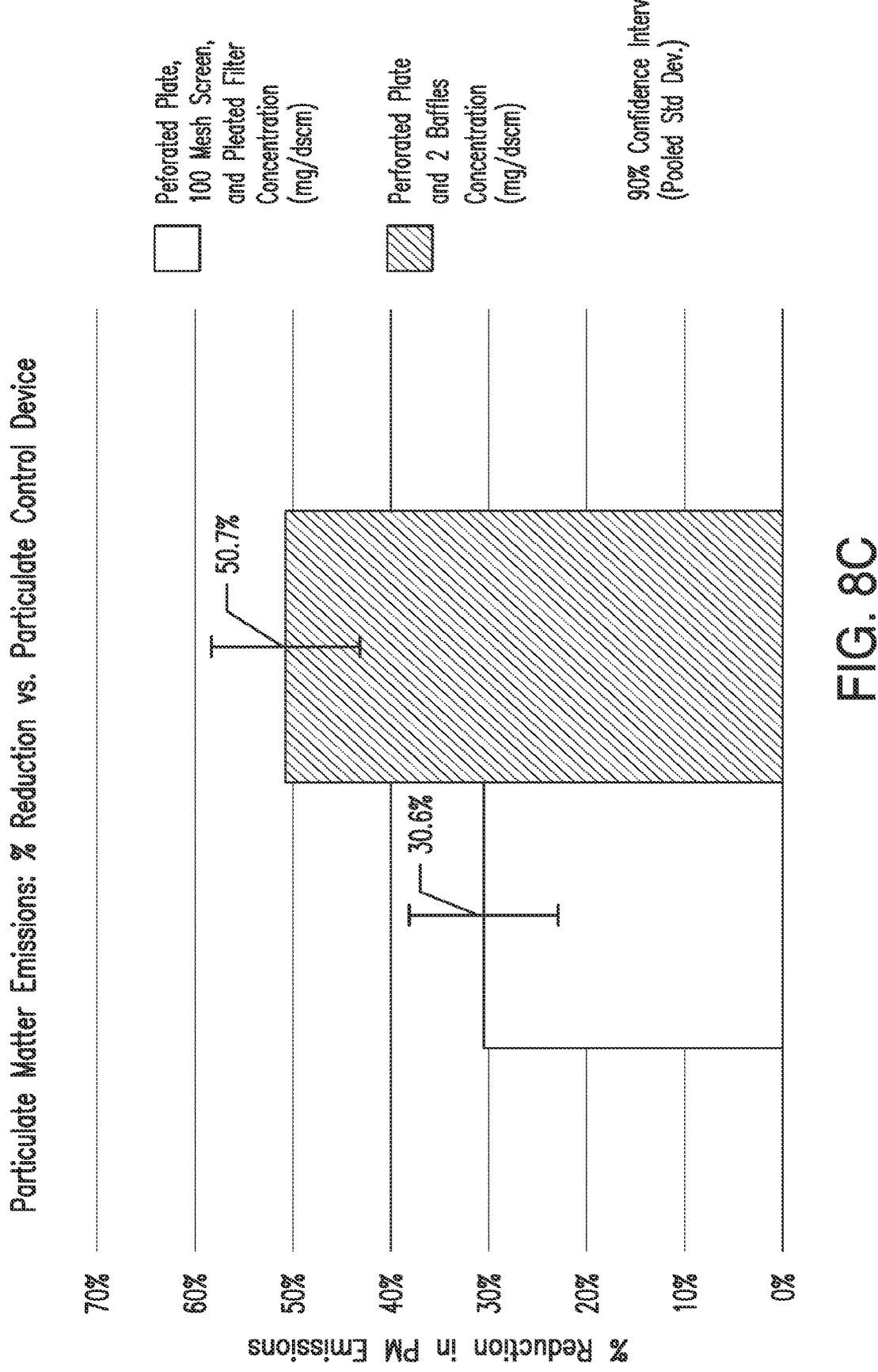

FIG. 8C compares the particulate matter reduction attributable to two different pre-treatment set ups, as described in Example 3 of the present disclosure.

Figure 8D:
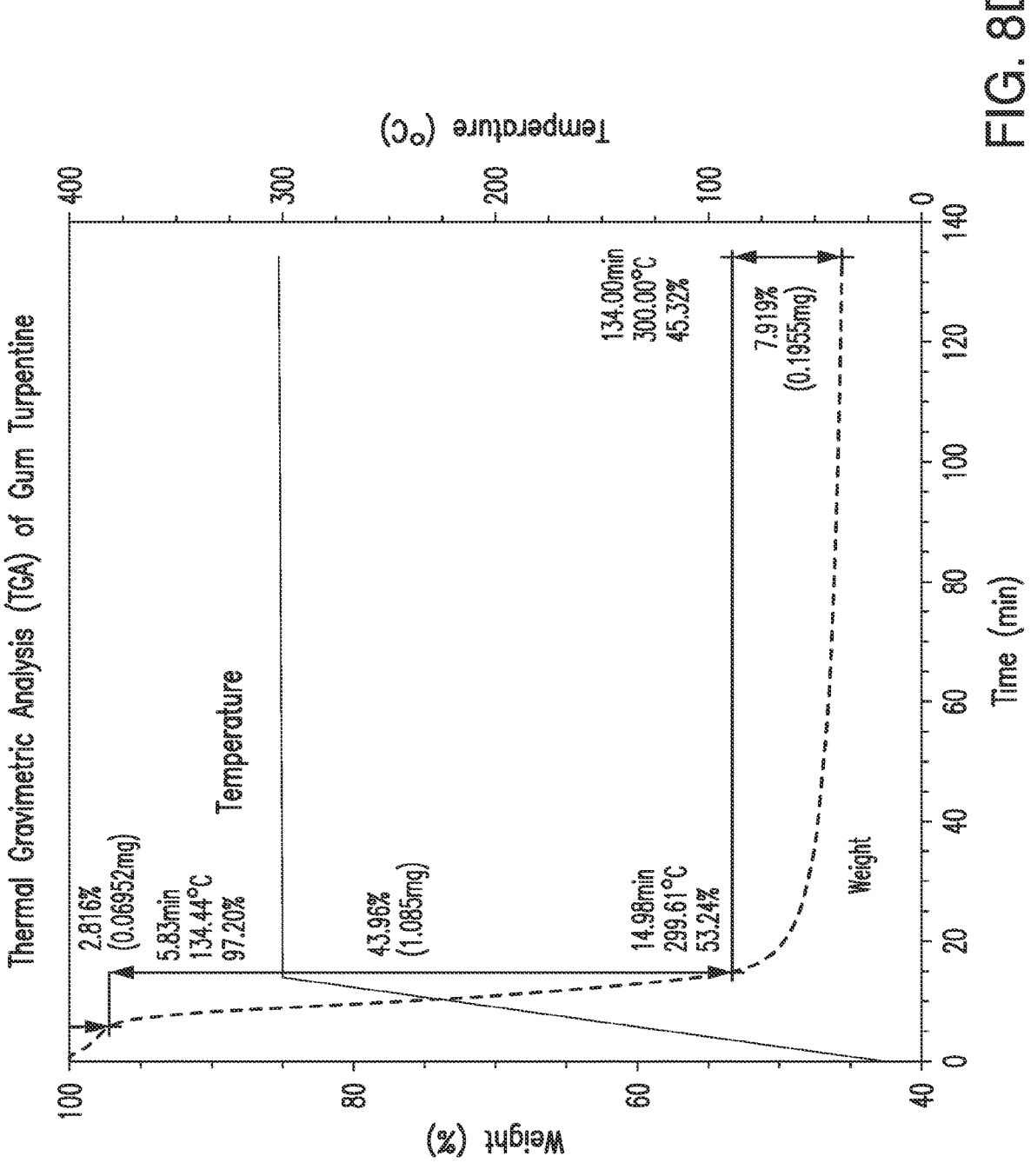

FIG. 8D shows the results of thermal gravimetric analysis on commercially available gum turpentine within a pretreatment system, as described in Example 3 of the present disclosure.

Figure 9:
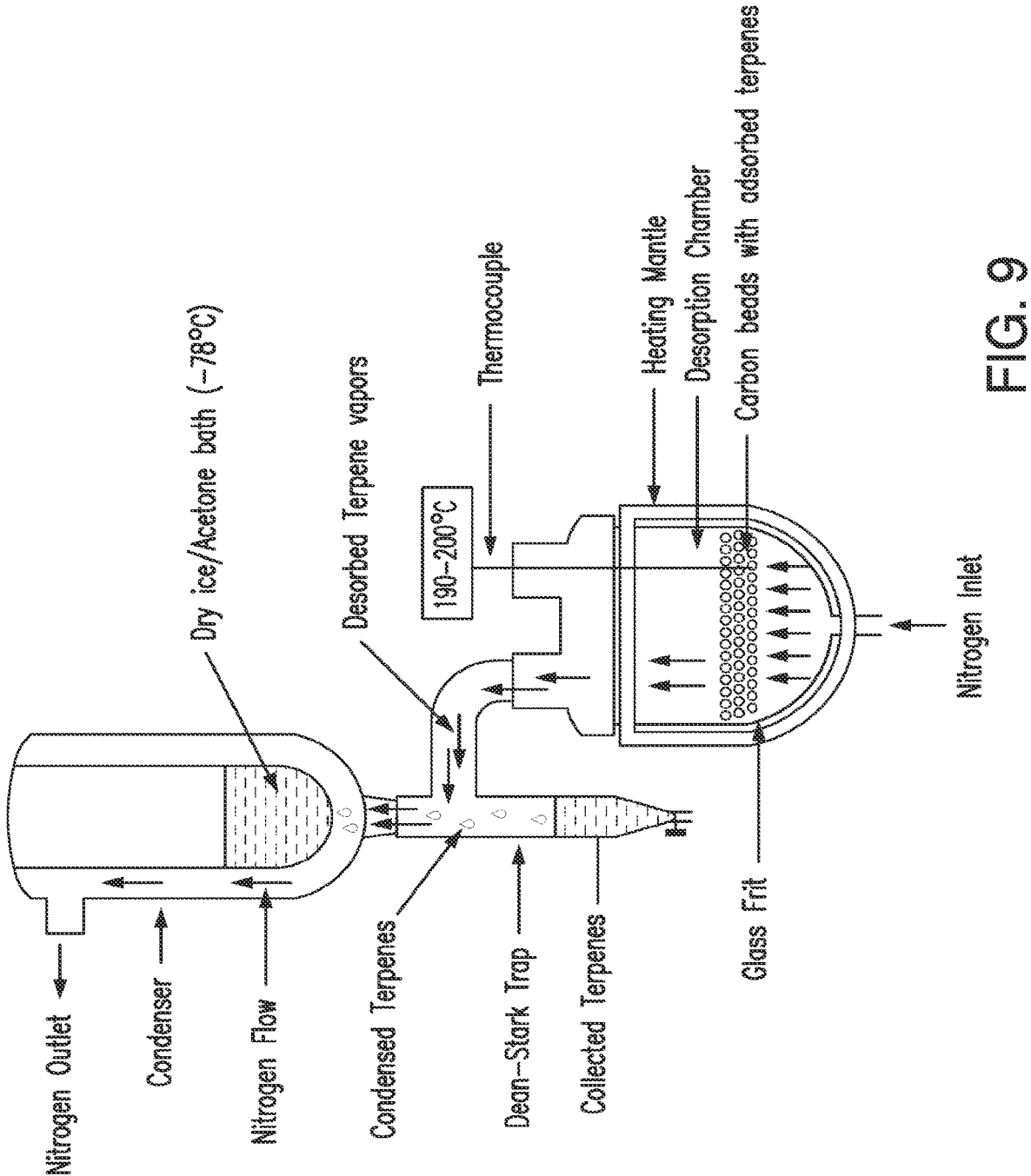

FIG. 9 provides a schematic illustration of a non-limiting example of a glass desorption chamber used for the thermal desorption, as described in Example 4 of the present disclosure.

Figure 10:
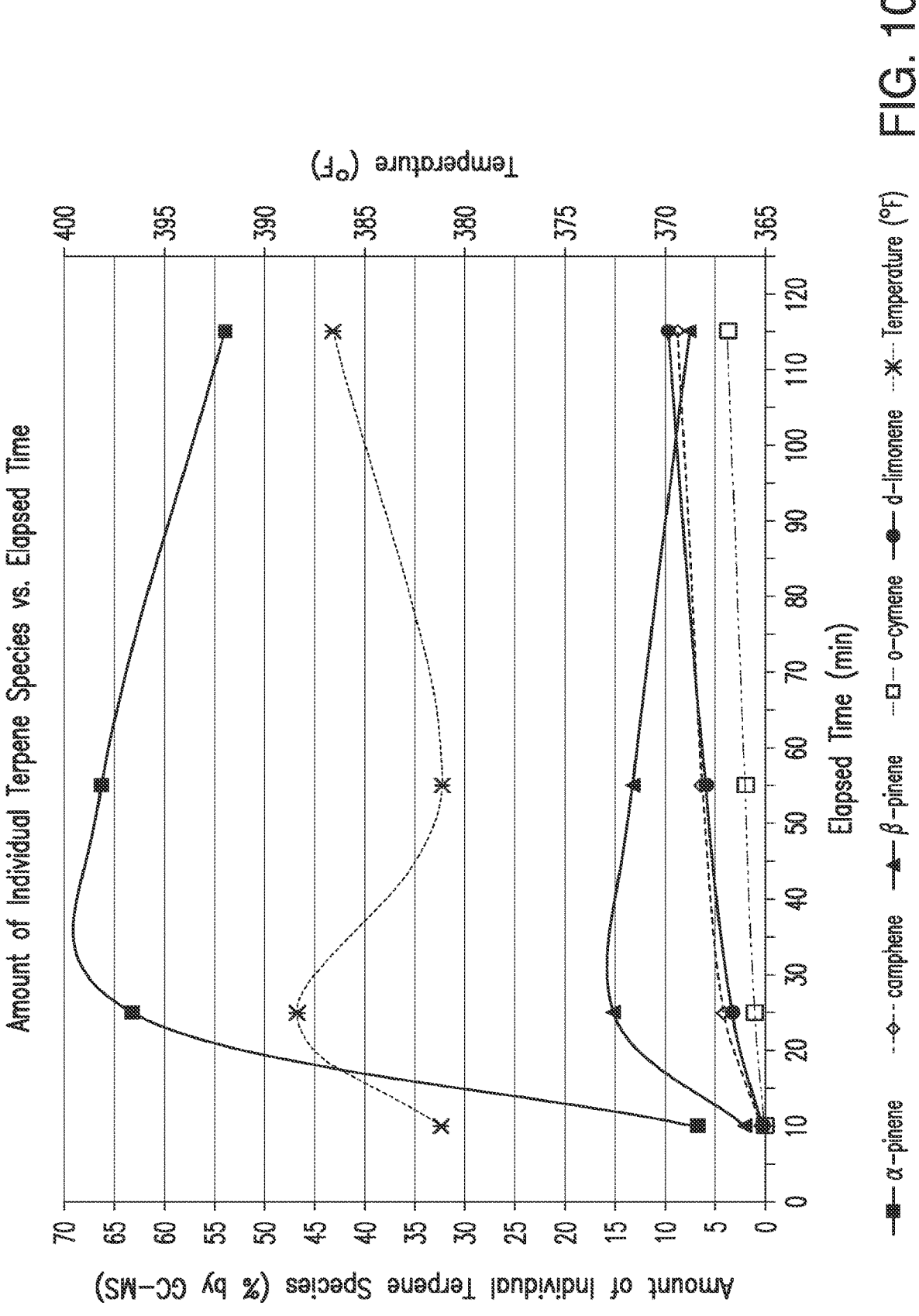

FIG. 10 shows the temperature over time, along with the amount by weight of several commonly-found terpenes in a gaseous stream collected after thermal desorption at a target temperature of about 200° F., as described in Example 4 of the present disclosure.

Figure 11A:
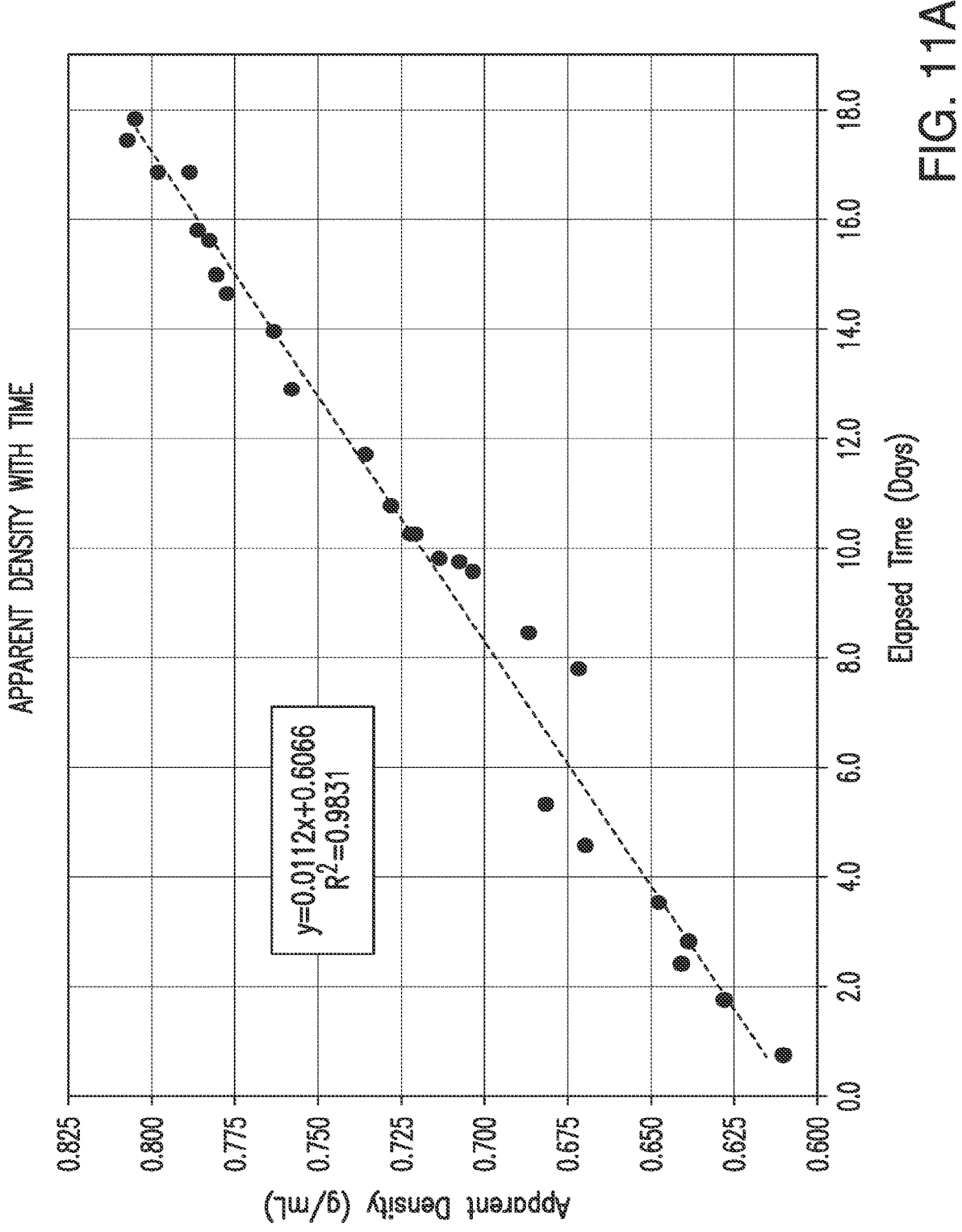

FIG. 11A shows the sorbent apparent density as a function of time in the side stream reactivation trials of Example 6 of the present disclosure.

Figure 11B:
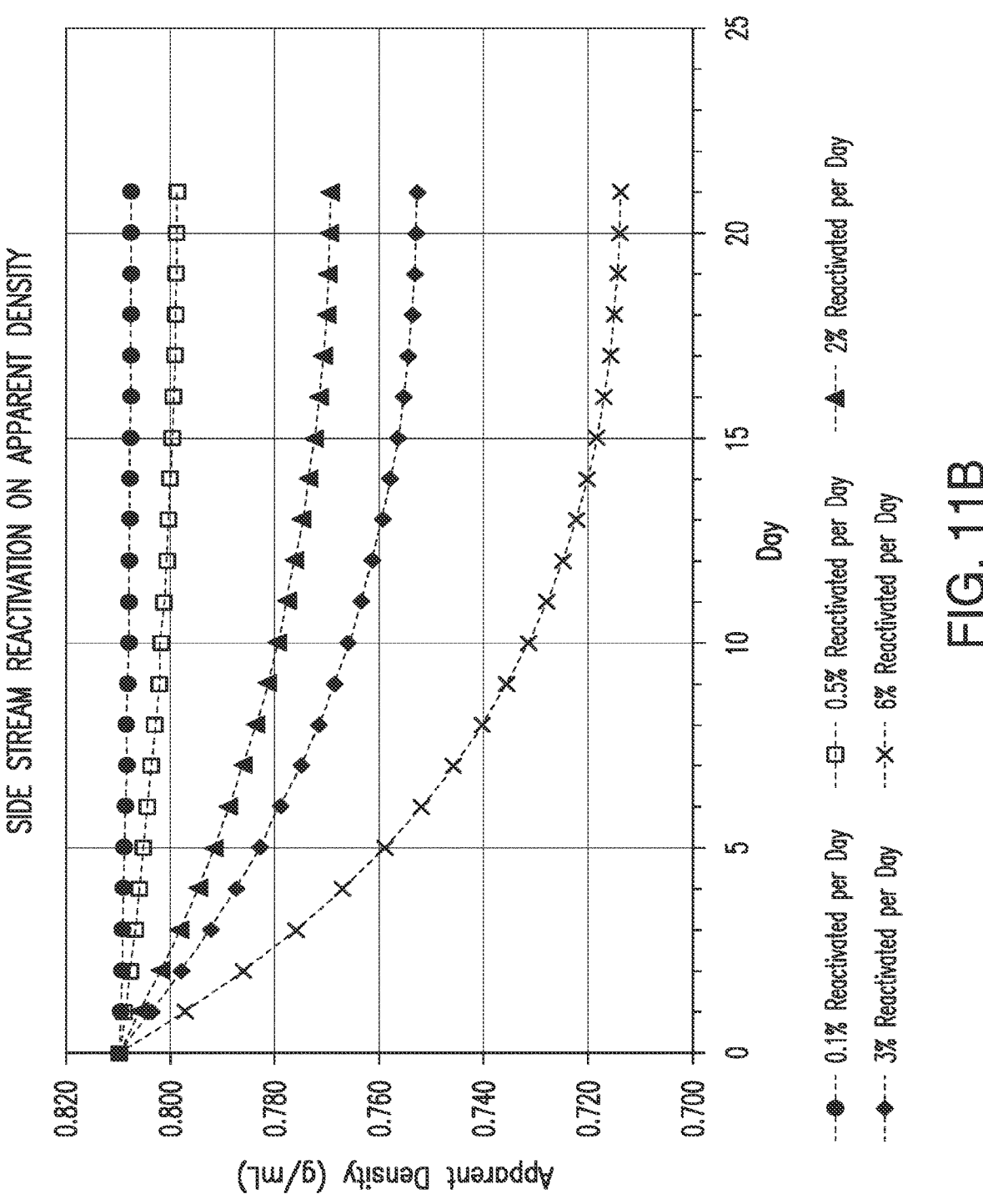

FIG. 11B shows the effect of side stream reactivation on sorbent apparent density, as described in Example 6 of the present disclosure.

Figure 12A:
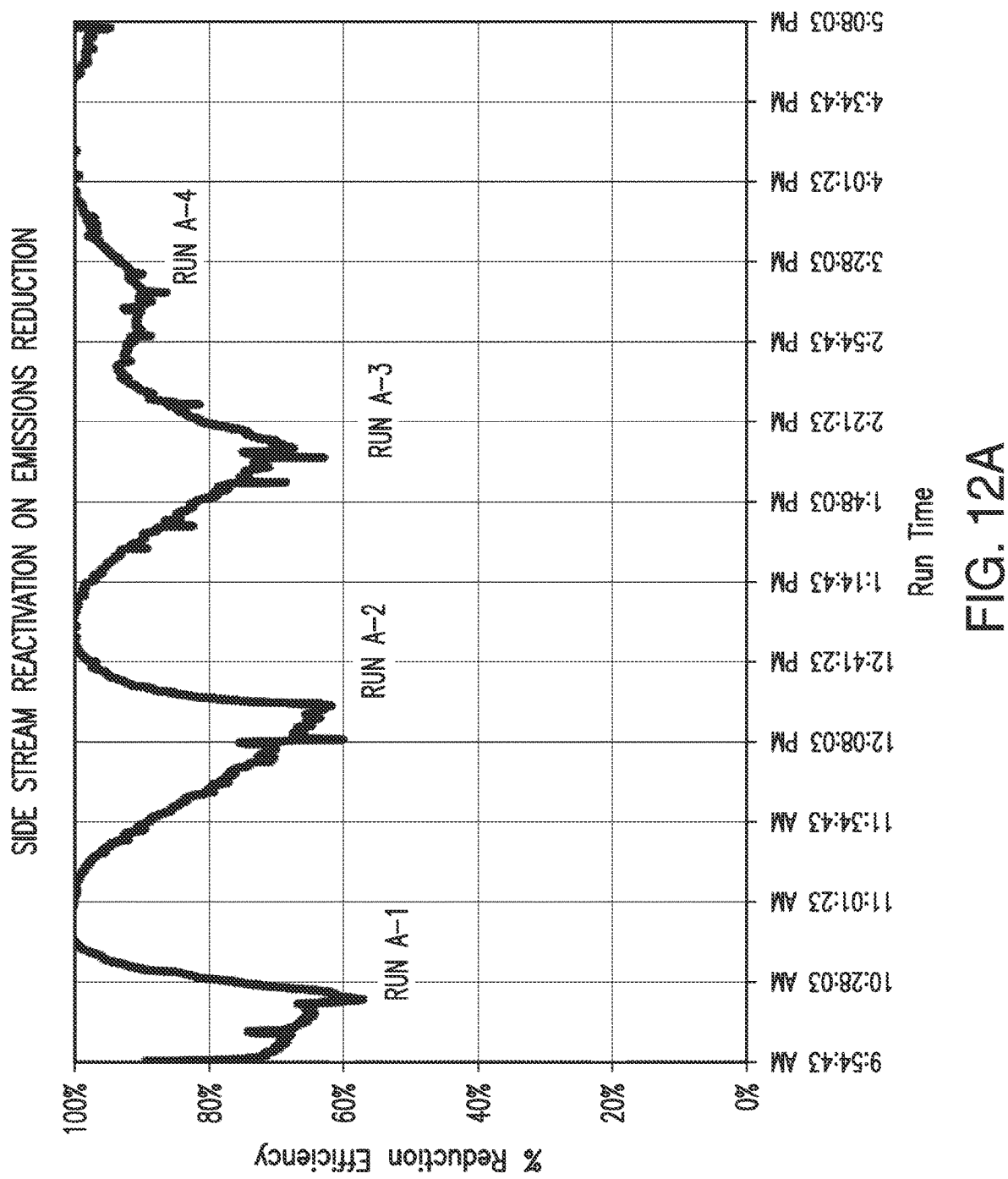

FIG. 12A shows the sorbent apparent density as a function of time in the side stream reactivation trials of Example 6 of the present disclosure.

Figure 12B:
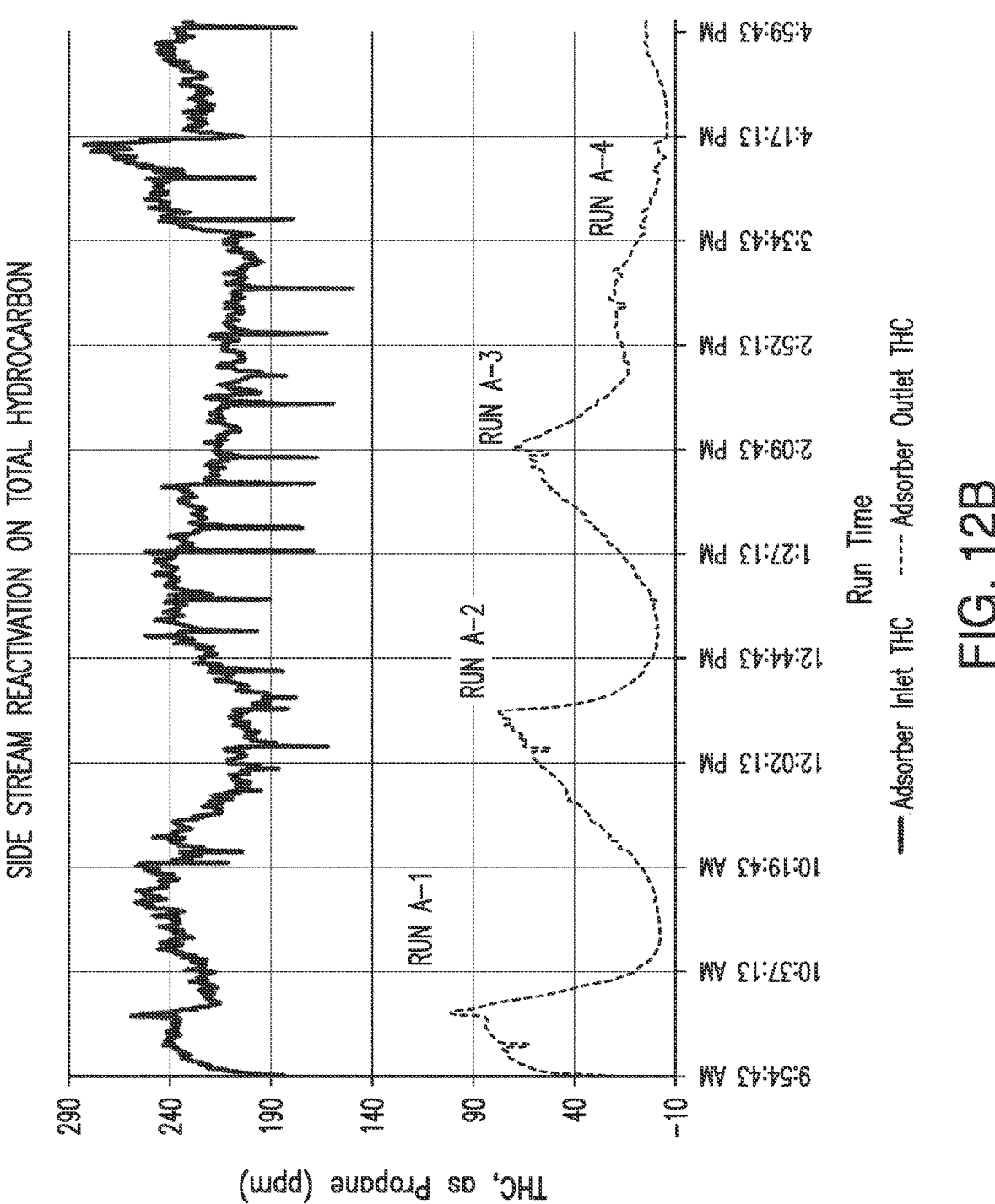

FIG. 12B shows the effect of side stream reactivation on sorbent apparent density, as described in Example 6 of the present disclosure.

Figure 13:
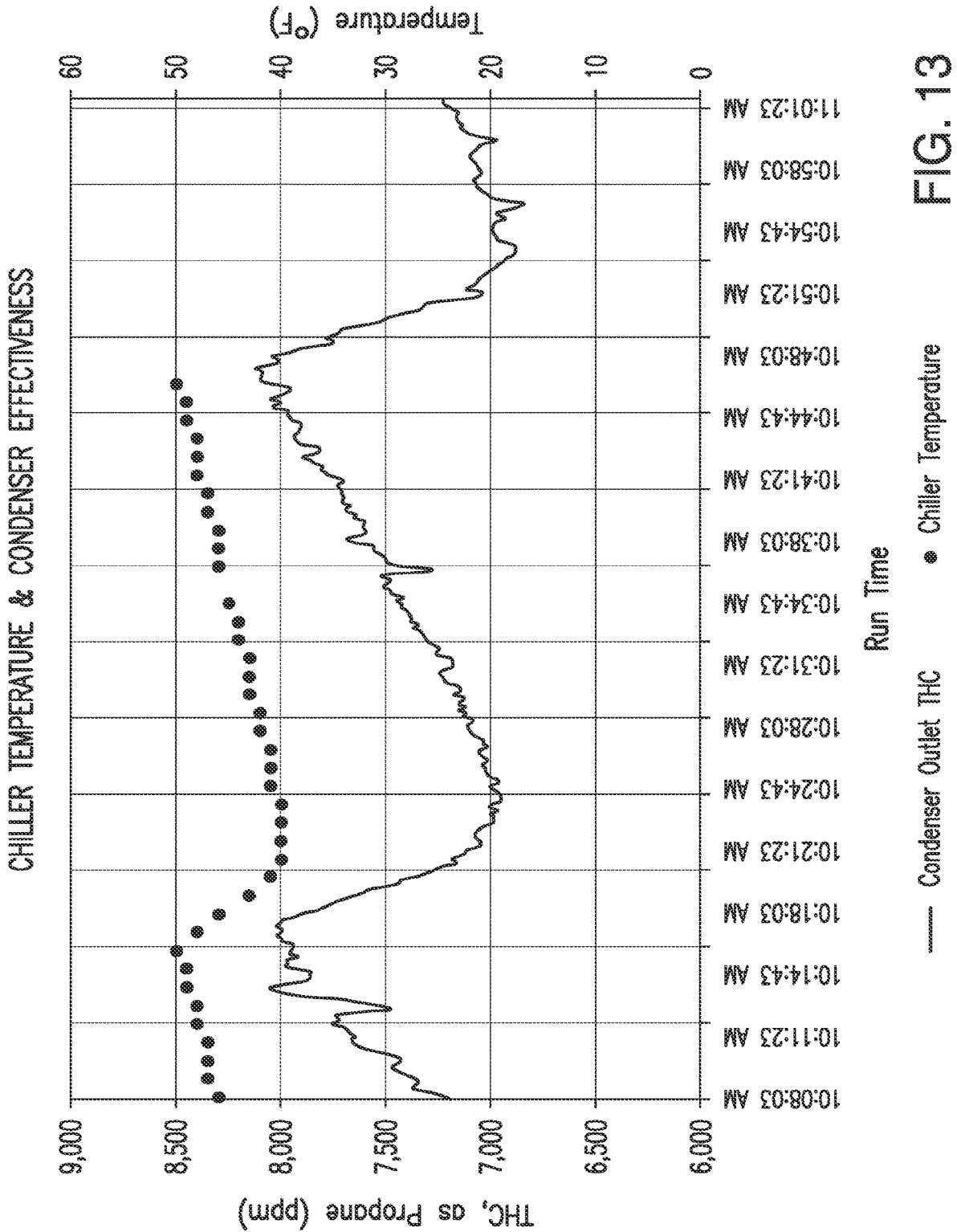

FIG. 13 shows a relationship between condenser chiller temperature and THC at the condenser outlet recycling back to desorber as described in Example 7 of the present disclosure.

Figure 14A:
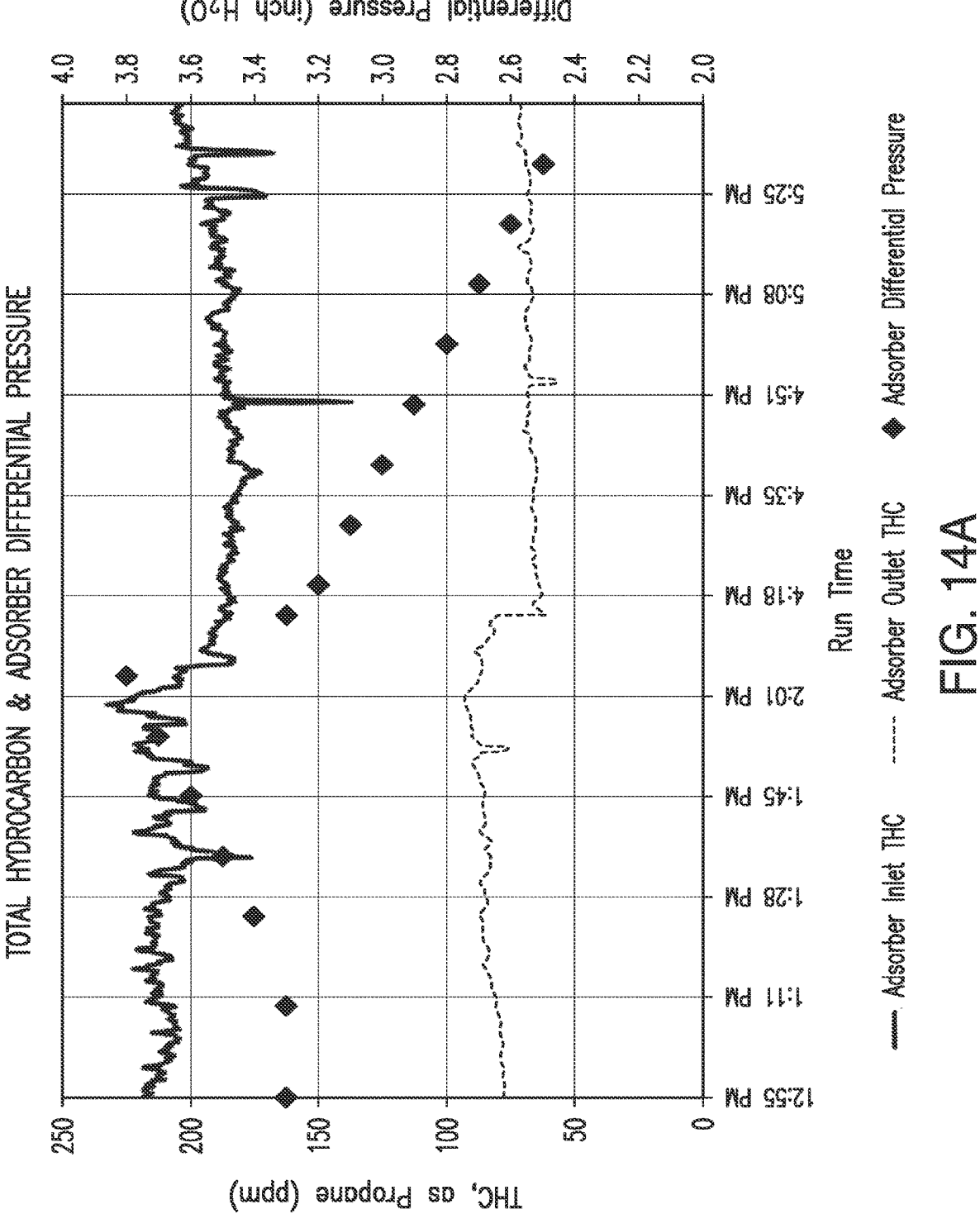

FIG. 14A shows the relationship of adsorber differential pressure to the amount of THC inlet versus outlet, as described in Example 7 of the present disclosure.

Figure 14B:
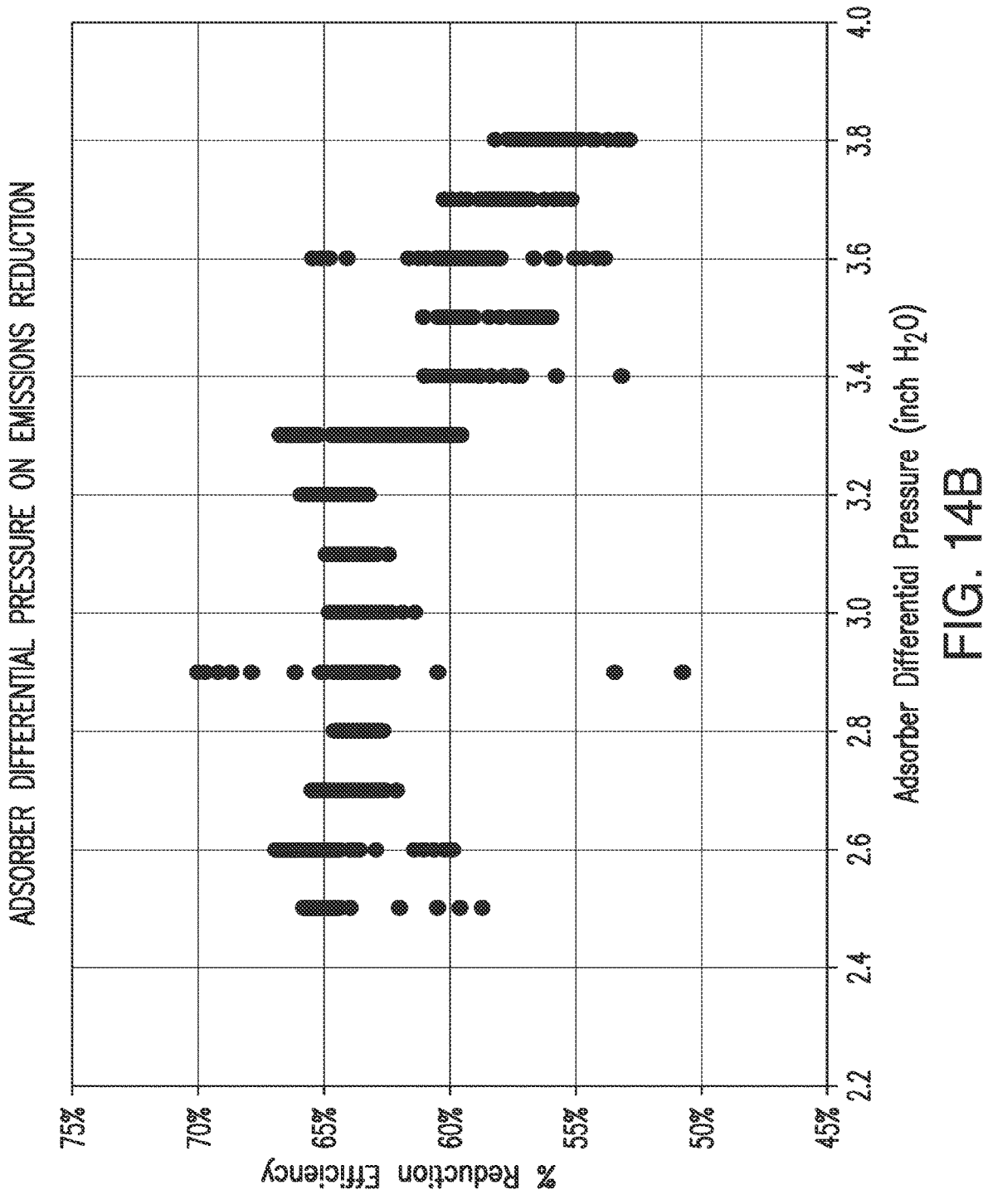

FIG. 14B shows the percent of reduction efficiency and adsorber differential pressure across a second trial as described in Example 7 of the present disclosure where sorbent apparent density was maintained at about 0.78 g/mL to about 0.805 g/mL.

Figure 15:
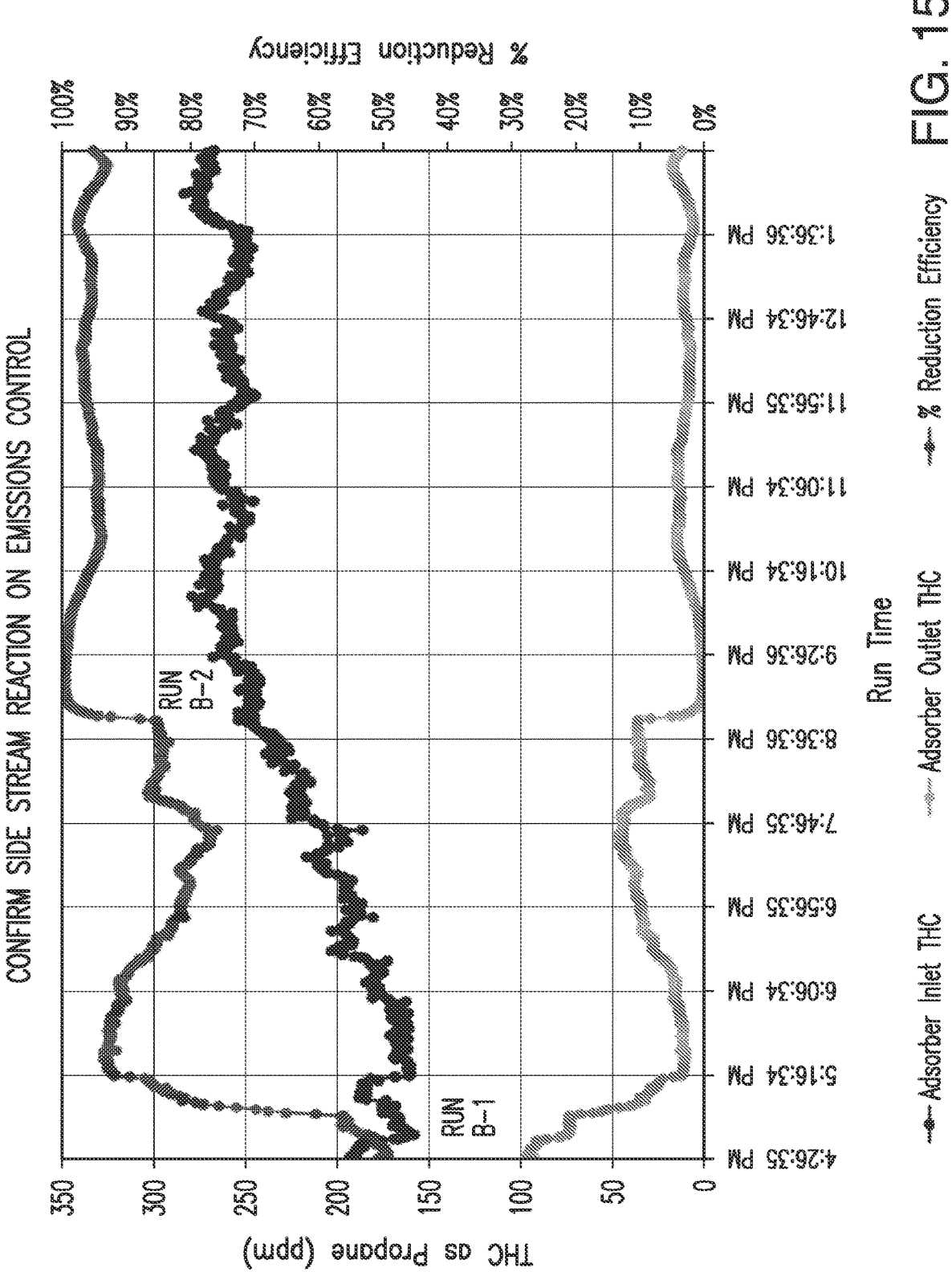

FIG. 15 shows the percent of reduction efficiency and inlet versus outlet THC across a trial as described in Example 8 of the present disclosure where sorbent apparent density was maintained at about 0.76 g/mL to about 0.785 g/mL.

Figure 16A:
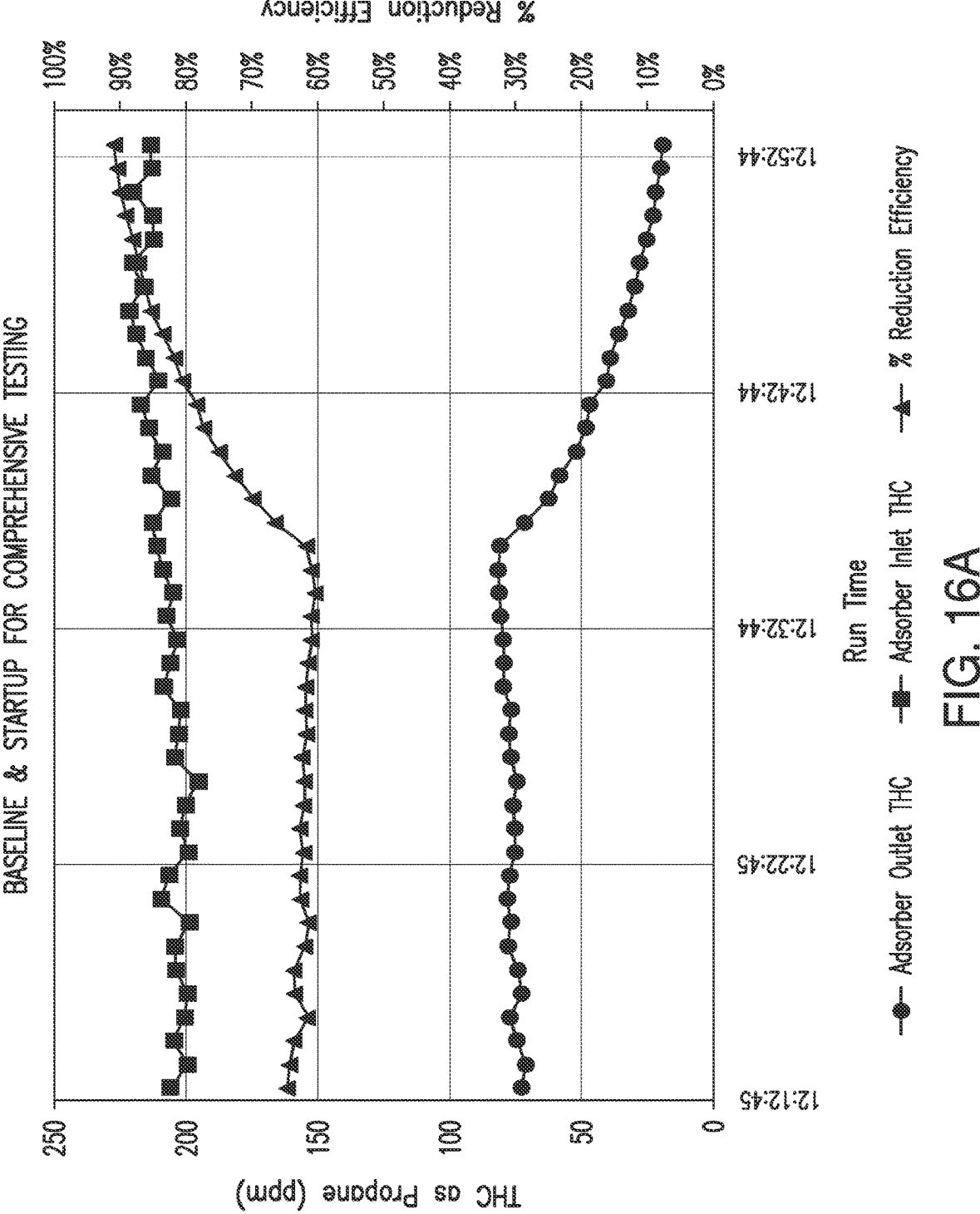

FIG. 16A shows percent reduction efficiency and inlet and outlet THC for baseline and startup runs as described in Example 8 of the present disclosure.

Figure 16B:
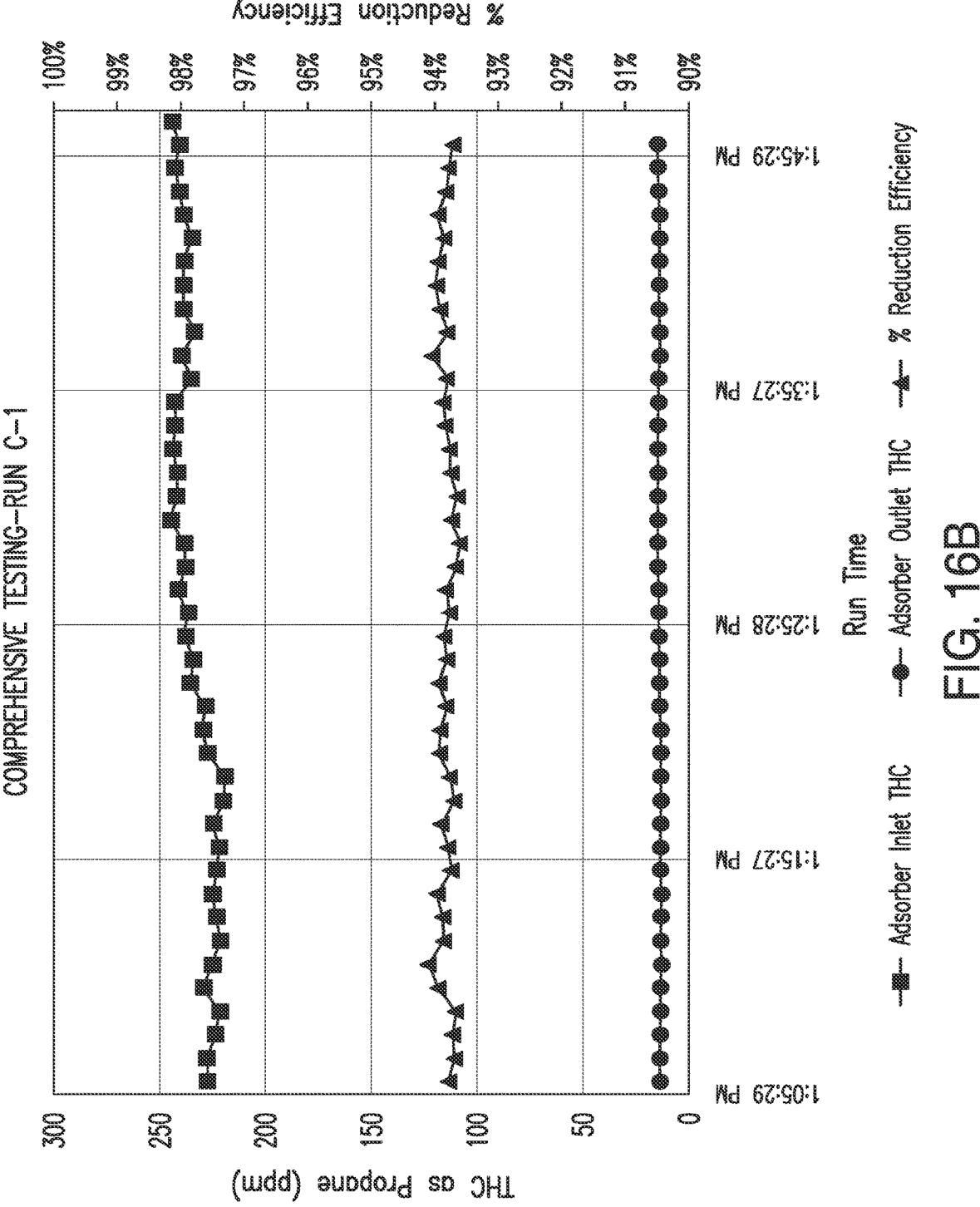

FIG. 16B shows percent reduction efficiency and inlet and outlet THC for two runs, as described in Example 8 of the present disclosure.

Figure 16C:
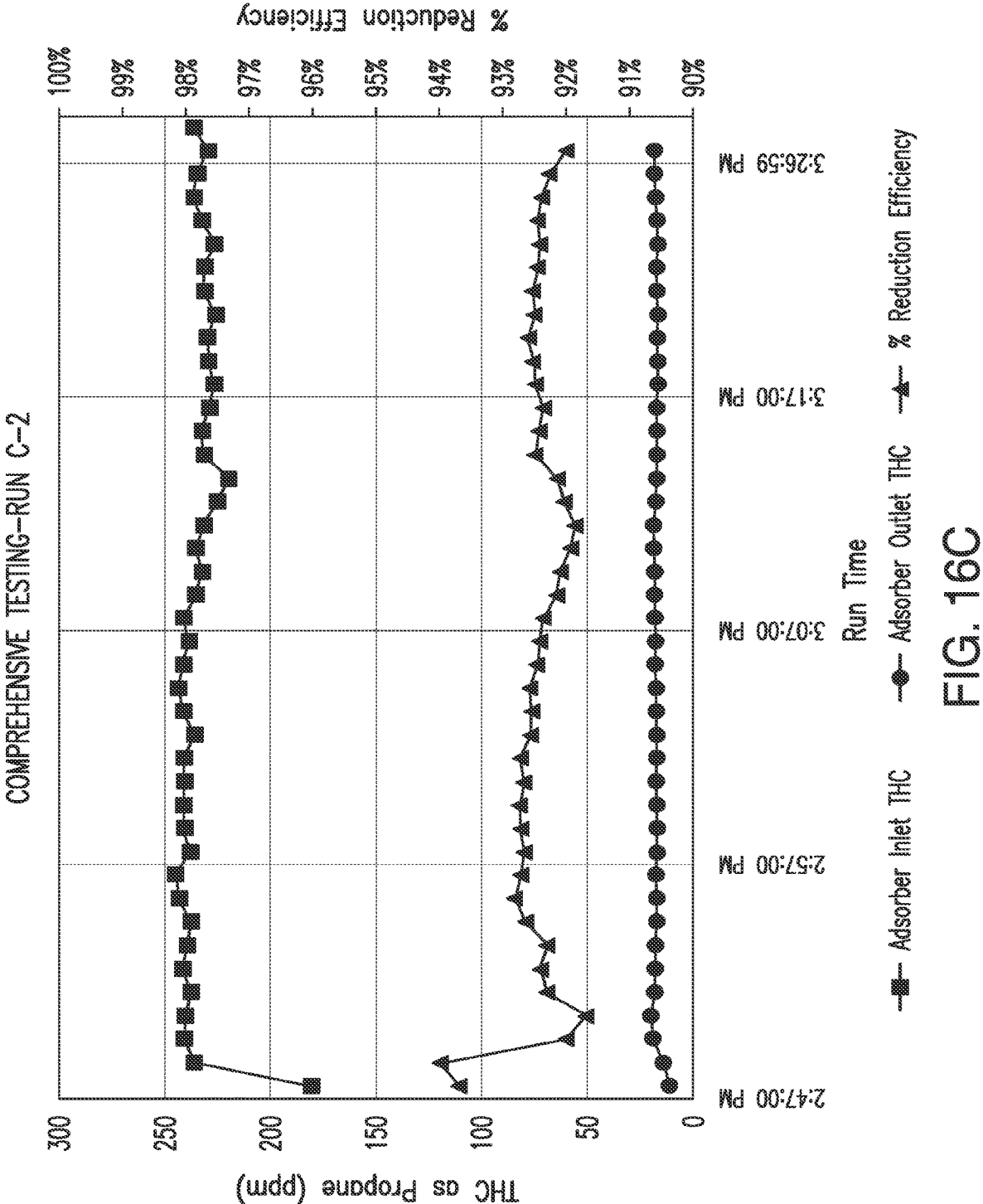

FIG. 16C shows percent reduction efficiency and inlet and outlet THC for two runs, as described in Example 8 of the present disclosure.

Figure 17:
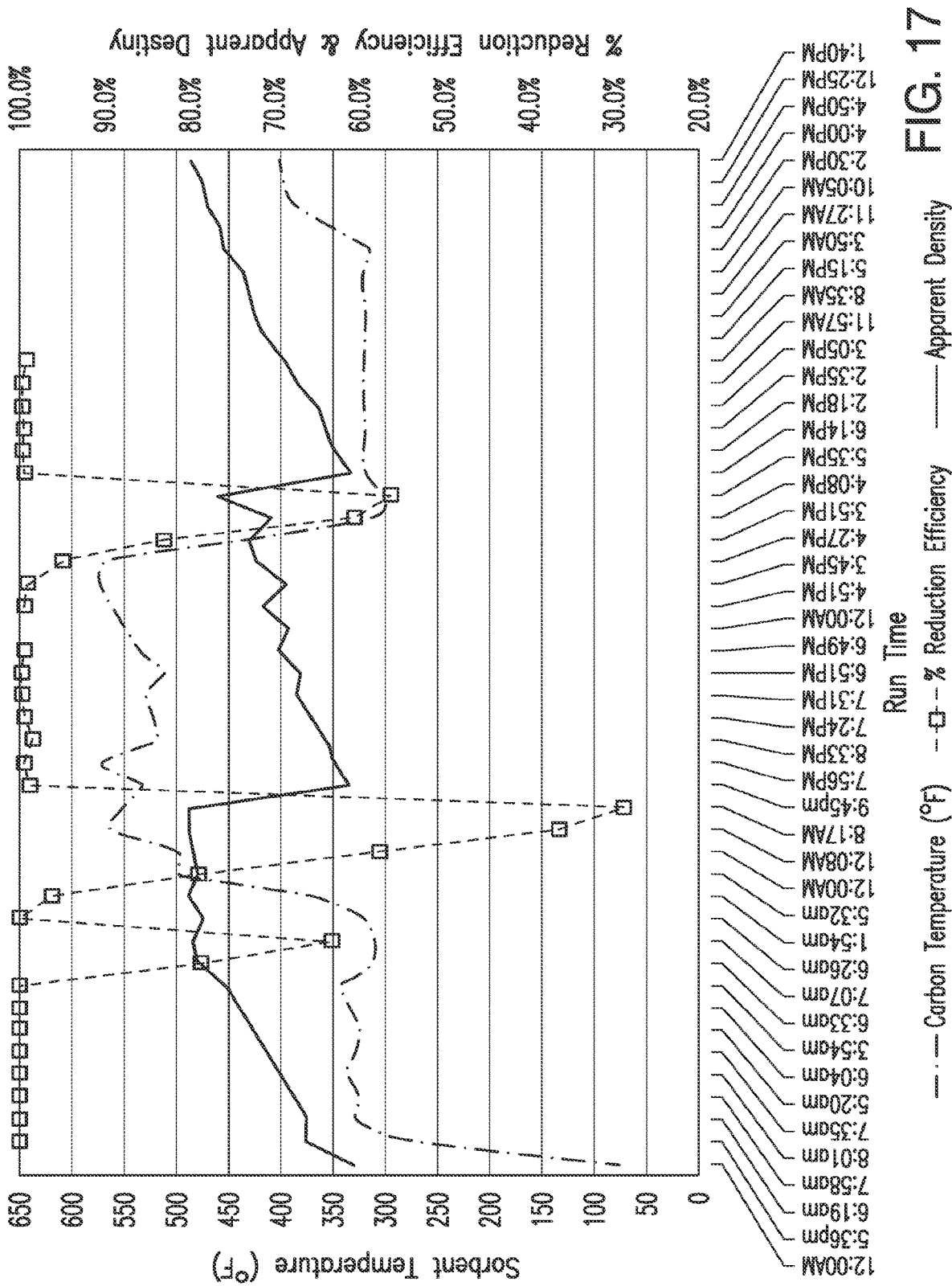

FIG. 17 shows the effect of sorbent temperature and time on percent reduction efficiency, carbon temperature, and apparent density, as described in Example 9 of the present disclosure.

Figure 18A:
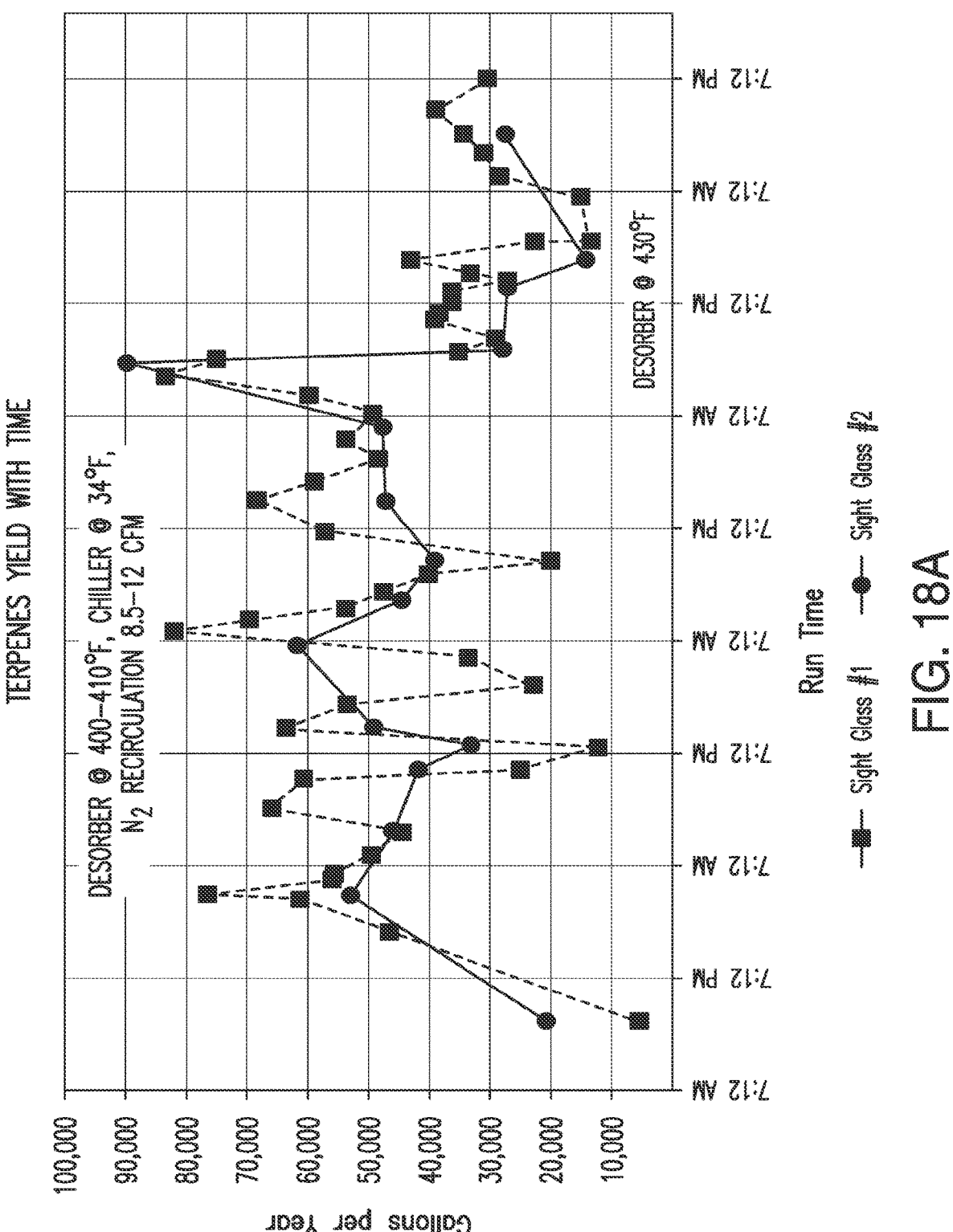

FIG. 18A shows the terpene yield with time based on a run, as described in Example 9 of the present disclosure.

Figure 18B:
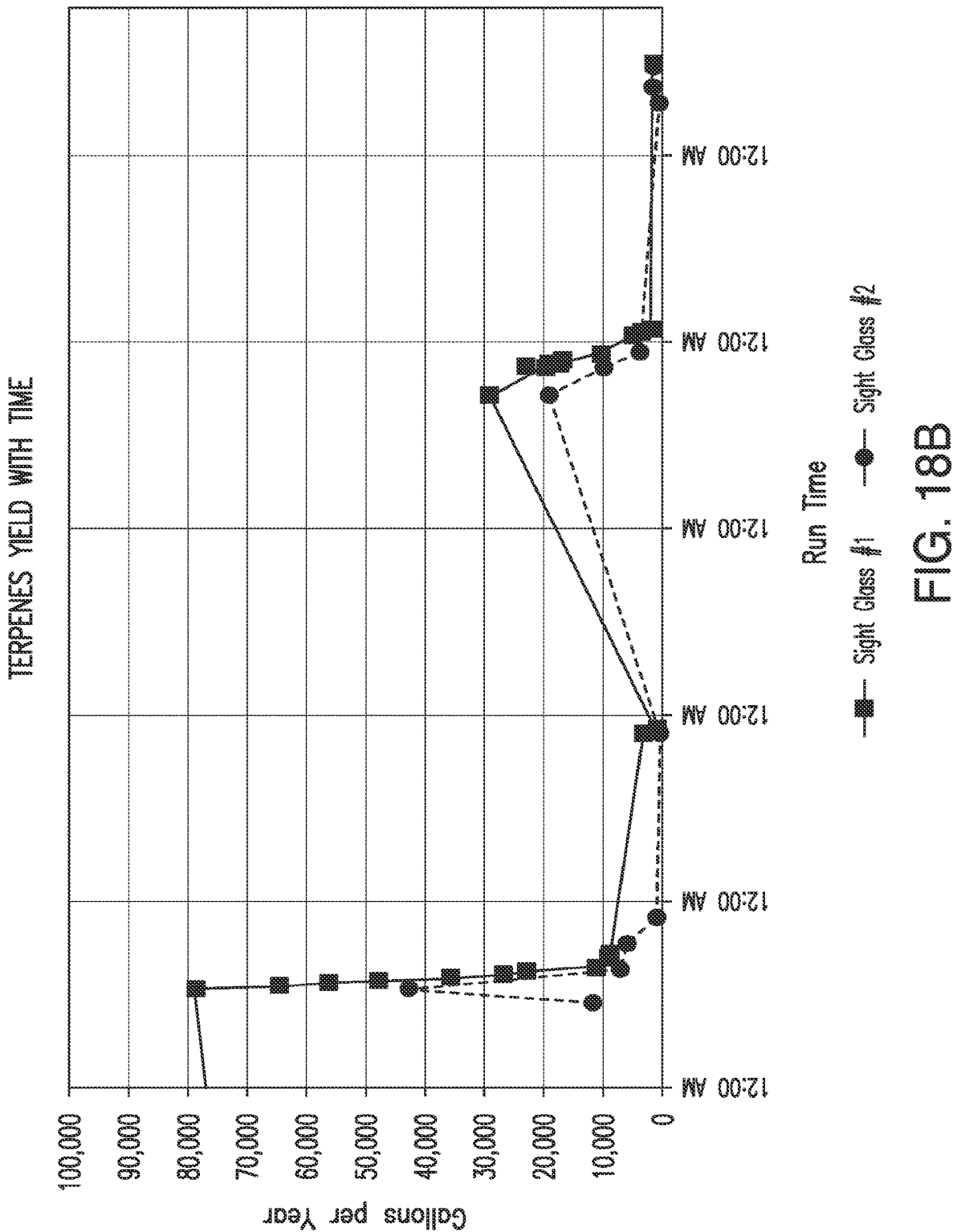

FIG. 18B shows the extrapolated terpene yield with time based on a full commercial system, as described in Example 9 of the present disclosure.

Figure 19:
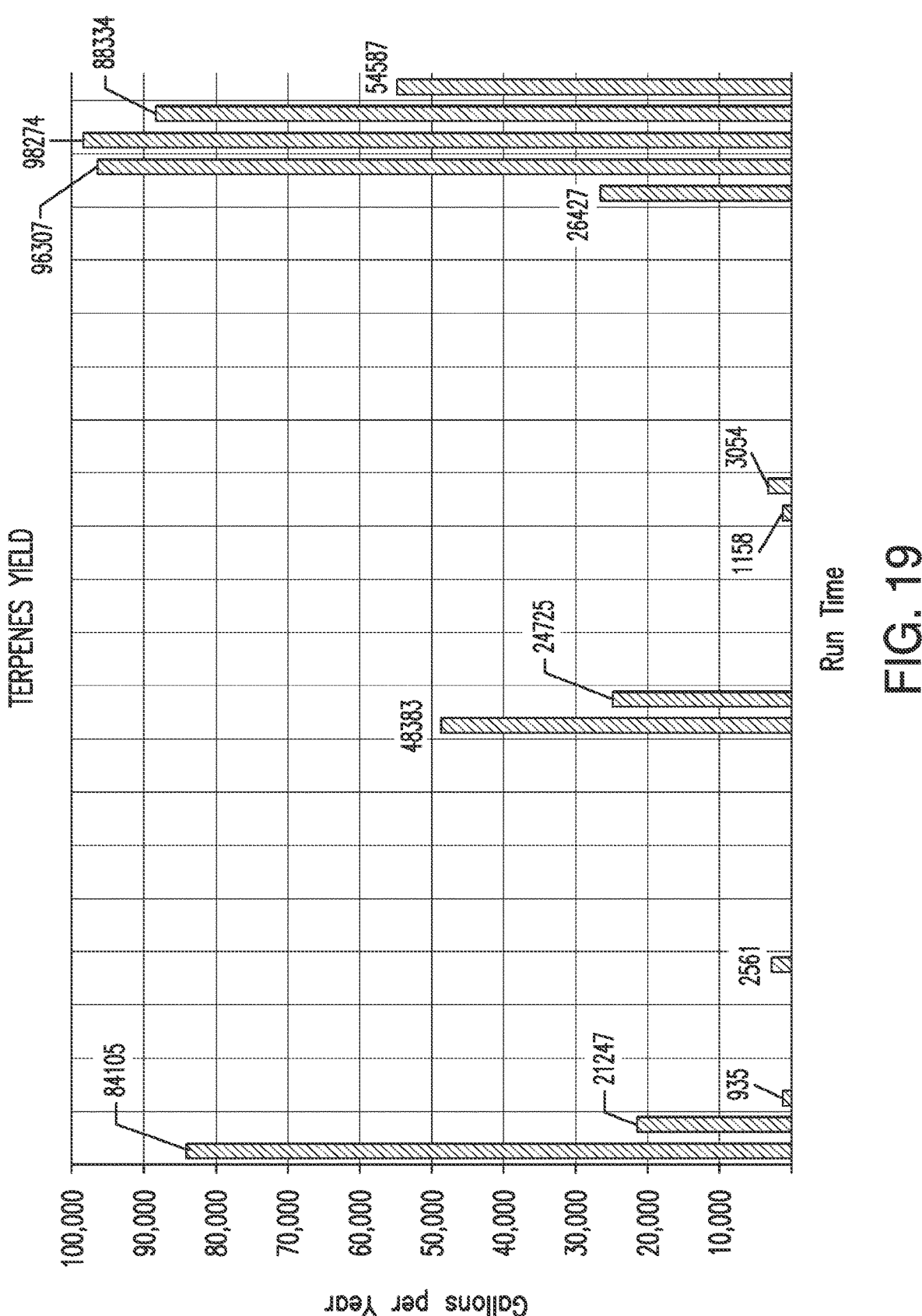

FIG. 19 shows the terpene yield based on a full commercial system, as described in Example 9 of the present disclosure. The axis displaying run time has tick marks corresponding to every two days over a forty day period.

Figure 20A:
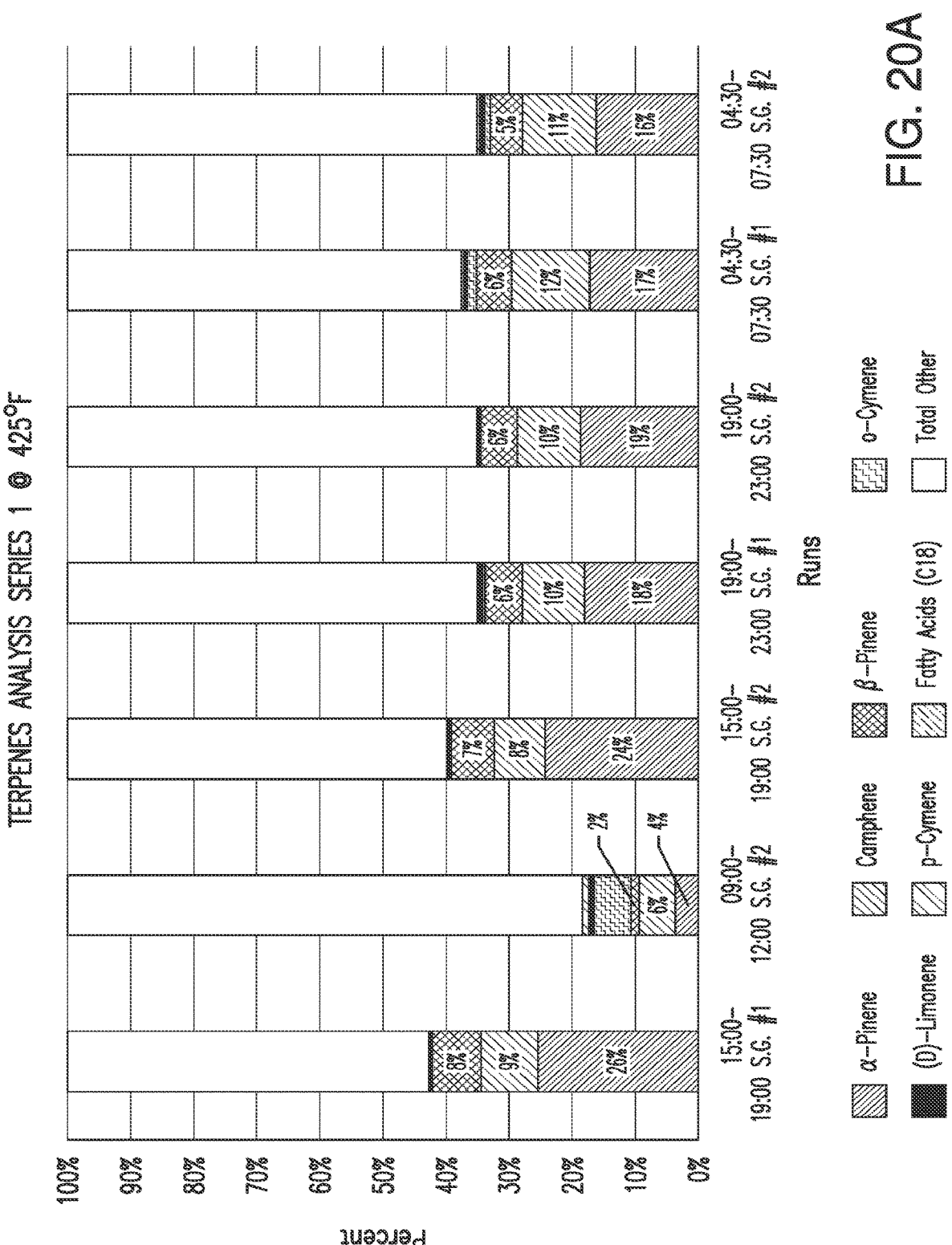
Figure 20B:
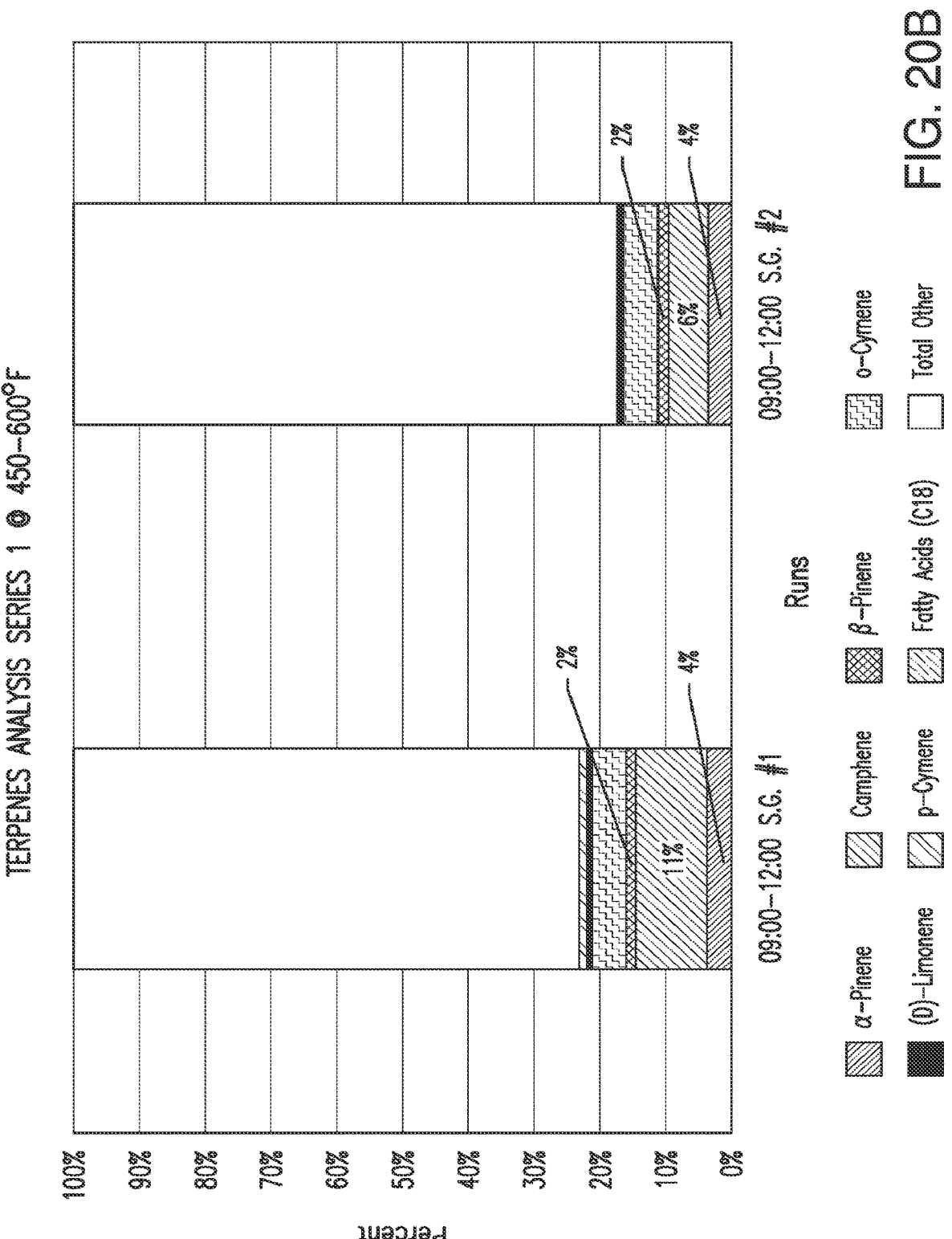
Figure 20C:
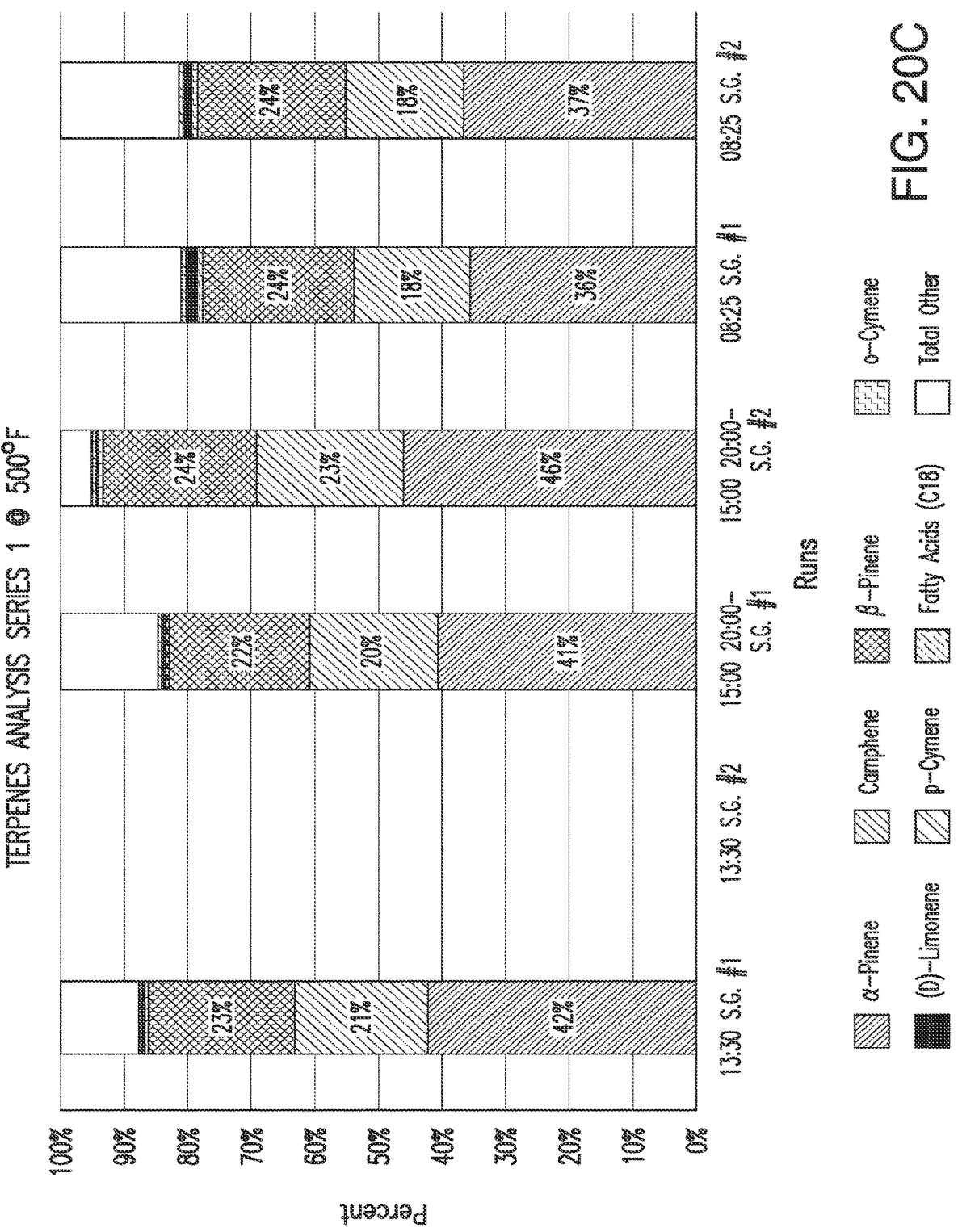

FIG. 20A shows the breakdown between alpha-pinene or beta-pinene versus other terpene products and fatty acids, in accordance with Example 9, where the desorber operating at about 425° F. FIG. 20B shows the breakdown between alpha-pinene or beta-pinene versus other terpene products and fatty acids, in accordance with Example 9, where the desorber is operating at between about 450-600° F. FIG. 20C shows the breakdown between alpha-pinene or beta-pinene versus other terpene products and fatty acids, in accordance with Example 9, where the desorber is operating at between about 500° F. FIGS. 20A, 20B, and 20C provide of series of terpene analysis. In the figures, the specific percentage of each terpene is identified from bottom to top in the following order: alpha-pinene, camphene, beta-pinene, o-cymene, (D)-limonene, p-cymene, fatty acids (C18), and total (other).

Figure 21:
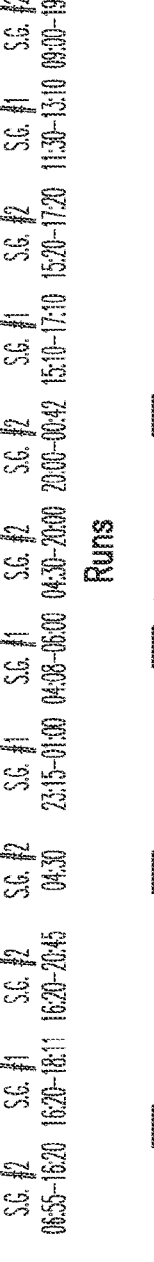
Figure 21:
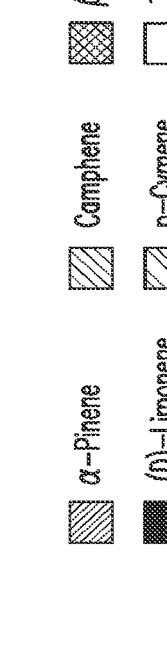

FIG. 21 shows a second series of terpene analysis conducted for various runs, as described in Example 9 of the present disclosure. FIG. 21 provides a series of terpene analysis. In the figures, the specific percentage of each terpene is identified from bottom to top in the following order: alpha-pinene, camphene, beta-pinene, 0-cymene, (D)-limonene, p-cymene, and total (other).

Figure 22:
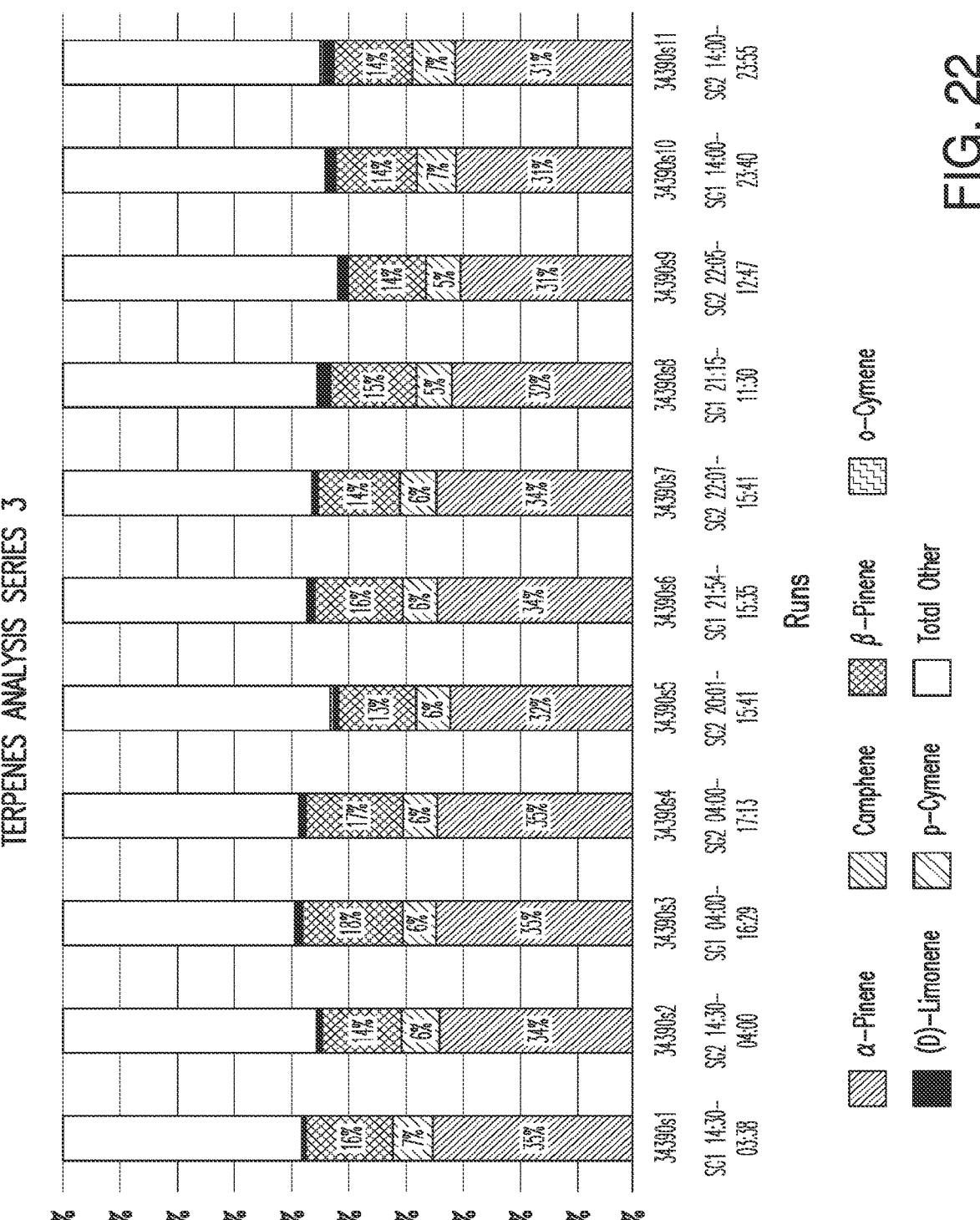

FIG. 22 shows a third series of terpene analysis conducted for various runs, as described in Example 9 of the present disclosure. FIG. 22 provides a series of terpene analysis. In the figures, the specific percentage of each terpene is identified from bottom to top in the following order: alpha-pinene, camphene, beta-pinene, o-cymene, (D)-limonene, p-cymene, and total (other).

Figure 23:
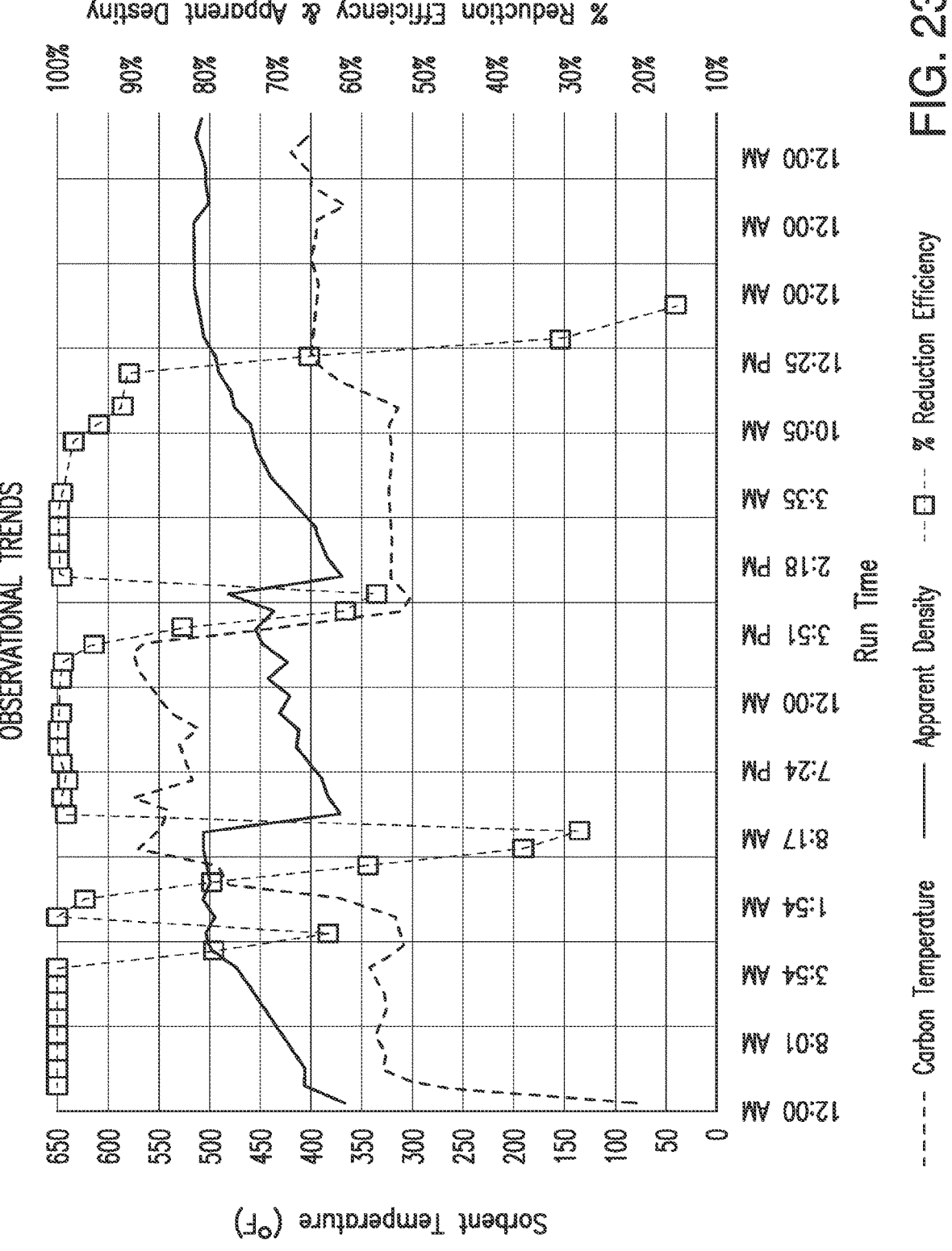

FIG. 23 shows a plot of the operational measurement trends of carbon temperature, apparent density, and percent reduction efficiency, as described in Example 9 of the present disclosure.

5. DETAILED DESCRIPTION

The presently disclosed subject matter provides methods and systems for controlling emissions, specifically, from exhaust streams created by wood drying operations. These and other aspects of the disclosed subject matter are discussed more in the detailed description and examples.

5.1 Definitions

The terms used in this specification generally have their ordinary meanings in the art, within the context of this subject matter and in the specific context where each term is used. Certain terms are defined below to provide additional guidance in describing the compositions and methods of the disclosed subject matter and how to make and use them.

As used in the specification and the appended claims, the singular forms "a", "an", and "the" include plural referents unless the context clearly dictates otherwise. Thus, for example, reference to "a compound" includes mixtures of compounds.

The term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, preferably up to 10%, more preferably up to 5%, and more preferably still up to 1% of a given value. Alternatively, particularly with respect to systems or processes, the term can mean within an order of magnitude, preferably within five-fold, and more preferably within two-fold, of a value.

"Coupled" as used herein refers to the connection of a system component to another system component by any means known in the art. The type of coupling used to connect two or more system components can depend on the scale and operability of the system. For example, and not by way of limitation, coupling of two or more components of a system can include one or more joints, valves, transfer lines, or sealing elements. Non-limiting examples of joints include, but are not limited to, threaded joints, soldered joints, welded joints, compression joints, and mechanical joints. Non-limiting examples of fittings include, but are not limited to, coupling fittings, reducing coupling fittings, union fittings, tee fittings, cross fittings, and flange fittings. Non-limiting examples of valves include, but are not limited to, gate valves, globe valves, ball valves, butterfly valves, and check valves.

As used herein, "terpenes" refers to volatile organic compounds from plants, which are derived from isoprene. For example, monoterpenes include two isoprene units and have the general formula $C_{10}H_{16}$.

"Dipentene," as used herein, refers to a class of compounds including 10 carbon atoms and having multiple double bonds and a closed 6-member ring, such as limonene (e.g., d-limonene and/or 1-limonene), terpinolene, alpha-terpinene, and gamma-terpinene.

5.2 Systems for Recovering Terpene Composition

In certain aspects, the present disclosure provides systems for recovering terpenes collected from a wood drying process, and for controlling the composition of such terpenes. The systems can include a sorbent that has adsorbed materials from the wood drying process and a desorber that receives the sorbent and desorbs the adsorbed materials from the sorbent to form a gaseous stream comprising terpenes. The system can further include a cooling system, coupled to the desorber, to condense the terpenes from the gaseous stream. The terpenes collected in accordance with the present disclosure have a desirable amount of alpha-pinene and beta-pinene relative to other terpenes, such as dipentene and camphene. In certain embodiments, systems of the present disclosure do not require a Regenerative Thermal Oxidizer (RTO). Further, in particular embodiments, methods of the present disclosure do not require thermal oxidation.

5.2.1 Overview

Figure 1:
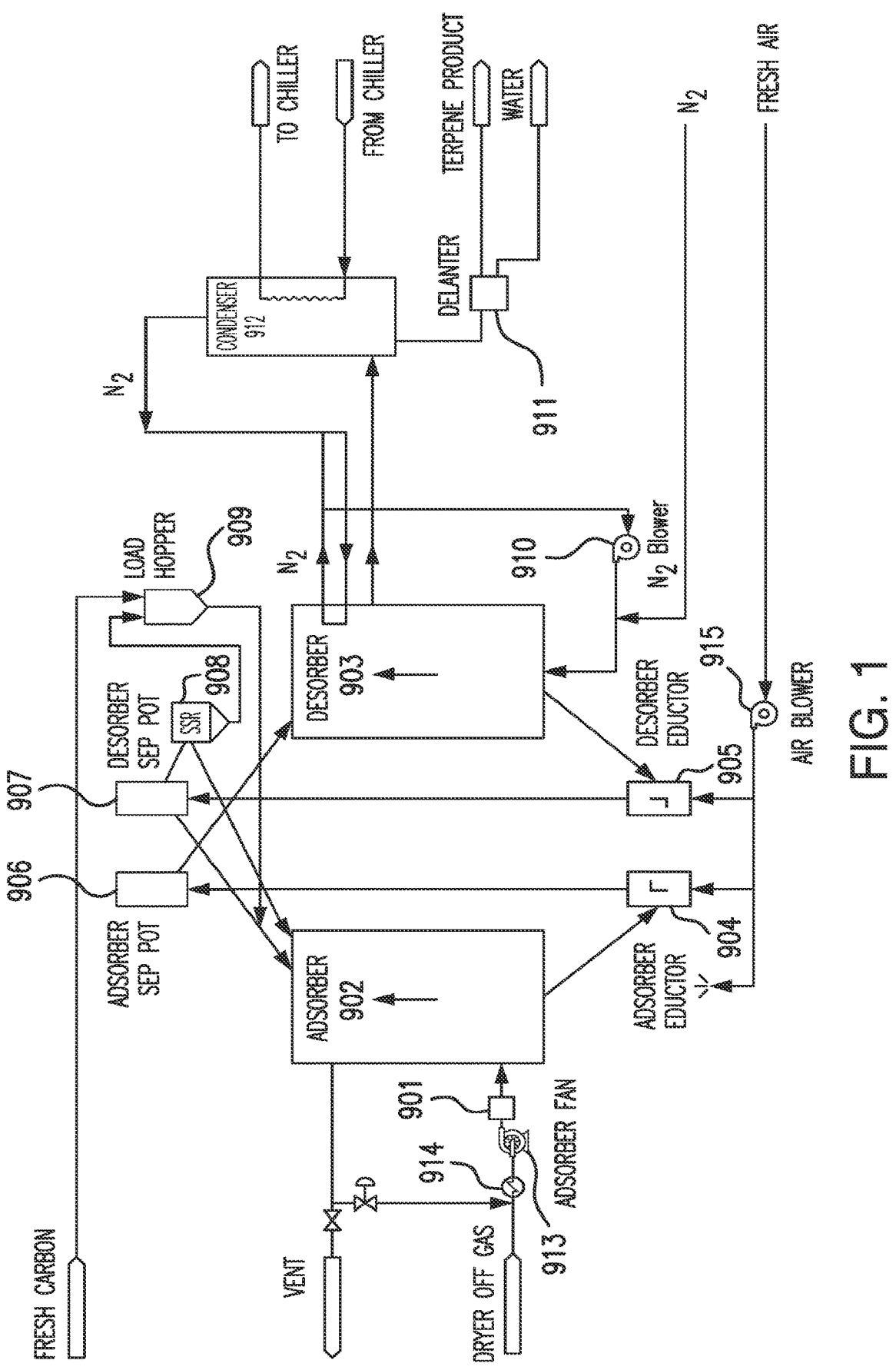

FIG. 1 provides an illustrative overview of a non-limiting example of a process flow schematic in accordance with embodiments of the present disclosure. In FIG. 1, an exhaust stream, such as that from a wood dryer, is optionally heated in a heat exchanger 914 located upstream of an adsorber fan 913. Upon heating, the exhaust stream then optionally passes through a pre-treatment unit 901 as described in the presently disclosed subject matter, where certain particulate matter and/or VOCs, can be filtered or removed from the exhaust stream. Alternatively, in certain embodiments, an exhaust stream, such as that from a wood dryer, can pass through an adsorber fan located upstream of a pre-treatment unit optionally including a heat exchanger for heating the exhaust stream.

Fresh sorbent, such as but not limited to fresh carbon, is supplied to a load hopper 909. The load hopper 909 houses sorbent until the sorbent is needed and fed to an adsorber 902.

After the exhaust stream is pre-treated in the pre-treatment unit 901, it can be routed into an adsorber 902 at an inlet location toward the bottom of the adsorber 902. A separate sorbent stream from a load hopper 909 and/or a desorber separation pot 907 is fed to the adsorber 902 at an inlet location toward the top of the adsorber 902. In the adsorber 902, the upflowing exhaust stream is contacted with the downflowing sorbent stream, and certain compounds, emissions particulates, VOCs, and/or HAPs are adsorbed onto the sorbent. A clean exhaust stream, which is exits at the top of the adsorber 902 can be vented to a downstream location and/or to the atmosphere.

Spent sorbent exits the adsorber 902 and is directed to, for example and not limitation, an adsorber eductor 904 or airlift blower, to which fresh air can be supplied by an air blower 915. The spent sorbent stream is directed to an adsorber separation pot 906 or adsorber separator before spent sorbent enters a desorber 903. Spent sorbent containing adsorbed emissions particulates and compounds from an upstream wood drying process is desorbed in the desorber 903, which releases adsorbed materials from the spent sorbent. A nitrogen blower 910, supplied from a nitrogen source, recirculates nitrogen and air flow through the desorber 903 to facilitate desorption of the sorbent. The VOCs can be further passed through a secondary adsorber in desorber.

Reactivated sorbent that has been desorbed in the desorber 903 can be routed via a desorber eductor 905 to a desorber separation pot 907 or desorber separator. Reactivated sorbent, which has had adsorbed materials removed by the desorber 903, can be circulated and fed back into the adsorber 902 to adsorb exhaust stream.

A slip stream or side stream from the desorber separation pot 907 can be routed to a side stream reactivator 908. The side stream reactivator 908 provides further sorbent reactivation, releasing any additional adsorbed materials from the sorbent that was not desorbed and removed in the desorber 903. Reactivated sorbent from the side stream reactivator 908 is then routed to load hopper 909 or adsorber 902, and can be supplied to the adsorber 902 as sorbent is needed.

The desorber 903 can also be coupled to a condenser 912. A mixture stream of desorbed materials and nitrogen is routed from the desorber 903 to the condenser 912. A chiller or other cooling source can provide heat exchange in the condenser 912. Nitrogen separated from desorbed materials, including terpenes, is recycled and circulated from the condenser 912 back to the desorber 903. Desorbed materials, such as terpenes, is routed from the condenser 912 to a decanter 911 used primarily to separate the water from the terpenes. Recovered terpene products can then be stored for further commercial purposes. Alternatively, a mixed stream of desorbed materials and nitrogen can be routed to an incinerator to incinerate VOCs. Such process, although economically viable, can be less desirable for not providing recovery of terpenes and increasing greenhouse gas emissions.

5.2.2 Sources of Exhaust Streams

The systems and methods of the present disclosure can be used to recover terpenes from exhaust streams from various wood drying operations. Wood drying is used during the processing and manufacturing of many wood-based products to control moisture content, and can sometimes occur at multiple stages within various manufacturing processes. Drying wood can make it more suitable for construction or woodworking purposes, or reduce moisture content to increase the combustibility of the wood.

For example, and not limitation, wood dryers can be used during the manufacturing of construction materials, including, but not limited to, oriented strand board (OSB or flakeboard), plywood, fiberboard (including medium-density fiberboard or MDF), particle board, lumber, scrimber, hardboard, parallel strand lumber, laminated wood products (such as laminated timber, laminated veneer, laminated strand board, laminated strand lumber, and cross-laminated timber), wood composites (including transparent wood composites), and various beams, joints, trusses, and other wood products. Additionally, wood dryers can be used in the manufacturing of wood-based biofuels, such as wood pellets. Thus, as embodied herein, the exhaust stream can be obtained from one or more of these manufacturing processes, or any other manufacturing process involving the drying of wood. In particular embodiments, the wood drying process occurs during the manufacture of oriented strand board and/or plywood, and wood pellets.

In large-scale manufacturing processes, wood dryers can be ovens or kilns that can heat wood over a certain period of time. In certain embodiments, rotary dryers can be used, including single- or multi-pass rotary dryers. Alternatively, one or more flash tube dryers can be used. Some operations recycle a portion of the dryer exhaust gas back into the entrance of the dryer as a dryer energy reduction, emissions control, and wood drying control measure. The dryers can be heated indirectly, e.g., using steam, or directly fired, e.g., with wood, natural gas, and/or fuel oil burners. The wood being dried can be in any suitable form during heating, including, by way of example and not limitation, as logs, veneers, boards, pellets, chips, flakes, pulp, etc. The drying process is typically controlled based on the supply (mass flow) of wood to the wood dryers, which can ensure even heating, and temperature controls, to minimize moisture and prevent overheating. The drying process can be controlled based on the outlet temperature of the dryer (which can be a function of moisture release, e.g., in rotary dryers). The outlet temperature can be based, for example and not limitation, on wet bulb temperature, dry bulb temperature, relative temperature, or the moisture of the wood outputted from the dryer. In certain embodiments, the temperature can be measured and controlled at two or more points along the length of the drying cycle to create a drying profile. As such, temperature and/or moisture sensors can be placed within the dryer and/or at the dryer outlet and/or inlet. A person of skill in the art will appreciate that the type of control can be based on the type of dryer or kiln used in the wood drying process. In certain processes, the wood can be air dried or humidified (e.g., sprayed with water) prior to drying to ensure that all wood supplied to the wood dryer has similar moisture content.

As wood is heated during the drying process, it is known to release several VOCs and their thermal decomposition products into the dryer exhaust streams. For example and not limitation, such VOCs and thermal decomposition products can be found in the lignin, cellulose, hemicellulose, and resin of trees. Many of these VOCs are terpenes or turpentine, although the exhaust can also include other HAPs. Commonly-found HAPs include formaldehyde, methanol, phenol, acrolein, acetaldehyde, and/or propionaldehyde, although other HAPs can also be found in the process exhaust stream. Exhaust from wood drying processes can additionally include air and steam, and can further include undesirable emissions other than VOCs and HAPs, such as particulate matter, carbon monoxide, carbon dioxide, $NO_x$ emissions, and/or inorganic emissions, such as inorganic compounds containing potassium, silicon, sulfur, chlorine, calcium, manganese, magnesium, antimony, arsenic, beryllium, cadmium, chromium, cobalt, mercury, nickel, phosphorus, sodium, lead, rubidium, iron, copper, and/or zinc.

In the present disclosure, "process exhaust stream" is used to refer to exhaust released directly from a wood dryer, e.g., containing air, steam, VOCs, HAPs (such as formaldehyde, methanol, phenol, acrolein, acetaldehyde, and/or propionaldehyde), particulate matter, carbon monoxide, carbon dioxide, $NO_x$, and/or inorganic compounds. As embodied herein, and for example and not limitation, the volume of the process exhaust stream supplied to a downstream adsorber can range from about 50 cfm to about 500,000 cfm, or from about 100 cfm to about 500,000 cfm, or from about 500 cfm to about 500,000 cfm, or from about 1,000 cfm to about 500,000 cfm, or from about 10,000 cfm to about 500,000 cfm, or from about 20,000 cfm to about 100,000 cfm, or from about 50,000 cfm to about 100,000 cfm, or from about 100,000 cfm to about 500,000 cfm, or from about 100,000 cfm to about 300,000 cfm. In certain embodiments, the volume of the process exhaust stream supplied to a downstream adsorber can range from about 75 cfm to about 200,000 cfm, or from about 100 cfm to about 100,000 cfm, or from about 125 cfm to about 90,000 cfm, or from about 150 cfm to about 80,000 cfm, or from about 175 cfm to about 70,000 cfm, or from about 200 cfm to about 60,000 cfm, or from about 225 cfm to about 50,000 cfm, or from about 250 cfm to about 40,000 cfm, or from about 275 cfm to about 30,000 cfm, or from about 300 cfm to about 20,000 cfm, or from about 300 cfm to about 10,000 cfm. In certain embodiments, the volume of the process exhaust stream supplied to a downstream adsorber can be from about 250 cfm to about 325 cfm. In particular embodiments, the volume of the process exhaust supplied to a downstream adsorber can be about 300 cfm.

The content and composition of the process exhaust stream can depend on the type of wood used, as wood drying processes are applied to a large number of different woods. Such woods include, but are not limited to, softwoods, such as cedars, firs, spruces, pines, larch, hemlock, juniper, redwood, and yew, and/or hardwoods, such as birches, elms, maples, eucalyptus, alder, ash, aspen, oak, poplar, bamboo, basswood, beech, cottonwood, and willow. Additionally, various other factors can affect the content and composition of the exhaust stream, including, but not limited to, the age of the wood and its geographic source. Environmental, harvesting (from cutting to drying), and weather conditions before and after harvesting the wood can also impact the composition of the exhaust stream when the wood is dried.

5.2.3 Desorbers

As embodied herein, a system for controlling terpene composition includes a desorber which can receive a spent sorbent from an upstream adsorber containing adsorbed emissions from a wood drying process. The desorber can release adsorbed materials from the sorbent, e.g., using thermal desorption, supercritical $CO_2$ desorption, solvent extraction, and/or steam stripping.

Materials adsorbed on the sorbent can include VOCs (e.g., terpenes), HAPs, and/or particulate matter from a wood drying process. The sorbent can be any sorbent that is suitable for removing these emissions from an exhaust stream from the wood drying process. For example, and without limitation, the sorbent can include beads, particles, or a combination thereof. The sorbent can be made of any suitable material, including, but not limited to, carbon (including activated carbon), zeolite, silica (e.g., fumed silica or silica gel), purolytic synthetic material, polymeric material, activated alumina, bauxite, clays (e.g., amorphous, crystalline, and/or mixed layer clays), iron oxide, magnesium oxide, magnesium silicate, molecular sieves, zirconium oxide, and combinations thereof. In certain embodiments, the beads or particles can be nanoporous, including microporous (e.g., having a pore size less than 2 nm), mesoporous (e.g., having a pore size from 2 nm to 50 nm), and/or macroporous (e.g., having a pore size greater than 50 nm) beads and particles. In certain embodiments, the sorbent can comprise activated carbon, including bead activated carbon (BAC). Activated carbon can also be in the form of carbon fiber, chop, felt, or yarn, or can be powdered, granularized, pelletized, or embedded in a cloth. As embodied herein, the activated carbon can optionally be impregnated to improve adsorption efficiency, e.g., of one or more specific VOCs.

Examples of activated carbon suitable for use with the present disclosure include, but are not limited to, Bead-Shaped Activated Carbon (from Kureha America, LLC) or other forms of spherical activated carbon (such as those available from Blucher GmbH). In certain embodiments, the sorbent can comprise polymer materials, such as those described in U.S. Pat. Nos. 8,999,202; 9,133,295; 9,133,337; 9,464,162; 9,598,525; 9,714,172; U.S. Patent Pub. No. US20130209348A1; and U.S. Patent Pub. No. US20150329364A1, the contents of which are hereby incorporated by reference in their entireties. In certain embodiments, the sorbent can comprise Dowex resin beads (from Dow Chemical Company).

Sorbents for use in the present disclosure can have any suitable size and shape. For example, the sorbent can be spherical, granular, pelletized, or a combination thereof. As used herein, the term "beads" refers to a generally spherical sorbent. The size of the sorbent can be from about 10 microns to about 10 mm, or from about 10 microns to about 4 mm, or from about 10 microns to about 800 microns, or from about 400 microns to about 700 microns.

Generally, the amount of the sorbent can be selected based on the expected amount of material to be adsorbed. For example, the capacity of the sorbent can be up to about 75%, or up to about 50% of the initial weight of the sorbent. In certain embodiments, it is preferred that the amount of material adsorbed during operation is from about 10% to about 50%, or from about 15% to about 33%, or at least about 20% of the initial weight of the sorbent. In particular embodiments, the amount of material adsorbed during operation can be about 35% of the initial weight of the sorbent. Generally, the amount of the sorbent can be selected based on the expected amount of material to be adsorbed. For example, in certain embodiments, the weight of sorbent can be from about 2 times to about 10 times, or from about 5 times to about 7 times, the weight of material expected to be adsorbed.

Sorbent particles can also be defined by their density, bulk density, void fraction, size distribution, and terminal velocity. For example, and not limitation, the apparent density of the virgin sorbent can be from about 0.1 g/mL to about 5 g/mL, or about 0.2 g/mL to about 2 g/mL, or about 0.3 g/mL to about 1 g/mL, or about 0.6 g/mL. The apparent density of spent sorbent or reactivated can be greater than that of virgin sorbent, e.g., from about 0.5 g/mL to about 1.5 g/mL, or from about 0.6 g/mL to about 0.9 g/mL. During operation, the apparent density of the sorbent can be from about 0.1 g/mL to about 1.5 g/mL, or from about 0.5 g/mL to about 1 g/mL, or from 0.78 g/mL to about 0.81 g/mL, or from about 0.81 g/mL to about 0.813 g/mL, or from about 0.55 g/mL to about 0.9 g/mL, or from about 0.6 g/mL to about 0.8 g/mL, or from about 0.6 g/mL to about 0.7 g/mL. In certain embodiments, the apparent density of the sorbent can be about 0.6 g/mL, or about 0.62 g/mL, or about 0.64 g/mL, or about 0.66 g/mL, or about 0.68 g/mL, or about 0.7 g/mL, or about 0.72 g/mL, or about 0.74 g/mL, or about 0.76 g/mL, or about 0.78 g/mL, or about 0.785 g/mL, or about 0.8 g/mL, or about 0.803 g/mL, or about 0.805 g/mL, or about 0.81 g/mL, or about 0.81 g/mL. In certain embodiments, the apparent density of the sorbent is maintained at or below 0.79 g/mL, or at or below 0.785 g/mL, or at or below 0.78 g/mL, or at or below 0.775 g/mL, or at or below 0.77 g/mL, or at or below 0.765 g/mL, or at or below 0.76 g/mL, or at or below 0.755 g/mL, or at or below 0.75 g/mL. As embodied herein, the apparent density can be measured by the ASTM Standard Test Method for Apparent Density of Activated Carbon (Designation D 2854-96), the contents of which are hereby incorporated by reference in their entirety. In certain embodiments, the bead density of the sorbent can be from about 0.4 g/mL to about 0.7 g/mL or from about 0.5 g/mL to about 0.7 g/mL. In particular embodiments, the bead density of the sorbent can be about 0.584 g/mL, about 0.603 g/mL, about 0.6 g/mL, about 0.611 g/mL, about 0.618 g/mL, about 0.630 g/mL, or about 0.633 g/mL.

In certain embodiments, the Brunauer-Emmett-Teller (BET) surface area of the virgin sorbent can be from about 500 $m^2$/g to about 2000 $m^2$/g, or from about 700 $m^2$/g to about 1500 $m^2$/g, or from about 1000 $m^2$/g to about 1200 $m^2$/g, whereas the BET surface area of the spent sorbent can be less than about 20 $m^2$/g, or less than about 15 $m^2$/g, or less than about 10 $m^2$/g.

The desorber can include one or more beds to which spent sorbent can be provided, and in which the desorption can occur. For example, and not limitation, packed moving beds and fluidized beds are suitable for use in the presently disclosed desorbers. Alternatively, in certain embodiments, a rotary calciner can be used in the desorber, such that the rotation of the rotary calciner creates a falling bed. As embodied herein, and in certain embodiments, sorbent from the adsorber can be directed to two or more beds within the desorber using a distributor. In certain embodiments, the beds can be generally tubular. In certain embodiments, the desorber includes packed moving beds. The capacity of the desorber can be controlled by adjusting the number and the diameter and length of the beds.

As embodied herein, an inert gas stream can be provided to the desorber via a gas line. In particular embodiments, the inert gas stream can be provided to the desorber via a blower. The inert gas can reduce the presence of oxygen in the desorber, reducing the chance of auto-ignition of released volatile compounds. In certain embodiments, the inert gas stream can be maintained at an operational makeup pressure between about 30 inches of water to about 50 inches of water, between about 35 inches of water to about 45 inches of water, or between about 37 inches of water to about 43 inches of water. In certain embodiments, the operational recirculation rate of the inert gas stream can be maintained between about 7 cfm to about 11 cfm, between about 8 cfm to about 10 cfm, or between about 8.5 cfm to about 9.1 cfm. In particular embodiments, the operational recirculation rate of the inert gas stream can be maintained at about 7 cfm, about 8 cfm, about 9 cfm, about 10 cfm, or about 11 cfm. The inert gas stream can be supplied into the system by a blower having an operational blower outlet pressure maintained between about 26 inches of water to about 34 inches of water, from about 28 inches of water to about 34 inches of water, or from about 29 inches of water to about 32 inches of water.

Suitable inert gases include, but are not limited to, nitrogen ($N_2$), liquid supercritical $CO_2$, and superheated steam. In particular embodiments, the inert gas comprises nitrogen ($N_2$). After release of volatile compounds, the gaseous stream within the desorber can remain predominantly inert gas, e.g., at least 95 wt-% or at least 98 wt-% nitrogen ($N_2$). The inert gas can thus act as a carrier gas to transport desorbed terpenes to a cooling system, e.g., via one or more transport lines. When cooled, the recovered terpenes can be condensed from the inert gas, and the inert gas can be recycled, further routed for downstream processing, and/or released into the atmosphere. Thus, the presently disclosed system can further include one or more recycle lines, alternative processing lines, and/or vents for transporting inert gas from the cooling system.

Figure 2:
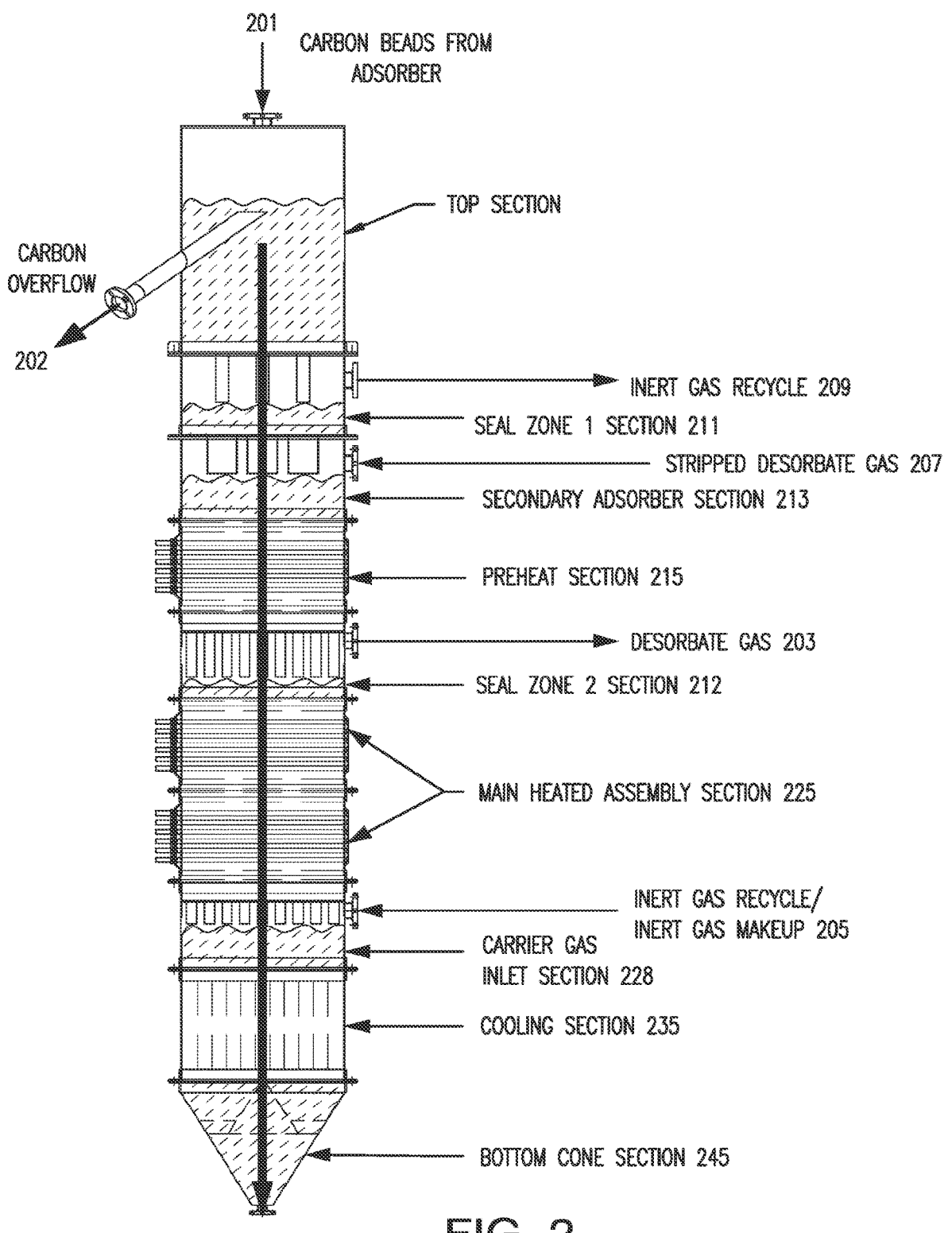

Additionally, in embodiments based on thermal desorption, the bed(s) can be provided with seal sections, and the capacity of the desorber can be further controlled by adjusting the relative amount of the bed(s) open to desorption versus closed by the seal sections. Generally, the configuration of one or more beds within the desorber can be designed to improve flow of sorbent and prevent plugging of the desorber. For the purpose of illustration and not limitation, FIG. 2 provides a schematic of a desorber in accordance with the presently disclosed subject matter. As shown in FIG. 2, spent sorbent 201 containing adsorbed material can be provided towards the top of the desorber. An exit for overflow 202 can be provided to remove any excess sorbent that accumulates at the top of the desorber, and also ensure the desorber remains full of sorbent.

Sorbent can flow downwards through the desorber to a first set of seal tubes 211. The seal tubes 211 can form a seal to prevent air from entering and increasing the oxygen content of gas in a preheat section 215 below the first set of seal tubes 211. In the preheat section 215, the sorbent is pre-heated (e.g., up to about the flash point of the adsorbed terpenes, or above the flash point of adsorbed terpenes but in the presence of inert gas) but the adsorbed material is not yet desorbed. Preheating the sorbent can facilitate removal of water from sorbent in upper section of the desorber. In some embodiments, water can be released in the preheating section. In certain embodiments, sorbent can be preheated to a temperature in a range of from about 100° F. to about 400° F., from about 200° F. to about 400° F., or from about 210° F. to about 400° F. For example and not by limitation, sorbent can be preheated to a temperature of about 125° F., or about 150° F., or about 175° F., or about 200° F., or about 225° F., or about 250° F., or about 275° F., or about 300° F.

The sorbent then flows downwards to a main heating section 225 for desorption. The main heating section 225 is isolated from the preheat section 215 with a second set of seal tubes 212. Following desorption, the sorbent can be fed to a cooling section 235 and removed from the desorber, e.g., and recycled back to an adsorber or sorbent reactivation system. The sorbent can be removed via a bottom section 245, which can have an overall conical shape to facilitate the movement of sorbent. In certain embodiments, the bottom section 245 of the desorber has a cooling capability to cool the sorbent prior to reintroduction into an adsorber coupled with the desorber. Such a cooling capability can further enhance adsorption and emission control because cooling the sorbent makes it less likely to desorb VOCs when reintroduced into the adsorber.

Within the desorber, the sorbent can encounter countercurrent flow with an inert gas, such that the inert gas strips the sorbent of the adsorbed material. For example, as shown in FIG. 2, the inert gas 205 can enter at a carrier gas inlet section 228 located below the main heating section 225. The inert gas can flow upwards, counter to the sorbent, and exit as a recycle stream 209 above the main heating section 225, preferably above the pre-heating section 215, such that it provides an inert environment as the sorbent is heated.

The desorbed gaseous stream 203 can exit the desorber immediately above the main heating section 225 such that desorbed terpenes are not fed to the preheat section 215. The desorbed gaseous stream can be sent to a downstream condenser for terpene recovery and after being stripped of terpenes and other VOCs, the gaseous stream can be recycled back to the desorber. For example, the recycled gaseous stream 207 can be recycled to a secondary adsorber section 213 for further recovery of terpenes and/or purification of the gaseous stream. In alternative embodiments, the desorbed gaseous stream 203 can be incinerated.

The desorber can further include various components to control the process conditions during desorption. In certain embodiments, the desorber can include a heater or heat exchanger to control the temperature within the desorber. For example, in particular embodiments, an electrical immersion heater can be used within the desorber, which can minimize temperature variation within the desorber. In alternative embodiments, oil, natural gas, or superheated steam can be used to heat the desorber.

For example, in certain embodiments a hot oil can be circulated to indirectly heat the contents of the desorber. For example, and as known in the art, the wood drying and manufacturing processes disclosed herein can include the use of hot oil, e.g., in presses used in the manufacture of various wood products including oriented strand board. Such hot oil can be circulated to the desorber for heating.

In alternative embodiments, at least one heat exchanger having a tube and shell configuration can be used within the desorber. In particular embodiments, such configuration can increase uniform temperature control and consistency within the desorber. Such desorbers include thermal oil heated desorbers. For example, in certain embodiments, in the desorber, sorbent can form on a moving bed flowing downward through a tube and shell heat exchanger to heat the sorbent. After heating, the moving bed can pass over a carrier gas diffuser and enter a cooler as desorbed or clean activated sorbent. The cooler can be a tube and shell heat exchanger designed to remove the previously added heat from the sorbent. After the heat is removed, the sorbent is desorbed and transferred back to the adsorber.

In certain embodiments, a preheater can be used to heat sorbent in order to release water from the sorbent in an upper section of the desorber. Such system can be operated between about 212° F. and a boiling point of an organic solvent to be collected. For example and not by way of limitation, the preheater can be maintained at a temperature of from about 212° F. to about 300° F., from about 212° F. to about 250° F., or at about 225° F.

In certain embodiments, the operating temperature of the desorber can be maintained at about 600° F., or at about 575° F., or at about 550° F., or at about 525° F., or at about 500° F., or at about 475° F., or at about 450° F., or at about 437° F., or at about 430° F., or at about 425° F., or at about 410° F., or at about 400° F., or at about 375° F., or at about 350° F., or at about 325° F., or at about 300° F. In embodiments of the present disclosure, the operating temperature of the desorber can be maintained between about 320° F. to about 530° F., about 360° F. to about 450° F., or between about 365° F. to about 445° F., or between about 370° F. to about 440° F., or between about 375° F. to about 435° F., or between about 380° F. to about 430° F., or between about 385° F. to about 425° F., or between about 390° F. to about 420° F., or between about 390° F. to about 430° F., or between about 395° F. to about 415° F. In certain embodiments, the operating temperature of the desorber can be maintained at about 400° F., about 410° F., or about 430° F.

The operating pressure of the desorber can be adjusted and maintained by a person of ordinary skill in the art. In certain embodiments, the operating pressure of the desorber can be maintained between about 1 inch of water to about 110 inches of water, about 1 inch of water to about 100 inches of water, about 15 inches of water to about 100 inches of water, about 50 inches of water to about 100 inches of water, about 75 inches of water to about 100 inches of water, about 15 inches of water to about 50 inches of water, about 25 inch of water to about 50 inches of water, about 25 inches of water to about 35 inches of water, about 28 inches of water to about 32 inches of water, or between about 1 inch of water to about 40 inches of water, or between about 2 inches of water to about 40 inches of water, or between about 2 inches of water to about 35 inches of water, or between about 3 inches of water to about 22 inches of water, or between about 3 inches of water to about 20 inches of water, or between about 4 inches of water to about 18 inches of water, or between about 4 inches of water to about 15 inches of water, or between about 5 inches of water to about 12 inches of water, or between about 5 inches of water to about 10 inches of water, or between about 5 inches of water to about 8 inches of water. In particular embodiments, the operating pressure of the desorber can be maintained at about 20 inches of water, about 25 inches of water, about 28 inches of water, about 29 inches of water, about 30 inches of water, about 31 inches of water, about 32 inches of water, or about 35 inches of water.

The desorber can optionally include one or more additional components. For example, the desorber can include a fire suppression system to reduce the likelihood of deflagration within the desorber. For example, $CO_2$ or $N_2$ suppression can be used. Other fire suppression systems are also suitable for use with the presently disclosed desorber, including Peltier (thermoelectric) cooling systems (preferably made of metal) and Halon suppression systems. Additionally or alternatively, the desorber can include various valves, which can act as safety features to prevent deflagration within the desorber.

In certain embodiments, fire containment features can be included in the system, e.g., within or around the desorber. For example, the desorber can include fire resistant foam insulation, or can be disposed in a fireproof environment, such as a cement enclosure or underground.

5.2.4 Systems for Conveying Sorbent

As embodied herein, the system can further include components for providing the sorbent to and from the desorber. The components described herein can be used to automatically or manually load and unload sorbent from the desorber.

In certain embodiments, sorbent can be desorbed in a batch, semi-batch, or continuous process. In particular embodiments, the sorbent can be recirculated in a continuous process. Once desorbed, the sorbent can be returned directly or indirectly (e.g., after passing through a side stream reactivation process) to an adsorption system. Additionally or alternatively, sorbent can be periodically removed from the system for cleaning and reactivation prior to being reintroduced to the adsorption system.

The sorbent can be conveyed within the system using any suitable means, as known in the art. For example, and not limitation, sorbent can be conveyed using airlift eductors, fans, pneumatics, nozzles, etc. Advantageously, orifices can be included within airlift systems to minimize airflow variation and to minimize variation in sorbent transfer rate. In certain embodiments, airlift systems can be advantageously heated with heat trace and/or insulated to prevent water condensation within the airlift systems, which can prevent sorbent flow in the overall adsorption system. A sorbent sampling system can be provided in order to periodically examine, test, and sample the sorbent (e.g., for apparent density) and improve accuracy of the adsorption system.

One of ordinary skill in the art can adjust operating conditions such that sorbent can be transferred from and through the desorber. In certain embodiments, sorbent can be transferred through the desorber at a rate of from about 10 pounds per hour to about 100 pounds per hour, or from about pounds per hour to about 95 pounds per hour, or from about 20 pounds per hour to about 90 pounds per hour, or from about 25 pounds per hour to about 85 pounds per hour, or from about 30 pounds per hour to about 80 pounds per hour, or from about 30 pounds per hour to about 50 pounds per hour, or from about 35 pounds per hour to about 75 pounds per hour, or from about 35 pounds per hour to about 80 pounds per hour, or from about 40 pounds per hour to about 80 pounds per hour, or from about 45 pounds per hour to about 80 pounds per hour, or from about 50 pounds per hour to about 90 pounds per hour, or from about 50 pounds per hour to about 80 pounds per hour, or from about 55 pounds per hour to about 80 pounds per hour, or from about 60 pounds per hour to about 80 pounds per hour. A person of ordinary skill in the art will appreciate the operating conditions can be adjusted such that sorbent can be transferred through the desorber at a rate as needed (e.g., at 1000 pounds per hour or greater for larger systems).

5.2.5 Cooling Systems

Figure 3:
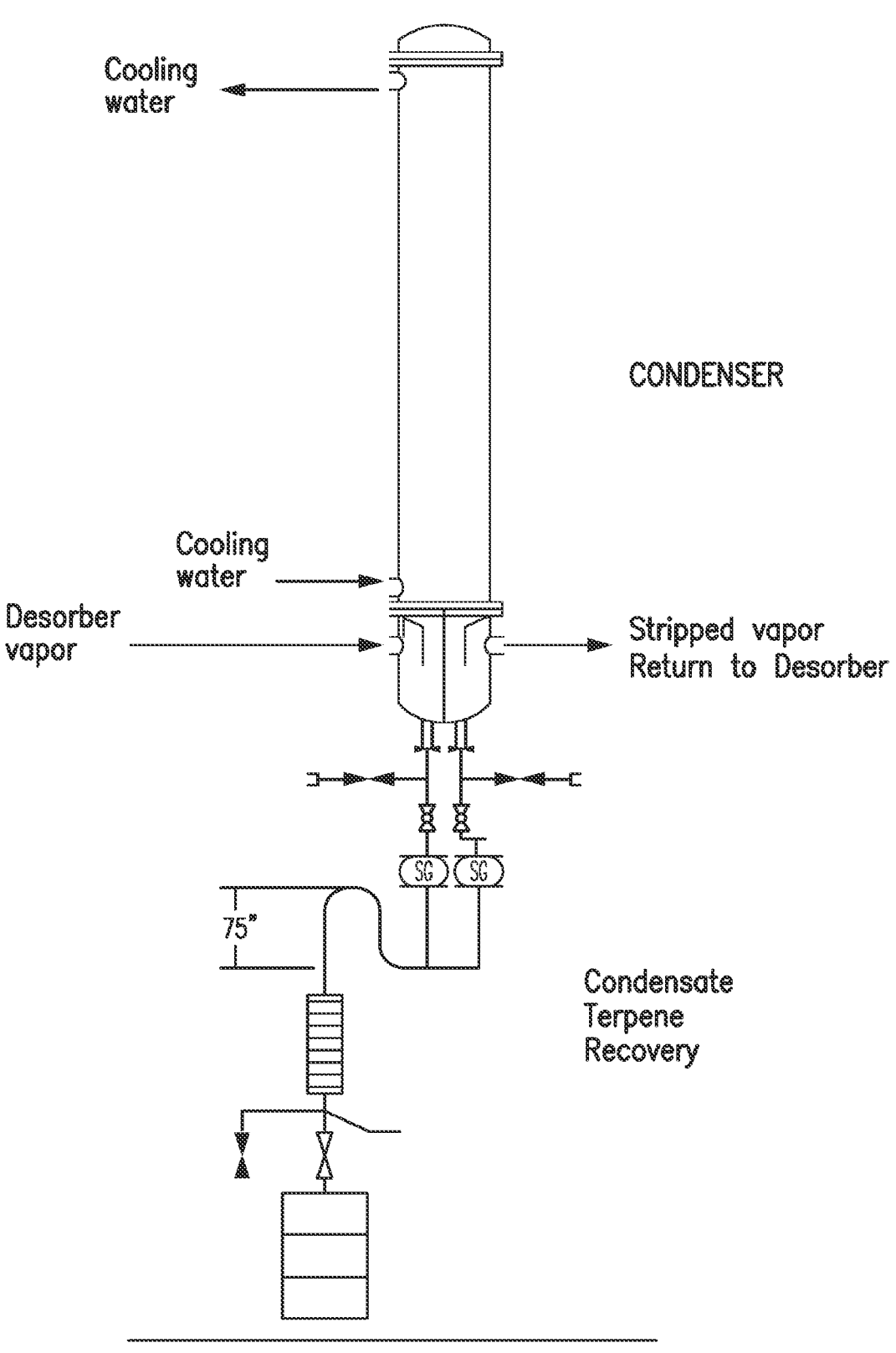

In certain embodiments, the desorbed gaseous stream from the desorber can be condensed into a liquid stream using a cooling system, such as a condenser. In the condenser, the hot gaseous stream can contact a condenser coil containing a chilled condenser fluid. For example and not limitation, FIG. 3 provides a schematic illustration of a cooling system including a condenser. As shown in FIG. 3, liquid condensate containing terpenes can be recovered at the bottom of the condenser. In particular embodiments, the condenser fluid can include water, e.g., water mixed with glycol, cooling tower water, or chilled water. Alternatively, the condenser can be air cooled. As embodied herein, the condenser can be cooled to an operating temperature of about 0° F. to about 125° F., preferably less than about 100° F. In certain embodiments, the condenser can be cooled to an operating temperature of about 120° F., or about 115° F., or about 110° F., or about 105° F., or about 100° F., or about 95° F., or about 90° F., or about 85° F., or about 80° F., or about 75° F., or about 70° F., or about 65° F., or about 60° F., or about 55° F., or about 50° F., or about 45° F., or about 40° F., or about 35° F., or about 30° F. The condenser can be coupled with a chiller (e.g., a gylcol chiller), which provides cooling to the condenser. As embodied herein, the condenser coupled with a chiller (i.e., a condenser chiller) can have an operating temperature of about 0° F. to about 50° F., about 40° F. to about 50° F., or about 32° F. to about 39° F. In certain embodiments, the condenser chiller can have an operating temperature of about 0° F., about 34° F., about 35° F., or about 45° F. The condenser chiller can have a pressure of about 41 psi to about 45 psi. In certain embodiments, the condenser chiller can have a pressure of about 43 psi. Additionally or alternatively, cooling of the gaseous stream can be effected using expansion (Venturi) cooling.

The gaseous stream can be passed through the cooling system for one, two, or more passes. In certain embodiments, the condenser is configured for one pass. In other certain embodiments, the gaseous stream passes through the cooling system at least twice. Additionally, once terpenes have been condensed from the gaseous stream, the stripped gaseous stream can be recycled back to the desorber e.g., as indicated in FIG. 3, for use as a carrier gas or to further adsorb terpenes using sorbent in the desorber (e.g., in the secondary adsorber section 213).

In certain embodiments, the condenser cooling liquid can optionally be recycled via a tempering pump to increase the heat removal efficiency of the condenser. The flow of cooling liquid and the amount that is recycled and/or removed can be controlled, for example and not limitation, by a pair of control valves based on the outlet temperature of the stripped gaseous stream.

5.2.6 Sorbent Reactivation

Over time, sorbent can become blocked from adsorbing efficiently due to buildup within pores or on the surface of the sorbent. Thus, the presently disclosed system can further include a sorbent reactivation system. Using the sorbent reactivation system, sorbent can be removed from the adsorber and cleaned. In certain embodiments, the sorbent can be stored in a load and/or storage hopper prior to reactivation. The sorbent reactivation system can be operated continuously, or in batch or semi-batch mode. For example, in particular embodiments, sorbent reactivation can take place continuously, such that a small side stream of sorbent is treated while the system is operating, i.e., in a side stream reactivator. In certain embodiments, the sorbent reactivation system can comprise at least one desorber, coupled with and arranged downstream of the adsorption system. In some embodiments, the sorbent reactivation system can comprise a desorber and at least one side stream reactivator unit.

Spent or used sorbent that is no longer efficiently adsorbing compounds in the adsorber can be directed to the desorber for treatment to remove and separate buildup within pores or on the surface of the sorbent. In addition to the desorber, some embodiments of the present disclosure also provide and maintain an amount of reactivated spent sorbent to the adsorber via a side stream reactivator (SSR). Such a sorbent reactivation system comprising a side stream reactivator is particularly beneficial when sorbent needs to be reactivated continuously for ongoing operations. As disclosed herein, benefits and advantages of a side stream reactivator include, but are not limited to, a continuous steady supply of reactivated sorbent to the adsorber, a reduction in the amount of fresh (i.e., virgin) sorbent needed for the adsorption system, management of particulate buildup on adsorber trays and plugging of downcomers, and an ability to monitor and maintain sorbent apparent density at a preferred and/or operationally desirable value. Further, by maintaining a certain sorbent apparent density, it is possible to control emissions of and particulate matter within a wood dryer exhaust stream as desired to be in compliance with environmental regulations and/or environmental requirements.

The presently disclosed subject matter has found that by maintaining a certain sorbent apparent density, the side stream reactivator can help the overall adsorption system achieve about 100% reduction efficiency, or at least about 99% reduction efficiency, or at least about 98% reduction efficiency, or at least about 97% reduction efficiency, or at least about 96% reduction efficiency, or at least about 95% reduction efficiency, or at least about 94% reduction efficiency, or at least about 93% reduction efficiency, or at least about 92% reduction efficiency, or at least about 91% reduction efficiency, or at least about 90% reduction efficiency of emissions from the exhaust stream at the adsorber inlet.

In certain embodiments, the side stream reactivator can provide reactivated sorbent at a rate between about 0.05% per day to about 10% per day, or between about 0.1% per day to about 10% per day, or between about 0.5% to about 10% per day, or between about 1% to about 10% per day, or between about 5% per day to about 8% per day. In certain embodiments, the side stream reactor can provide reactivated sorbent at a rate of about 6% per day, or at a rate of about 5% per day, or at a rate of about 4% per day, or at a rate of about 3% per day, or at a rate of about 2% per day, or at a rate of about 1% per day, or at a rate of about 0.9% per day, or at a rate of about 0.8% per day, or at a rate of about 0.7% per day, or at a rate of about 0.6% per day, or at a rate of about 0.5% per day, or at a rate of about 0.4% per day, or at a rate of about 0.3% per day, or at a rate of about 0.2% per day, or at a rate of about 0.1% per day, or at a rate of about 0.05% per day based on sorbent flow to the adsorber.

As an alternative to sorbent reactivation via the sorbent reactivation system as presently disclosed, virgin sorbent can be continuously introduced into the adsorption system at a rate of about 6% per day, or at a rate of about 5% per day, or at a rate of about 4% per day, or at a rate of about 3% per day, or at a rate of about 2% per day, or at a rate of about 1% per day, or at a rate of about 0.9% per day, or at a rate of about 0.8% per day, or at a rate of about 0.7% per day, or at a rate of about 0.6% per day, or at a rate of about 0.5% per day, or at a rate of about 0.4% per day, or at a rate of about 0.3% per day, or at a rate of about 0.2% per day, or at a rate of about 0.1% per day, or at a rate of about 0.05% per day based on sorbent flow to the adsorber.

As embodied herein, the sorbent can be reactivated using any suitable physical and/or chemical techniques. For example, sorbent can be reactivated (i.e., cleaned) by heating to thermally decompose organics, using a high velocity impact to release particulate matter. For further example, in particular embodiments, a side stream reactivator can heat sorbent between about 1000° F. to about 1600° F., or between about 1000° F. to about 1400° F., or between about 1400° F. to about 1600° F., or between about 1100° F. to about 1200° F., or between about 1400° F. to about 1500° F., or between about 1450° F. to about 1500° F. In particular embodiments, the side stream reactivator can heat sorbent to about 1000° F., about 1100° F., about 1200° F., about 1300° F., about 1400° F., about 1450° F., about 1500° F., or about 1600° F. In certain embodiments, the side stream reactivator can heat sorbet to at least about 1400° F., at least about 1450° F., at least about 1500° F., or at least about 1600° F. The side stream reactivator heats sorbent in nitrogen in the presence of water to clean organics from the sorbent by thermally destroying them and using the water and/or superheated steam to assist with the cleaning. An amount of water used can be from about 1% w/w to about 20% w/w, or about 1% w/w to about 10% w/w, or about 1% w/w to about 5% w/w, or about 10% w/w to about 20% w/w, or about 5% w/w to about 10 w/w %, on the basis of water to sorbent (e.g., carbon) being treated. In particular embodiments, an amount of water used can be about 1% w/w, about 5% w/w, about 10% w/w, about 15% w/w, or about 20% w/w, basis of water to sorbet (e.g., carbon) being used. The system can further include a capture system, such as a cyclone or wet scrubber, bag filter, wet electrostatic precipitator, or the like, to collect particulate matter. Alternatively, particulate matter can be combusted, e.g., in a burning boiler with any unburned particulate filtered from the boiler exhaust.

Additionally or alternatively, the sorbent can be chemically treated with water (e.g., steam), super critical carbon dioxide, and/or caustic solution. In certain embodiments, a non-oxygen atmosphere can be used to create pyrolysis on the sorbent or a solvent extraction system can be used for sorbent reactivation.

When the sorbent is chemically treated, it can be desorbed in a bed, such as but not limited to in a fixed bed, fluidized bed, or packed moving bed. In certain embodiments, the residence time of the sorbent within the bed of the adsorber can range from about 0.5 hours to about 4 hours. In certain embodiments, the sorbent can be used in the system with at least about 6 months, or at least about 1 year, between reactivations.

5.2.7 Additional Components

The systems of the present disclosure can further include other components and accessories, as known in the art.

For example, the presently disclosed systems can further include features to facilitate cleaning and maintenance. For example, access panels can be provided within one or more components, such as the wood dryer, the air treatment box, the adsorber, the desorber, the condenser, separator pots, the side stream reactivator (SSR), etc. for cleaning and maintenance. Additionally, lids, site glasses, covers, etc. can be provided within one or more components of the systems of the present disclosure.

Additionally, components can be situated within or downstream from the desorber to capture particulate matter. Such components can capture desorbed particulate matter and/or inorganic compounds, such as metals, that are not desorbed from the sorbent. For example, in certain embodiments, a cyclonic separator can be used to capture downstream particulate matter. For further example, a liquid stream side phase separation can also be used to capture particulate matter, alone or in combination with a clarifier, centrifuge, or filtration system.

As embodied herein, heat can be recovered from the desorber and used to pre-heat another stream. For example, the gaseous stream exiting the desorber can provide hot fluid for an economizer or heat exchanger that heats a stream entering an upstream adsorber or the stream containing spent sorbent that enters to the desorber.

In certain embodiments, a decanter can be used for oil/water phase separation of recovered terpenes and water. Additionally or alternatively, a rag layer of the recovered material can be floated or skimmed off, or chemically separated using one or more separation agents.

As embodied herein, the system can further include one or more bleed off valves or other release mechanisms for purging non-condensable gases from the system. Such non-condensable gases can accrue in the system over time, and under certain circumstances, will not be removed with the terpene stream. Thus, a bleed off valve or other release mechanism can be periodically triggered, automatically or manually, to remove non-condensable gases. The bleed off valve or other release mechanism can be positioned within the desorber or downstream from the desorber. Non-condensable components can include, but are not limited to, air and carbon dioxide, carbon monoxide, and certain low molecular weight HAPs. In certain embodiments, a purge system can be coupled to a burner, e.g., the burner used during drying operations, for removing and destroying such non-condensable components. Additionally or alternatively, a portion of the stripped gaseous stream from the condenser (which would contain the non-condensable gases) can be recycled to the adsorber and purged from the system with the exhaust stream exiting the adsorber.

Furthermore, as embodied herein, the systems can include one or more components for incinerating desorbed material, e.g., an incinerator, oven, kiln, flare, etc. For example, in certain embodiments, the gaseous stream from the desorber can be incinerated in its gaseous form (i.e., without being condensed first). Alternatively, a condensed terpene stream can be incinerated.

In certain embodiments, the presently disclosed system can further include features to facilitate in its cleaning and maintenance. For example, access panels and spray nozzles for introducing water and/or detergent solutions can be provided within the desorber to provide access to the bed(s) for cleaning and maintenance. Cleaning solutions exist in the art and within the field of the presently disclosed subject matter. For example and not limitation, cleaning solutions of the present disclosure can include trisodium phosphate, sodium hydroxide, potassium hydroxide, ammonium hydroxide, calcium hydroxide, magnesium hydroxide, Panel Bright, or the like.

In a non-limiting example of a scheduled cleaning, the equipment in need of cleaning is cooled. Any materials inside the equipment (e.g., sorbent) is emptied and/or removed by, for example, draining through an outlet nozzle of the equipment. Such removed materials can be collected into a container or filter bag as appropriate. The emptied sorbent can be stored in vessels (e.g., pails or drums) or alternatively transported to a load hopper via the eductor, airlift system, and separator pots. Sorbent can be additionally cleaned from the equipment in need of cleaning by brushing the equipment. The equipment in need of cleaning is isolated from upstream and downstream equipment through the close and lock of appropriate valves. The equipment internals are first rinsed with fresh water, for example, via manual water deluge located at the top of the equipment. A cleaning solution, such as, but not limited to, trisodium phosphate or Panel Bright is applied to the internals for approximately 30 minutes. The equipment is then rinsed again with fresh water to remove cleaning solution. An operator can perform a visual inspection of the equipment internals via sight glasses and determine whether the surfaces and/or undersides of the equipment internals have been cleaned. Multiple cycles of cleaning and rinsing with fresh water can be employed. When cleaning and rinsing is complete, the equipment can be connected to process fan(s) and/or airlift fan(s) as presently disclosed for drying. After the equipment is clean and dried, said equipment can be reconnected with upstream and downstream equipment via control and/or isolation valves. Materials can be reloaded into the equipment for start-up.

Various process controls can be used to ensure the safety and efficiency of the system. The process controls can be based on read outs from various measurement features, and can optionally be automatically triggered by certain threshold measurements. These process control features can include any suitable measurement or other process control accessory known in the art including, but not limited to, pressure indicators, pressure transmitters, pressure regulators, differential pressure cells, thermowells, temperature indicators, thermocouples, temperature switches, resistance temperature detectors, pH meters, flow meters, mass meters, turbine meters, flow monitors, flow regulators and valves, gas analyzers, LEL monitor, oxygen analyzer, humidity sensors, radar sensors, hopper level probes, ammeters, current meters, liquid level and level interface detectors (e.g., in a terpene collection system), photon ionization detectors (PID), solenoids, and/or drives (e.g., electrical drives). In certain embodiments, the process controls can be implemented using a programmable logic controller (PLC) and/or DCS system with both on and off-site access capability. Process controls include, but are not limited to, water deluge to extinguish fires, system shut downs, or heater shut downs, etc. For example, in the adsorber, sensors can be used to trigger water deluge to extinguish fires.

In particular embodiments, process controls can include in-line oxygen analyzers to monitor oxygen levels within the desorber. The system can further include one or more safety interlocks based on oxygen levels and/or temperature to intervene if the process conditions have an increased chance of auto-ignition or deflagration. For example, in certain embodiments, an oxygen analyzer can be coupled with a PLC. The PLC can send an alarm if the oxygen level rises above a set threshold, e.g., 2 wt-%. Additionally or alternatively, if the oxygen level rises above a higher threshold, e.g., 5 wt-%, the PLC can shut down the entire system until oxygen levels return to an acceptable range.

5.3 Methods of Recovering Terpenes

The present disclosure further provides methods of recovering and collecting target chemicals, compositions, or components thereof from exhaust streams. In a specific embodiment, the present disclosure provides methods of recovering terpenes from exhaust streams. Specifically, the exhaust streams can be derived from a wood drying process. Thus, the methods can include providing an exhaust stream to an adsorber and contacting the exhaust stream with a sorbent within the adsorber to generate the spent sorbent containing adsorbed material, e.g., terpenes. In certain embodiments, the exhaust stream can be pre-treated prior to adsorption. For example, the exhaust stream can be physically and/or chemically treated and, in particular, can be passed through one or more baffles, filters, screens, and/or perforated plates to remove particulate matter and other debris from the exhaust stream. Additionally or alternatively, the exhaust stream can be dehumidified and/or pre-heated prior to introduction to the adsorber. For example, and not limitation, the exhaust stream can be heated to reduce its relative humidity downstream from the dryer, but upstream from the adsorber.

Adsorption can occur when the exhaust stream is contact with the sorbent, which can adsorb one or more components from the exhaust stream. For example, and not limitation, the sorbent can adsorb VOCs, such as terpenes, HAPs (such as formaldehyde, methanol, phenol, acrolein, acetaldehyde, and/or propionaldehyde), and/or particulate matter, such as PM 2.5 particulate matter from the exhaust stream.

As discussed below, the present disclosure provides for the desorption of materials or chemicals adsorbed by the sorbents. As noted above, such materials can include targeted chemicals, such as terpenes.

5.3.1 Methods of Desorption

As embodied herein, the desorption can be carried out using a number of different techniques. For example, in certain embodiments, materials can be desorbed from the sorbent in nitrogen or another inert gas via thermal desorption. For example and not limitation, thermal energy can be provided via electric immersion heaters or thermal oil. Advantageously, thermal oil can minimize temperature variation. However, desorption can occur through various other mechanisms, including supercritical $CO_2$ desorption, solvent extraction, and steam stripping.

Following desorption, a gaseous terpene stream can be obtained from the desorber. This gaseous stream can contain desorbed terpenes, along with other desorbed materials, carried by the inert carrier gas. The terpenes and other desorbed materials can be in gaseous form, or alternatively, can be carried as small liquid droplets or solid particulates. In addition to terpenes, the desorbed materials can include other VOCs, HAPs (such as formaldehyde, methanol, phenol, acrolein, acetaldehyde, acetic acid, and/or propionaldehyde), other condensable compounds, and particulate matter, such as PM 2.5, PM 10, fatty acids, and fine particulate. In certain embodiments, the gaseous stream can be incinerated to destroy these desorbed materials such that terpenes are not recovered for downstream use.

However, in certain embodiments, the presently disclosed methods can further include recovering terpenes from the gaseous stream. In certain embodiments, other compounds, e.g., HAPs, condensable compounds, and particulate matter, can be recovered from the gaseous stream along with the terpenes. Alternatively, in certain embodiments, the gaseous stream can undergo additional separations to remove one or more of these components before or after condensation of terpenes from the gaseous stream. In particular embodiments, HAPs, such as formaldehyde, methanol, phenol, acrolein, acetaldehyde, and/or propionaldehyde, can be separately recovered from the gaseous stream, such that they are separated from the terpenes and suitable for downstream use. For example, multiple condensers operating at different temperatures can be used to selectively remove HAPs before or after condensing terpenes. In certain embodiments, HAPs and other water-soluble emissions (e.g., formaldehyde, methanol, or acetic acid) can be collected in an aqueous portion of condensate as to be at least partially separated from terpenes in systems and methods of the present disclosure. Additionally, and as noted above, layers of condensed water, terpenes, and organic fractions can be advantageously separated using a decanter.

Thus, the presently disclosed methods and systems can be used to recover a terpene stream. As embodied herein, the terpene stream can contain alpha-pinene and/or beta-pinene. For further example, and not limitation, the terpene stream can contain other terpenes such as camphene, fenchene, alpha-fenchene, limonene, o-cymene, p-cymene, alpha-terpineol, cis-beta-terpineol, trans-beta-terpineol, gamma-terpineol, p-allylanisole, tricyclene, p-xylene, vinylcyclohexen, 2-norpinene, terpilene, p-cymenene, fenchol, myrcene, terpinolene, cis-anethole, trans-anethole, caryophyellenes, alpha-phellandrene, beta-phellandrene, methyl chavicol, tricyclene, 1,4-cineole, 1,8-cineole, 3-carene, alpha-terpinene, gamma-terpinene, isoterpinolene, camphor, L-camphor, isoborneol, borneol, L-borneol, cis-1,8-terpin, and trans-1,8-terpin, camphenilone, fenchone, exo-fenchol, exo-2,7,7-trimethylbicyclo[2.2.1]heptan-2-ol, fenchyl acetate, borneol acetate, among others.

The recovered terpene stream can comprise from about 0 wt-% to about 100 wt-% alpha-pinene, or from about 1 wt-% to about 100 wt-% alpha-pinene, or from about 1 wt-% to about 50 wt-% alpha-pinene, or from about 1 wt-% to about 40 wt-% alpha-pinene, or from about 1 wt-% to about 30 wt-% alpha-pinene, or from about 1 wt-% to about 20 wt-% alpha-pinene, or from about 1 wt-% to about 10 wt-% alpha-pinene. Additionally or alternatively, the terpene stream can comprise from about 0 wt-% to about 50 wt-% beta-pinene, or from about 0 wt-% to about 40 wt-% beta-pinene, or from about 0 wt-% to about 30 wt-% beta-pinene, or from about 0 wt-% to about 20 wt-% beta-pinene, or from about 0 wt-% to about 10 wt-% beta-pinene.

As demonstrated in the Examples, it has been found that increased time and temperature within the desorber can lead to the thermal rearrangement of terpenes. For example, when alpha- and beta-pinenes are subjected to heat at higher temperatures and longer time periods, they can rearrange to dipentene (e.g., limonene), and camphene. Additionally, reducing the temperature of the desorber can decrease the likelihood of auto-ignition and improve the overall safety of the presently disclosed system and methods. Accordingly, in certain embodiments, the presently disclosed methods can include controlling the conditions of desorption, such as but not limited to temperature, to enhance the recovery of alpha-pinene and/or beta-pinene.

For example, in certain embodiments, the residence time of the terpenes within the desorber, i.e., the time period from when the spent sorbent enters the desorber with adsorbed terpenes to the time the released gaseous stream exits the desorber, is minimized. In certain embodiments, the total time the sorbent spends in the desorber can range from about 30 minutes to about 100 minutes, about 30 minutes to about 20 hours, from about 45 minutes to about 15 hours, from about 1 hour to about 12 hours, from about 2 hours to about 10 hours, from about 2 hours to about 8 hours, or from about 2 hours to about 6 hours. In particular embodiments, the sorbent can spend a total time of about 2.8 hours, about 7.5 hours, or about 10 hours in the desorber. In certain embodiments, the sorbent can spend a total time of at least about 30 minutes, at least about 1 hour, at least about 5 hours, or at least about 10 hours in the desorber.

In certain embodiments, the residence time in the heated section of the desorber can be less than about 4 hours, or less than about 3 hours, or less than about 2.5 hours, or less than about 2 hours, or less than about 1.75 hours, or less than about 1.5 hours, or less than about 1.25 hours, or less than about 1 hour, or less than about 45 minutes, or less than about 30 minutes, or less than about 15 minutes. For example and not by limitation, the time sorbent spends in the heated section of the desorber can be from about 15 minutes to about 4 hours, from about 20 minutes to about 3 hours, from about 25 minutes to about 2.5 hours, from about 30 minutes to about 2 hours, from about 30 minutes to about 1.75 hours, from about 30 minutes to about 1.5 hours, from about 30 minutes to about 1.25 hours, or from about 30 minutes to about 1 hour. Additionally, the temperature of desorption can be maintained within set thresholds.

For example, and not limitation, the temperature can be maintained at less than about 750° F., or less than about 700° F., or less than about 650° F., or less than about 600° F., or less than about 550° F., or less than about 500° F., or less than about 450° F., or less than about 400° F., or less than about 350° F. throughout desorption. In particular embodiments, the temperature can be maintained within a range of from about 300° F. to about 550° F., or from about 320° F. to about 530° F., or from about 350° F. to about 450° F., or from about 370° F. to about 430° F., or from about 390° F. to about 430° F.

Furthermore, in certain embodiments, the flow of the inert carrier gas during desorption can be modulated to control terpene composition. For example, higher gas flow rates can entrain sorbent and tend to move it during desorption, whereas lower flow rates can reduce the effectiveness of terpene removal from sorbent because organics can be desorbed, then re-adsorbed instead of being carried by the gaseous stream. In certain embodiments, the linear velocity or superficial flow velocity within the desorber can range from about 1 linear foot per minute to about 20 linear feet per minute, or from about 10 linear feet per minute to about 20 linear feet per minute, or from about 2 linear feet per minute to about 18 linear feet per minute, or from about 5 linear feet per minute to about 15 linear feet per minute, or about 8 linear feet per minute to about 10 linear feet per minute of gaseous flow. In particular embodiments, the linear velocity or superficial flow velocity within the desorber can be about 10 linear feet per minute, about 15 linear feet per minute, about 18 linear feet per minute, or about 18 linear feet per minute. In some embodiments, inert gas can be recycled to the desorber at a rate of between about 1 cfm to about 20 cfm, or between about 2 cfm to about 18 cfm, or between about 3 cfm to about 16 cfm, or between about 4 cfm to about 14 cfm, or between about 5 cfm to about 12 cfm, or between about 6 cfm to about 10 cfm, or between about 7 cfm to about 9 cfm, or about 8 cfm. In certain embodiments, inert gas can be recycled to the desorber at a rate of between about 8 cfm to about 12 cfm or between about 8 cfm to about 9 cfm. In particular embodiments, inert gas can be recycled to the desorber at a rate of about 8 cfm, about 8.5 cfm, about 9 cfm, or about 12 cfm.

When the residence time, temperature, and/or velocity and/or other process parameters are maintained as disclosed herein, the recovered terpenes can have increased alpha-pinene and beta-pinene content as compared to a terpene stream in which thermal rearrangement has occurred. In such embodiments, the desorbed terpenes in a condensed terpene stream can include a certain amount of alpha-pinene and beta-pinene, based on the total weight of terpenes in the recovered gaseous stream. For example, the collective amount of alpha-pinene and beta-pinene in the terpene stream can range from about 15 wt-% to about 100 wt-%, or from about 20 wt-% to about 99 wt-%, or from about 25 wt-% to about 95 wt-%, or from about 30 wt-% to about 90 wt-%, or from about 50 wt-% to about 100 wt-%, or from about 50 wt-% to about 99 wt-%, or from about 50 wt-% to about 97 wt-%, or from about 50 wt-% to about 95 wt-%, or from about 50 wt-% to about 90 wt-%. For example, in certain embodiments, the amount of alpha-pinene in the terpene stream can range from about 20 wt-% to about 97 wt-%, or from about 30 wt-% to about 97 wt-%, or from about 40 wt-% to about 97 wt-%, or from about 45 wt-% to about 97 wt-%. In particular embodiments, the amount of alpha-pinene in the terpene stream can range from about 31 wt-% to about 35 wt-%. Additionally or alternatively, the amount of beta-pinene in the terpene stream can range from about 5 wt-% to about 60 wt-%, or from about 10 wt-% to about 60 wt-%. In particular embodiments, the amount of beta-pinene in the terpene steam can range from about 13 wt-% to about 17 wt-%.

Additionally, in certain embodiments, the terpene stream can include less than about 15 wt-%, less than about 10 wt-%, or less than about 5 wt-% dipentene (e.g., limonene), e.g., from about 0 wt-% to about 20 wt-% dipentene. Additionally or alternatively, the terpene stream can include less than about 15 wt-%, less than about 10 wt-%, or less than about 5 wt-% camphene, e.g., from about 0 wt-% to about 15 wt-% camphene.

In certain embodiments, the recovered terpenes can be further purified and/or isolated using any suitable means as known in the art. For example, and not limitation, terpenes can be purified using thermal fractionation, chemical separation, liquid-liquid extraction, distillation, stripping, decanting, and/or further adsorption and desorption. In certain embodiments, the further purification can involve one or more chemical reactions, e.g., facilitated by a catalyst.

5.4 Benefits and Advantages

Thus, the systems and methods of the present disclosure provide for improved terpene compositions from wood drying processes, and can have numerous advantages. These terpene compositions having increased alpha-pinene and beta-pinene content can have similar or improved alpha-pinene and beta-pinene content as compared to naturally-sourced turpentine, e.g., turpentine distilled from wood resins such a crude sulfate turpentine (CST). Turpentine distilled from wood resins generally includes up to about 85 wt-% alpha-pinene, with smaller amounts of beta-pinene, e.g. up to about 30 wt-%. Turpentine also generally includes less than 15 wt-% of each of camphene and limonene, and other terpenes such as myrcene, terpinolene, alpha-terpineol, cis-anethole, trans-anethole, carophyellenes, beta-phellan-derene, methyl chavicol, 3-carene, and the like. For example, turpentine can include up to about 15 wt-%, or up to about 10 wt-% dipentene. Distilled turpentine can further include pine oil and residual wood resins.

The presently disclosed terpene compositions can have similar combined amounts of alpha-pinene and beta-pinene to such turpentine distilled from wood resins, which can make them suitable for similar applications, including for use in the fragrance and flavor industry, which typically requires relatively large amounts of these higher value terpenes. The terpene compositions can also be used in other industries, including as fuel or solvents, e.g., for paints and varnishes or for oilfield (e.g., Enhanced Oil Recovery or EOR) applications, or terpene compositions can be used in adhesive resins or traditional medicines (e.g., traditional Chinese medicines). Additionally, and as compared to turpentine, particularly turpentine obtained from the digestion of wood products such as crude sulphate turpentine (CST), the presently disclosed terpene compositions can be free of sulfur, as there is no sulfur present in the adsorbed materials or the recovered terpene stream.

Additionally, desorption according to the presently disclosed subject matter can have advantages as compared to other possible methods of separating terpenes from wood drying exhaust. For example, although liquid-liquid extraction can remove terpenes from exhaust, extractors are generally energy-intensive and require a large of amount of space. Additionally, extractors consume large amounts of solvent that must be supplied, regenerated, and disposed of. In contrast, desorption (particularly thermal desorption) in accordance with the presently disclosed subject matter can recover terpenes from a sorbent and can be released or recycled without further purification once the recovered terpenes are condensed or otherwise removed from the gaseous stream. Furthermore, steam desorption of sorbent could be utilized, however, such processes increase the amount of water generated and therefore require an outlet.

EXAMPLES

The following examples are merely illustrative of the presently disclosed subject matter; they should not be considered as limiting the scope of the subject matter in any way.

Example 1: Adsorption Trials with Fully Fluidized Fresh Beads

This Example describes a trial performed with full trays and fully fluidized beads using a process exhaust stream from a wood drying process, simulating an adsorption batch process.

About 300 cfm of an exhaust stream from a wood drying process was diverted to an air pre-treatment box using a process fan. The air pre-treatment box was configured to reduce particulate matter of the dryer exhaust. The discharge of the process fan had two balancing dampers to control the flow of the gaseous stream to activated carbon beads. The trial was run as the wood drying process was coming online. In the early stages of the process, 2 of the 5 dryers were running in the wood drying process, however, by about 2 hours into the trial, 4 of the 5 dryers were running.

Figure 4:
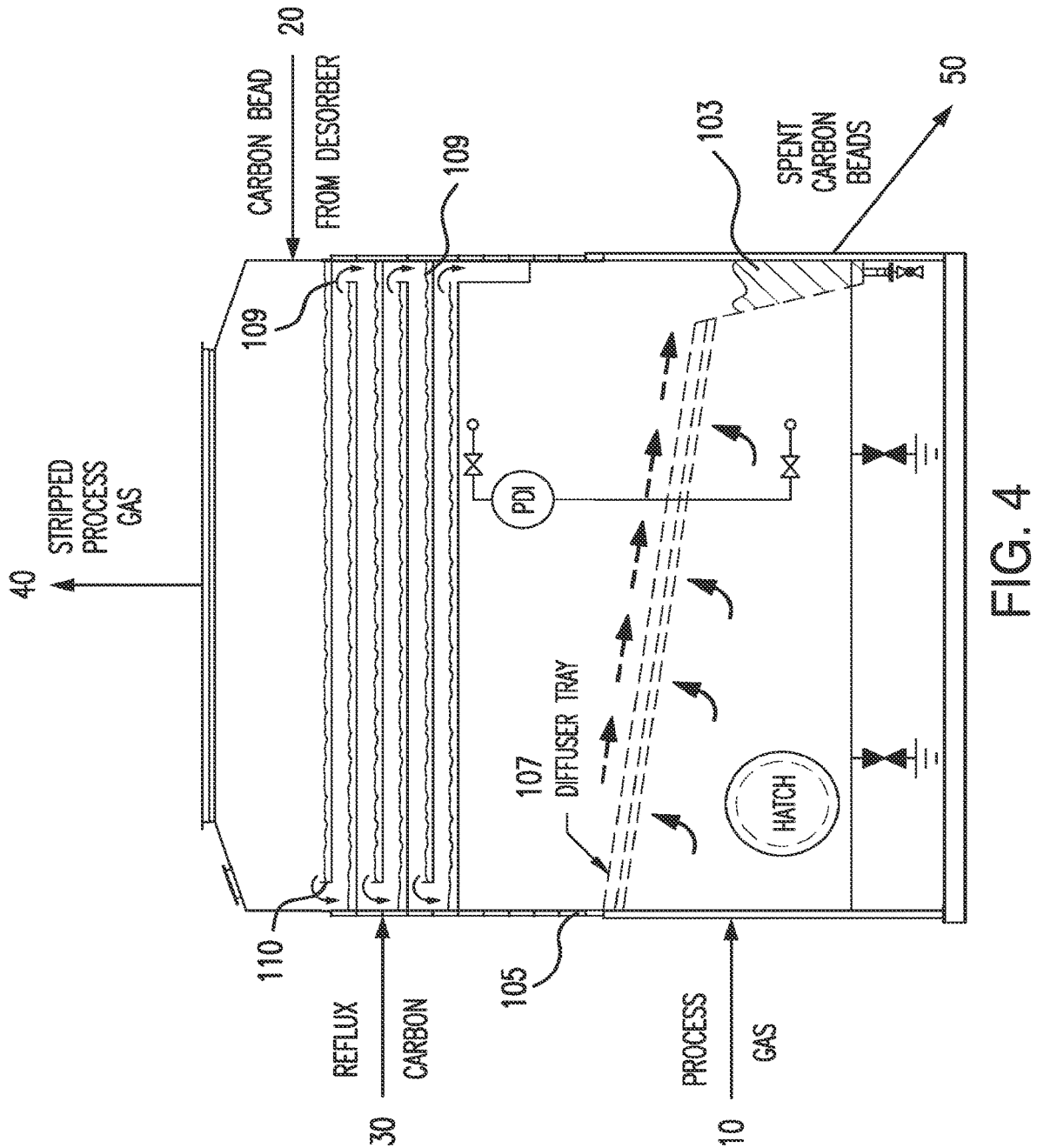

During the trial, it took about 2 hours for the fluidized bed to warm to process air temperature. A schematic illustration of the fluidized bed used in the present example is provided in FIG. 4. As the process began to stabilize, after about 2 hours, the trays 109 equipped with weirs 110 began to fill and fluidize. The bead transport rate was increased from about 150 lb/hr to about 200 lb/hr to fully fill and fluidize beads within the trays. By 3 hours, the process was stabilized with the trays full and fluidized.

Once stable, the bed temperature averaged from about 150° F. to about 160° F., except the top tray, which was at about 135° F. throughout the trial. Small air flow adjusters, approximately 3.5"×15", were weighted for stabilization and positioned in the downcomer trays to facilitate tray filling, fluidization, and overflow to the downcomer trays. Based on pitot tube measurements, the calculated air flow within the fluidized bed was 294 cubic feet per minute (cfm).

Impingers containing 15 mL acetonitrile were set up both before (Inlet) and after (Outlet) the bed to collect emissions. System air was bubbled through impinger solutions via fritted spargers at about 50 mL/min via pressure provided from the fluidized bed. The pressure at the inlet of the bed approximately 5% organics, mainly terpenes, and 3% water. The full data is presented in Table 1 and provided in FIG. 6, which shows bead density and percentage organics as a function of time. However, as described in further Examples, sorbent in a commercial system could include less water and more organics, depending in part on the startup conditions of the adsorber and the hydrophobicity of the sorbent.

TABLE 1

| Elapsed Time (min) | Notes | Bead Density (g/mL) | TGA-IR % Organics |
|---|---|---|---|
| 0 | Start air flow to warm bed | 0.584 | 0.00% |
| 120 | Load beads & start impingers | — | — |
| 180 | Process Stabilized | 0.603 | 0.82% |
| 240 | Process Stable | 0.600 | 2.60% |
| 300 | Process Stable | 0.611 | 3.93% |
| 360 | Process Stable | 0.618 | 5.10% |
| 420 | Process Stable | 0.630 | 6.06% |
| 480 | Process Stable/Shutdown | 0.633 | 6.40% |

Emissions at Impingers

As noted above, samples were taken at two impingers located at the inlet and outlet of the fluidized bed. Samples were taken over different time periods ranging from 2 to 8 hours, with the results as shown in Table 2, below.

TABLE 2

| Elapsed Time (min) | MeOH (ppm) Inlet | MeOH (ppm) Outlet | HCHO (µg/mL) Inlet | HCHO (µg/mL) Outlet | β-Pinene (ppm) Inlet | β-Pinene (ppm) Outlet | α-Pinene (ppm) Inlet | α-Pinene (ppm) Outlet |
|---|---|---|---|---|---|---|---|---|
| 120 | ND | ND | 0.8 | 0.1 | NQ | NQ | 41.8 | NQ |
| 180 | ND | ND | 0.8 | 0.2 | NQ | ND | 41.8 | ND |
| 240 | ND | ND | 0.2 | 0.2 | NQ | ND | 47.2 | ND |
| 300 | ND | ND | 0.2 | 0.2 | NQ | ND | 47.2 | ND |
| 360 | ND | ND | 0.2 | 0.2 | NQ | ND | 39.5 | ND |
| 420 | ND | ND | 0.2 | 0.2 | NQ | ND | 39.5 | ND |

"ND" means non-detectable and "NQ" means non-quantifiable.

was approximately 5-6 inches of water whereas the pressure at the outlet of the bed was approximately 3-4 inches of water.

Bead Attrition

Figure 5A:
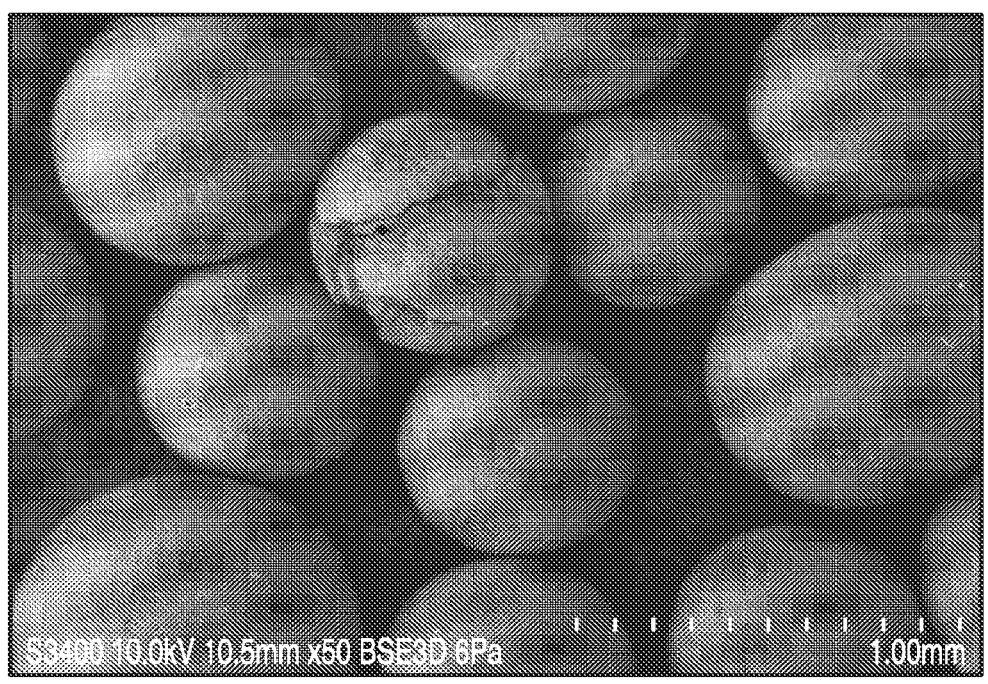
Figure 5B:
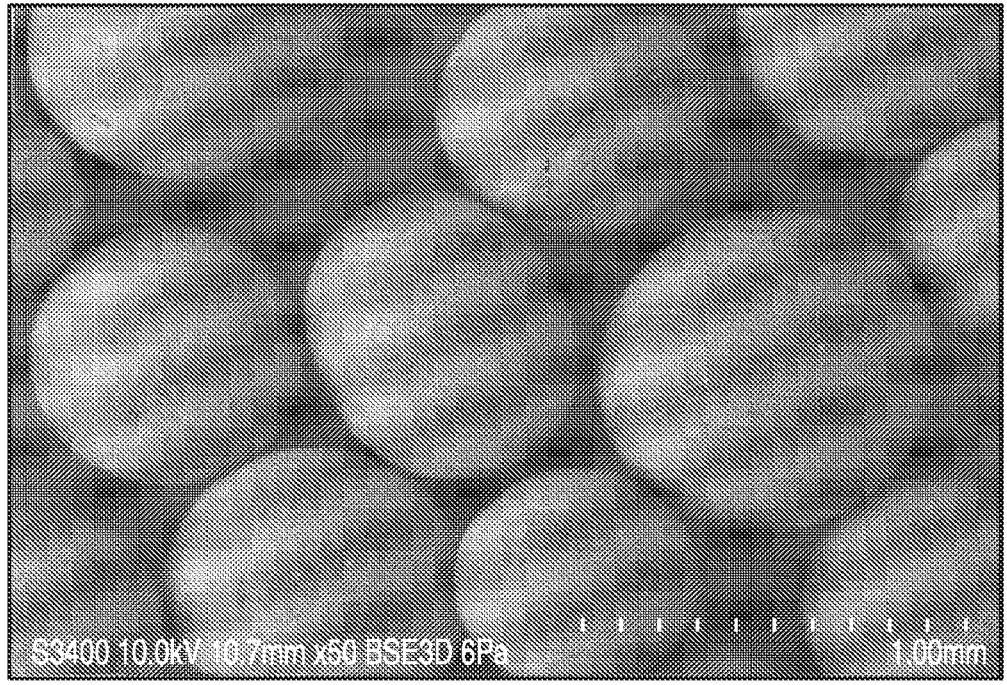

Attrition of the beads within the fluidized bed was observed using SEM microscopy. FIGS. 5A-5B provide images of new and used beads, respectively, at 50× magnification. The mechanical impact on the beads was studied to determine whether there was bead deterioration during the trial, which lasted about 6 hours.

Upon visual inspection of the SEM images, cracks were noted in both new and used beads and overall, there was no gross difference between the two sets of beads. This result indicates that the beads used in the Example are sufficiently robust to be used in the fluidized bed adsorption process with minimal attrition.

Bead Adsorption

The adsorption onto the beads was studied at various time points in the trial. The density of the beads was measured and thermal gravimetric analysis (TGA) was performed to determine the percentage of bead weight attributable to adsorbed organics. The beads were found to contain As shown in Table 2, there were no detectable methanol (MeOH) emissions at either the inlet or the outlet during any collection time period. Formaldehyde (HCHO) emissions were approximately the same at both the inlet and outlet, particularly once the process was stable. The outlet formaldehyde emissions in samples taken after 2 hours (120 min) were about half the amount in samples taken after 3 hours (180 min). Alpha-pinene emissions were higher at the bed inlet than the bed outlet. In particular, at the outlet impinger, alpha-pinene results were non-quantifiable (NQ), but detectable at 2 hours, during which time the beads did not fill the trays. Similarly, beta-pinene emissions were non-quantifiable but detectable at the inlet, but not detectable (ND) at the outlet, except at 2 hours, during which time the beads did not fill the trays. These results indicate that when there are fewer collisions (i.e., less air contact) with the beads, emissions are reduced to a lesser degree. Overall, the amount of terpenes, e.g., alpha- and beta-pinene, and other organics was reduced after passing through the fluidized bed, indicating that the activated carbon beads successfully adsorbed a portion of these VOCs.

Figure 6:
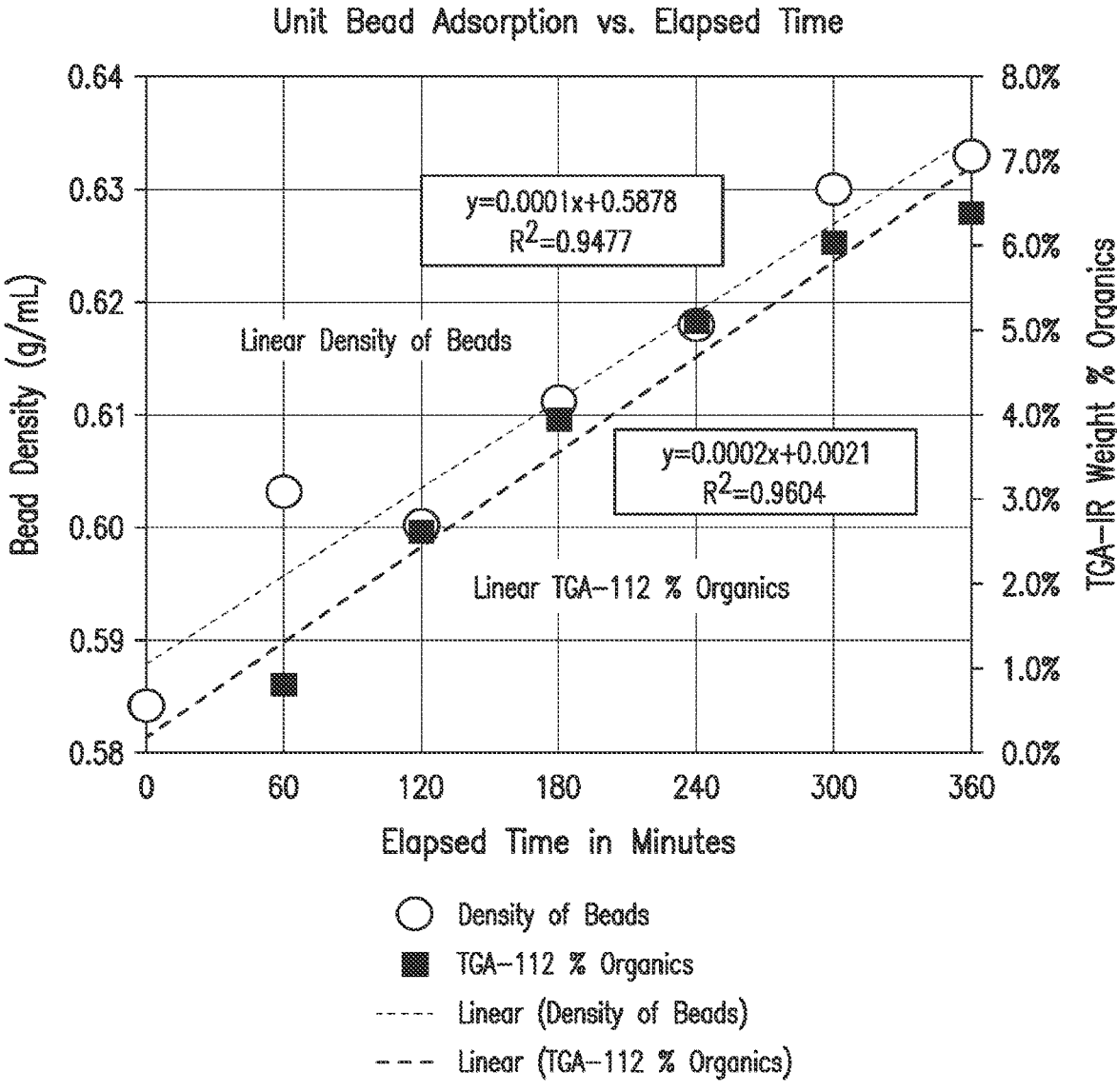
FIG. 6 shows sorbent bead density and percentage organics as a function of time in the adsorption trials of Example 1 of the present disclosure.

In sum, this Example shows that good bead flow and fluidization can be obtained using systems in accordance with the disclosed subject matter. Bead flow can be controlled by adjusting eductor height, airlift fan speed/pressure, orifice to modulate airflow through adsorber, and inlet/outlet pressures at the fluidized bed. The beads adsorbed organics linearly over the run time (FIG. 6). Additionally, the initial qualitative impinger analyses indicate that terpenes emissions are significantly reduced by adsorption onto activated carbon beads in fluidized bed.

Example 2: Pilot Scale Fluidized Bed for Adsorbing VOCs from an Exhaust Stream This Example describes pilot scale testing of a system for removing VOCs from the exhaust stream of a wood drying process in accordance with the disclosed subject matter.

A process fan was configured to pull a slip stream of approximately 300 cfm from the exhaust stream of a wood drying process through an air pre-treatment box including a perforated plate, 100 mesh screen, and pleated filter to reduce particulate matter of the dryer exhaust. The discharge of the process fan had two balancing dampers to control the flow to a fluidized bed containing activated carbon beads at approximately 300 cfm, such that excess exhaust bypassed the bed to achieve optimum fluidization. These pilot trials were operated in semi-batch mode. A continuous process was operated through the adsorber and the desorber was operated in a batch process. Table 3 provides the parameters of the process fan and fluidized bed.

TABLE 3

| | |
|---|---|
| Process fan suction | −10 to −15 inches of water |
| Inlet pressure (upstream of discharge bypass line) | 4 to 11 inches of water |
| Fluidized bed after inlet diffuser | 5 to 12 inches of water |
| Fluidized bed differential pressure (out-in) | 2 to 4 inches of water |
| Fluidized bed outlet pressure | 1.5 to 4 inches of water |
| Temperature before air pre-treatment box | 164° F. to 178° F. |
| Temperature at process fan discharge | 164° F. to 180° F. |
| Temperature at bottom of bed (hopper) | 117° F. to 164° F. |
| Temperature at bottom tray of bed | 136° F. to 170° F. |
| Temperature at middle tray of bed | 136° F. to 168° F. |
| Temperature at top tray of bed | 122° F. to 146° F. |
| Outlet temperature | 130° F. to 158° F. |
| Bead transport rate | 100 to 205 pounds per hour |
| Air flow (actual) | 250 to 325 cfm |
| Air flow (dry standard) | 175 to 250 dscfm |
| Air flow (standard) | 225 to 300 scfm |

Over a period of 38 hours, samples were taken on an hourly basis for two trial runs. The following measurements were taken: bead density, percentage weight gain of the beads, ppm of hydrocarbons at inlet and outlet as measured by a flame ionization detector (FID), and the percentage water and organics as measured by thermal gravimetric analysis (TGA).

Bead Adsorption

FIG. 7A shows the bead density over time for each trial. As shown in FIG. 7A, bead adsorption generally increased with time in a linear fashion. FIG. 7A further shows the ppm of hydrocarbons at the outlet of the fluidized bed. The amount of hydrocarbons generally increased with time exponentially, presumably at the beads began to reach capacity. The trials had good replication up to about 15 hours, over which time the beads adsorbed a generally stable amount of hydrocarbons.

FIG. 7B provides the results of the thermal gravimetric analysis, comparing the percentage of organics (terpenes)

and water with the run time. In the top panel of FIG. 7B, the percentage organics is overlaid with bead density showing that the percentage organics generally tracked bead density for each of the two runs. The maximum percentage organics adsorbed for both runs was approximately 22.5%. As shown in the bottom panel of FIG. 7B, the amount of water versus total adsorbed ranged from 1 to 20%, but up to about 10% water was typical. The total adsorbed amount is based on the total weight loss of the sorbent when heated to 600° F., when measured by thermal gravimetric analysis. Adsorption of higher levels of water was seen on bead samples with shorter run times, possibly due to adsorption of condensed water early in runs.

FIG. 7C provides the terpenes yield, extrapolated over a year as a function of run time assuming a wood drying product of about 300,000 dry tons per year. As shown in FIG. 7C, terpenes yield decreased based on run time, but generally remained over 200,000 gallons of terpenes per year. Additionally, terpene yield was estimated based on wood drying production of about 300,000 dry tons per year, assuming a terpenes yield of 1.16 gallons per dried ton (Naval Stores Reference Guide, p. 189) and an efficiency yield of 75%, resulting in an estimated about 260,000 gallons of terpenes per year. Thus, the terpenes yield extrapolated from estimated bead adsorption generally matches the calculated terpenes yield. Although FIG. 7C shows a reduction in terpenes yield versus time, under the operating conditions of continuous adsorption coupled to a desorber and condenser, the terpenes yield would be expected to be constant over time.

FIG. 7D shows thermal gravimetric analysis results, when the analysis was performed isothermally. A sample of beads taken at 29 hours was analyzed. The beads were heated at 77° F. per minute to various hold temperatures in separate experiments and maintained at each hold temperature until weight loss stopped. The hold temperatures were 167° F., 212° F., 257° F. 302° F., 347° F., 392° F., 482° F., 572° F., and 662° F. FIG. 7D shows weight loss over time for each hold temperature. As the temperature increased, the weight loss increased and the time necessary to desorb materials generally decreased. At 662° F., there appeared to be some degradation of the beads, indicating that this temperature is too high to remove organics. Optimal desorption temperature is likely 302° F. to 932° F., or 302° F. to 662° F., with lower temperatures within that range preferred to minimize the heat energy required for desorption and to maximize the alpha-pinene and beta-pinene content in the desorbed stream.

Removal Efficiency

FIG. 7E compares the percentage reduction in VOCs (based on the FID analysis described above) and the percentage weight gain of the beads. FIG. 7E demonstrates that for both runs, the beads reduced the ppm organics in the process exhaust by at least 90% (meeting the target for reduction) in the operating window, as specified by the Maximum Available Control Technology (MACT) requirement for plywood and composite wood products (PCWP), while the beads gained no more than 15% by weight.

FIG. 7F shows the air flow at the inlet and outlet of the fluidized bed in terms of Standard Cubic Feet per Minute (sCFM), Dry Standard Cubic Feet per Minute (dsCFM), and Actual Cubic Feet per Minute (aCFM). The air flow into and out of the fluidized bed were within 10% of each other, indicating that the air exiting the bed was not significantly diluted by the fresh air added to the bed by the airlift blower under the process conditions. Accordingly, the observed reduction in VOC emissions was due to adsorption, since any VOC emissions in the air exiting the bed were undiluted.

FIG. 7G provides the percentage reduction in VOCs (based on emissions data at impingers located at the inlet and outlet of the fluidized bed) and the percentage weight gain of the beads. The emissions were collected in two impingers in series containing 15 mL acetonitrile each for 120 minutes with approximately 1 liter/min process air flow. This emissions data from the impingers indicates that the terpenes are very efficiently adsorbed by the beads, particularly within the operating window. However, formaldehyde was less efficiently adsorbed by the beads. Under the conditions of continuous adsorption coupled to continuous desorption and recovery, the VOC (including formaldehyde) reduction is expected to be constant with time, unlike the data shown in FIGS. 7E and 7G.

Bead Desorption

Based on the thermal gravimetric analysis under isothermal conditions described above, beads were desorbed at 572° F. for 55 minutes. After desorption, the beads were subjected to further thermal gravimetric analysis to determine the amount of organics remaining on the beads following desorption. The beads showed an initial 1.8% weight loss from water. Between 572° F. and 1382° F., there was an additional 1.3% weight loss from water, carbon dioxide, and a small amount of carbon monoxide. No organic compounds or particulates were identified in the off-gases. The apparent density of virgin beads was 0.602 g/mL and the apparent density of beads after desorption was 0.608 g/mL, whereas the apparent density of the beads after adsorption was 0.76 g/mL. Thus, the apparent density of the beads after desorption was nearly equal to that of the virgin beads, indicating that only a very small percentage of the bead capacity was irreversibly blocked at 572° F., well within the design specifications for a fluidized bed adsorber. Moreover, the thermal gravimetric analysis of the beads after desorption showed only water remaining on the beads, and no organic compounds or particulates. These results indicate that the activated carbon beads of this Example can be very efficiency desorbed.

Beads were also extracted by mixing with hexane, ethyl acetate, and acetonitrile at room temperature. The resulting solvent extracts were analyzed for terpenes content, then normalized and compared to terpenes desorbed using thermal desorption. FIG. 7H provides a comparison of the terpenes yield. As shown in FIG. 7H, terpenes not exposed to heat have relatively high alpha-pinene and beta-pinene content.

In sum, this Example demonstrates that bed fluidization was sufficient for efficient adsorption onto activated carbon sorbent. Once stable, minimal operator intervention was required to maintain performance of the adsorber. Any potential water condensation issues were largely addressed by pre-warming the fluidized bed prior to bead introduction. Some condensation in the hopper caused the beads to stop flowing temporarily, indicating that additional heat (e.g., a heat source, better insulation, etc.) for the hopper can be desirable to ensure that the operating temperature remains above the dewpoint and prevent condensation.

After running continuously for 36 hours, there was no significant occurrence of particulate or tarry scale within the fluidized bed, although there was tarry scale build up on the perforated plate in the air pre-treatment box.

The maximum bead saturation was approximately 20-25% organics by weight. The amount of adsorbed water as compared to organics should not exceed 10% when system comes to equilibrium in continuous runs to ensure efficient adsorption of organics. Emissions as measured by Flame Ionization Detection (FID) indicated that the fluidized bed reduced the ppm of organics in the process air by at least 90% when beads had adsorbed less than or equal to 15% organics by weight. These density measurements demonstrated that the beads were not saturated until after the beads had adsorbed about 15% of their initial weight, indicating their high propensity for adsorption. This result demonstrates that the beads can meet a very high adsorption efficiency.

Example 3: Operation of Fluidized Bed for Removal of Volatile Organic Compounds

This Example describes pilot scale testing of a system for removing VOCs, such as terpenes, from the exhaust stream of a wood drying process.

To test the capabilities for removing such VOCs, a process fan was configured to draw a portion of exhaust of approximately 300 cfm from an exhaust stream from a wood dryer. The remaining exhaust stream was passed to a conventional regenerative thermal oxidizer (RTO). The portioned stream was passed through an air pre-treatment box to reduce particulate matter. Two balancing dampers were used to control the flow from the process fan and air pre-treatment box. After pre-treatment, the portioned stream was passed to a fluidized bed adsorber containing bead activated carbon (BAC) (from Kureha America, Inc.). The pilot system was operated in semi-batch mode to allow the BAC to adsorb pollutants, mainly VOCs.

The process parameters of the process fan and fluidized bed are summarized in Table 4, below.

TABLE 4

| | |
|---|---|
| Process fan suction | −9 to −10 inches of water |
| Inlet pressure (upstream of discharge bypass line) | 8 inches of water |
| Fluidized bed after inlet diffuser | 7 to 8 inches of water |
| Fluidized bed differential pressure (out-in) | 2 to 3 inches of water |
| Airlift fan discharge pressure | 20 to 35 inches of water |
| Temperature before air pre-treatment box | 160° F. to 175° F. |
| Temperature at process fan discharge | 165° F. to 180° F. |
| Temperature at bottom of bed | 145° F. to 160° F. |
| Temperature at bottom tray of bed | 155° F. to 170° F. |
| Temperature at middle tray of bed | 155° F. to 170° F. |
| Temperature at top tray of bed | 135° F. to 155° F. |
| Outlet temperature | 130° F. to 158° F. |
| Bead mass transport rate | 100 to 250 pounds per hour |
| Air flow (actual) | 320 to 425 cfm |
| Air flow (dry standard) | 225 to 300 dscfm |

To determine the compositions of (1) the exhaust stream entering the air pre-treatment box (and subsequently, the fluidized bed), (2) the stream exiting the fluidized bed, and (3) the stream entering into the RTO, several tests were performed. The velocity, volumetric flow rate, moisture, and molar weight of each stream were determined according to EPA Methods 2, 3, and 4. Additionally, several measurements were performed to determine the amount of particulate matter in each stream. The total amount of filterable particulate matter was determined according to EPA Method 5. The amount of filterable particulate matter having diameters less than 2.5 m (PM 2.5) and less than 10 μm (PM 10) were measured using particle size analysis. The amount of condensable particulate matter was measured using EPA Method 202.

The VOC loading of the streams entering and exiting the fluidized bed were measured based on the gaseous streams. EPA Method 25A, without a methane cutter, was used to determine the amount of VOCs as total hydrocarbons based on a propane calibration for the RTO. EPA Method 25A, adjusting for certain organic components (such as methanol and formaldehyde) according to Wood Products Protocol 1 (WPP1), was used to determine a measure of VOCs for the fluidized bed system. The amount of HAPs, notably methanol and formaldehyde, was also measured using NCASI Method 98.01, which was performed with and without additional quality assurance samples (e.g., sample runs with reagent blanks, duplicates, and various spikes).

HAPs Emissions

The fluidized bed system was observed to reduce HAPs emissions, as HAPs were adsorbed onto the activated carbon beads. For example, FIG. 8A shows the percentage reduction in the HAPs methanol and formaldehyde over a 2.5 hour run time, as measured by impingers located at the inlet and outlet of the fluidized bed. The emissions data from the impingers indicates that the beads adsorb formaldehyde and methanol, but that over 2-3 hours, their ability to adsorb HAPs decreases.

Thus, the fluidized bed reduced HAPs emissions most effectively upon startup when the beads had an apparent density of about 0.6. Over time, as the apparent density of the beads increased, their capability for HAPs adsorption decreased. This result suggests that recirculation of beads or otherwise maintaining a low apparent density via techniques such as thermal desorption can enable continuous desorption of the beads while effectively controlling HAPs.

Particulate Control

It was observed that the amount of particulate matter was reduced at the outlet of the fluidized bed. To confirm that this was not due to a significant reduction during stream pretreatment that is not representative of particulate reduction upstream from convention RTOs, FIG. 8B compares the particulate matter concentration at the inlet of the fluidized bed and a conventional RTO. It was found that the particulate matter entering the fluidized bed was indeed representative of the particulate entering the RTO, when calculated both on a pounds per hour (51.1 lb/hr versus 53.1 lb/hr) and a concentration (106.0 mg/dscm versus 110.7 mg/dscm) basis.

To further investigate, the particulate control of the fluidized bed was compared when used in conjunction with two different air pre-treatment boxes. The first box contained a perforated plate, 100 mesh screen, and a pleated filter. The second box contained a perforated plate and two baffles. The results are shown in FIG. 8C. Even without the 100 mesh screen and pleated filter, particulate matter was reduced between the untreated exhaust stream and the outlet stream, indicating that particulate matter is reduced by the fluidized bed system. This is true when calculated on both a pounds per hour (48% without screen and filter versus 21.7% with screen and filter) and concentration (50.7% versus 30.6%) basis. The particulate reduction was actually greater when using the perforated plate and two baffles as compared to with the 100 mesh screen and pleated filter. The specific reduction for each type of particulate studied (filterable, condensable, PM 2.5, and PM 10) can be found in Table 5, which extrapolates the average data to an air flow rate of 300,000 cfm. Overall, about 80 wt-% of the particles had a diameter of 1 μm or less.

36

TABLE 5

| | Particulate | | |
|---|---|---|---|
| | Inlet Avg. (lb/hr) | Outlet Avg. (lb/hr) | % Reduction |
| Method 5 (filterable only) | 107 | 70 | 35% |
| Method 202 (condensable) | 42 | 33 | 21% |
| Total filterable + condensable | 149 | 103 | 31% |
| PM 2.5 filterable + condensable | 49 | 35 | 29% |
| PM 10 filterable + condensable | 92 | 50 | 45% |

It was theorized that the fluidized beads acted as a dry scrubber to remove some of the particulate matter from the exhaust stream (which also formed the yellow/brown coating inside the air pre-treatment box). Thus, the desorption of this material was studied to determine whether it could be desorbed along with terpenes in the desorber at a desorption temperature of 572° F. As shown in FIG. 8D, the thermal gravimetric analysis of gum turpentine applied to carbon beads indicated that the majority of the organic material could be desorbed within 20 minutes at 572° F., well within a desorber's design specifications for time and temperature of 55 minutes at 572° F. Thus, it is expected that if the beads adsorb this yellow/brown coating, it would be desorbed in the desorber and be combined with a condensed turpentine product. However, inorganic material is never thermally desorbed and it is theorized it can be recirculated with the beads back to the fluidized bed and exhausted out the top of the bed or circulated to a small particulate control device for collection and disposal. Indeed, analysis of the condensate showed that it contained fatty acids (hexadecanoic acid (C16:0) and octadecanoic acid (C18:0)) and rosins, which can be found in PM 2.5 (PM 2.5 includes both condensable and filterable particulate matter).

Additionally, the long term effects of particulates were studied over 2 weeks of run time using an air pre-treatment box with a perforated plate and two baffles. After 2 weeks, the plate, baffles, fluidized bed, and airflow adjusters were all coated with a thin layer of yellow/brown material. The elements in the pre-treatment box also had visible particles embedded in the layer of yellow/brown material.

Thus, this Example shows that the particulate going into the fluidized bed is representative of the particulate going into a conventional RTO, indicating that these pilot trials can be used to predict the impact on particulate matter. The fluidized bed was found to reduce particulate emissions by about 30% to 50%.

Additionally, it was observed that the fluidized beads in the bed remove the yellow/brown condensable organic material that typically forms a yellow/brown coating from the dryer exhaust, and it was theorized that they acted as a dry scrubber to do so. This condensable organic material can be desorbed in the desorber within the normal desorber time/temperature design specification of 55 minutes at 572° F. and will become part of the resulting condensate. For PM 2.5, the condensable fraction is often the predominant fraction made up of rosin "smoke," fatty acids, and breakdown products from cellulose and lignin. The air pre-treatment box with a perforated plate and two baffles, which is a relatively simple design, more effectively reduced particulate emissions than the box with a perforated plate, 100 mesh screen, and pleated filter.

Example 4: Terpene Yield from Beads

As described in Example 3, the conditions of desorption can affect the resulting composition of the terpenes recovered. Thus, in this Example, the desorption of terpenes from activated carbon beads was studied, while monitoring the composition of the desorbed materials.

The beads studied in this Example had previously undergone adsorption with an exhaust stream from a wood drying process as described in Example 3.

Beads that were saturated with terpenes (100.4 g) from a wood drying process were placed in custom made glass desorption chamber with glass frit (1.4 L volume). The chamber was equipped with a heating mantle (see FIG. 9). The apparatus was heated slowly from room temperature (25° C.) to 190° C. over the course of 240 min. When temperature in the chamber reached 190° C., water began to condense (residual water from beads is desorbed first), followed by condensation of the terpene stream. In a Dean-Stark trap, a bi-phasic system was observed, with a bottom layer of water and a top layer of terpenes). Thereafter, the temperature was maintained within 10° C. and samples were collected at 4 intervals over 115 minutes. The first and second samples included some water whereas the third and fourth samples contained only organic phase. The organic phase was analyzed by GC/MS and results are summarized in Table 6 and FIG. 10.

TABLE 6

| Temp. (° C.) | Elapsed Time (min) | α-Pinene | Camphene | β-Pinene | p-Cymene | Limonene | Terpene Recovery |
|---|---|---|---|---|---|---|---|
| 194[1] | 10 | 6.8 | 0.4 | 2.1 | 0.1 | 0.3 | 9.7 |
| 198 | 25 | 63.2 | 4.2 | 15.2 | 1.1 | 3.4 | 87.0 |
| 194 | 55 | 66.3 | 6.3 | 13.2 | 2.1 | 6.0 | 93.9 |
| 197 | 115 | 54.0 | 8.8 | 7.6 | 3.8 | 9.8 | 83.9 |

[1]It took 240 min to heat-up the system from 25° C. to 194° C.

[2.] Recovery applies only to analytes that were ionized and detected by GC-MS.

As shown in Table 6 and FIG. 10, as time elapsed, the relative amount of alpha-pinene and beta-pinene decreased relative to dipentene (e.g., d-limonene) and camphene. The weight of the beads after desorption was 92.8 g, indicating that 7.6 g of terpenes were recovered from the saturated beads.

Room Temperature Liquid-Liquid Extraction

Adsorbed beads were extracted at room temperature using a mixture of the solvents hexane, ethyl acetate, and acetonitrile at room temperature. The resulting solvent extracts were analyzed for terpene content. The terpene content analyses were normalized based on the total amount of terpenes and compared to thermally desorbed terpenes recovered by the Dean-Stark analyses. The results of liquid-liquid extraction are shown in Table 7.

TABLE 7

| Component | Liquid Extraction % |
|---|---|
| Alpha-Pinene | 51 |
| Camphene (Fenchene) | 7 |
| Beta-Pinene | 25 |
| Limonene | 7 |
| p-Cymene | 5 |
| Alpha-Terpineol | 2 |
| p-Allylanisole | 2 |

These data show that when terpenes were extracted with liquid at room temperature, there was a much larger percentage of alpha-pinene and beta-pinene recovered. Additionally, this Example demonstrates that terpenes can be recovered with organic solvents at room temperature.

Example 5: Sulfur Content of Terpene Recovery

To demonstrate an advantage of the presently disclosed terpene streams, this Example compares the composition of a terpene stream in accordance with the present disclosure with the composition of a crude sulfate turpentine (CST) stream, which is commonly used as a source of terpenes and obtained from wood pulp digestion.

The crude sulfate turpentine stream of this Example represents the average composition of 11 crude sulfate turpentine streams from different sources. Table 8 provides a comparison of the sulfur and terpene content of the two streams.

TABLE 8

| Component | Crude Sulfate Turpentine | Recovered Terpenes from Fluidized Bed |
|---|---|---|
| Total Sulfur (ppm) | 11,295 | — |
| DMTS (ppm) | 68 | — |
| Alpha-Pinene (wt-%) | 59.34% | 63.2% |
| Camphene (wt-%) | 1.14% | 4.2% |

TABLE 8-continued

| Component | Crude Sulfate Turpentine | Recovered Terpenes from Fluidized Bed |
|---|---|---|
| Beta-Pinene (wt-%) | 23.62% | 15.2% |
| Myrcene (wt-%) | 1.29% | — |
| Terpinolene (wt-%) | 0.54% | — |
| Alpha-Terpineol (wt-%) | 0.87% | — |
| Cis-Anethole (wt-%) | 0.19% | — |
| Trans-Anethole (wt-%) | 0.65% | — |
| Caryophyellenes (wt-%) | 1.20% | — |
| Limonene (wt-%) | 3.76% | 3.4% |
| Beta-Phellanderene (wt-%) | 2.24% | — |
| Methyl Chavicol (wt-%) | 0.76% | — |

As shown in Table 8, in contrast to crude sulfate turpentine, terpenes recovered in accordance with the presently disclosed subject matter do not include sulfur-containing compounds (total sulfur and dimethyl trisulfide (DMTS)). Additionally, their alpha-pinene and beta-pinene content is similar to that of crude sulfate turpentine. Thus, these recovered terpenes can be a sulfur-free alternative to crude sulfate turpentine, making them more valuable for many applications.

Example 6: Calculated Sorbent Reactivation Via Side Stream Reactivator

This Example calculates and simulates the effect of continuous side stream reactivation of carbon beads on sorbent apparent density over a 21-day period. Such a calculation helps to determine the amount of sorbent (i.e., carbon beads) that must be reactivated in order to maintain a particular, desired sorbent apparent density. The ability to maintain said sorbent apparent density is a primary predictor of emissions reduction efficiency.

To calculate the effect of a side stream reactivator that continuously adds reactivated sorbent to maintain apparent density, each calculation begins with spent carbon beads having an apparent density of 0.81 g/mL. It is assumed that each day, reactivated or fresh carbon beads increase when exposed to process air and subsequently desorbed by an apparent density of 0.01 g/mL. On this basis, five calcula- tions are conducted to demonstrate the effect of 0.1%, 0.5%, 2%, 3%, and 6% reactivation per day based on a daily use of 10,000 lbs. of carbon beads. For example, a 6% reacti- vation means 6% of 10,000 lbs. per day, or 600 lbs per day (which is 25 lbs/hr) reactivated.

Each of the five calculations begins with apparent density of 0.81 g/mL. For each day over a course of 21-days, the set percentage of reactivated carbon is mixed with existing sorbent. At the same time, all new and partially spent sorbent that is adsorbed in the adsorber increases by 0.01 g/mL per day to a maximum of 0.81 g/mL according to data collected in FIG. 11A. FIG. 11B displays the calculated change in the apparent density of the sorbent beads over 21 days, based on the percentage of reactivated carbon that is introduced.

It is desired to maintain sorbent apparent density at or approximately 0.78 g/mL. Based on the calculated effect of side stream reactivation, about 2% reactivation of sorbent based on a 10,000 lb daily consumption is sufficient to maintain this 0.78 g/mL apparent density. Lower apparent density provides for improved percent reduction efficiency by a higher percentage of reactivated sorbent (e.g., carbon), whereas higher apparent density provides for higher terpene yield, less use of energy, and less generated $CO_2$ by a lower percentage of reactivated sorbent (e.g., carbon).

Example 7: Emissions Control Via Side Stream Reactivation

This Example describes a pilot scale testing of the effect of continuous side stream reactivation of carbon beads in maintaining a certain sorbent apparent density, and accord- ingly, the ability to control emissions from a process exhaust stream via a fluidized bed adsorber, as contemplated by the presently disclosed methods and systems. This Example provided the introduction of fresh sorbent for a predeter- mined amount of time into systems of the present disclosure to test the effect of continuous side stream reactivation. Specifically, this pilot scale testing was conducted to deter- mine the amount of new or reactivated sorbent needed to consistently achieve over 90% reduction efficiency of emis- sions, such as volatile organic compounds (VOCs) and/or total hydrocarbon content (THC). Additionally, the effect of other equipment operating parameters was studied. The overall process flow of the system in this Example is generally captured by FIG. 1, as described above.

Prior to and in preparation for this pilot scale testing, the adsorber was cleaned using trisodium phosphate solution in accordance to procedures or processes as presently disclosed and known to those of ordinary skill in the art. Heating was provided to the adsorber, hopper (i.e., adsorber hopper), and associated piping to minimize possible water condensation and coalescence of organics.

New carbon beads were added in various but predeter- mined amounts over set increments of time (e.g., every 1-5 minutes) to simulate a continuous side stream reactivation of the sorbent. The impacts of adding new carbon, and thus of determining the effect of continuous side stream reactivation as presently disclosed, were assessed based on the time needed to observe reduction of emissions at the adsorber (e.g., less than about 60 minutes) and a downstream desorber (e.g., between about 5-10 hours). Side stream reactivation amount was adjusted in order to maintain apparent densities ranging from about 0.78 g/mL to about 0.80 g/mL, and subsequently, to achieve the necessary reduction efficiency on emissions of at least 90% from the process exhaust stream.

Operating conditions of this pilot scale testing are sum- marized in Table 9 below. Sorbent beads from the adsorber spent about 60 minutes, with a range of between about 30-70 minutes, in the heated section of the desorber.

TABLE 9

| Condition | Target | Range |
|---|---|---|
| Process Exhaust Air at Adsorber Inlet | 300 cfm | 250-325 cfm |
| Adsorber Differential Pressure | 3.2-3.3 inches of $H_2O$ | 2.5-4.5 inches of $H_2O$ |
| Hopper Temperature | 180° F. | 100-200° F. |
| Adsorber Middle and Upper Trays | 90-115° F. | 90-115° F. |
| Sorbent Carbon Bead Transfer Rate from Desorber to Adsorber | 48 lb/hr | 40-85 lb/hr |
| Desorber Average Temperature | 400° F. (or 390-420° F.) | 370-470° F. |
| Condenser Chiller Temperature | 45° F. | 40-50° F. |
| Condenser Chiller Pressure | 43 psi | 41-45 psi |
| Airlift Fan Pressure (Adsorber and Desorber) | 20 inches of $H_2O$ | 18-22 inches of $H_2O$ |
| Nitrogen Makeup Pressure | 35-45 | 30-50 |
| Nitrogen Recirculation Rate | 8.5-9.1 cfm | 8-10 cfm |
| Nitrogen Blower Outlet Pressure | 29-32 inches of $H_2O$ | 28-34 inches of $H_2O$ |
| Apparent Density of Spent Sorbent | 0.81 g/mL | 0.81 g/mL |
| Apparent Density of Mixed Spent/New Sorbent | (specific to test run) | 0.78-0.81 g/mL |

After a baseline run to startup and acclimate the overall system, four test runs were conducted with the parameters specified in the table below. For each run, an orifice was used at the inlet of the adsorber to maintain the bead transfer rate from the desorber at about 48 lb/hr (or about 21.8 kg/hr). The percentage of carbon beads as depicted in Table 10 was calculated based on the 48 lb/hr sorbent bead transfer rate.

TABLE 10

| Run # | Total Sorbent Added [g] | Sorbent Addition Rate [g/min] | Location Where New Sorbent Added | Apparent Density [g/mL] | Percent Sor- bent Added |
|---|---|---|---|---|---|
| Baseline | 0 | n/a | n/a | 0.81 | 0% |
| A-1 | 1,473 | 49.1 | Adsorber Top Tray | 0.780 | 12% |
| A-2 | 1,473 | 44.6 | Desorber Eductor | 0.780 | 12% |
| A-3 | 390 | 13.0 | Desorber Eductor | 0.803 | 3.5% |
| A-4 | 552 | 8.7 | Desorber Eductor | 0.805 | 2.5% |

In Run A-1, new sorbent was introduced to the adsorber top tray by adding carbon beads approximately once per minute to the top adsorber tray via a pipe with double block and bleed valves at the top of the adsorber. In Run A-2, Run A-3, and Run A-4, new sorbent was introduced to the desorber eductor by introducing into the airstream between the desorber educator and the desorber separator pot via a pipe and site glass with double block and bleed valves.

Emission measurements, particularly VOCs and THC, were continuously routed to flame ionization detection (FID)

from both at the adsorber inlet and at the adsorber outlet. Analysis via flame ionization detection (FID) method was conducted by a certified third-party stack testing company to determine the effectiveness on emission control of the overall system. Moreover, these emissions results were compared to the amount of new carbon beads continuously added during this pilot scale testing (which demonstrated the function of a side stream reactivator) in order to determine an optimal apparent density range and the percentage of sorbent that would need to be reactivated to maintain at least 90% reduction efficiency.

FIG. 12A shows the percent reduction efficiency as it varied with each of four runs. In three of the four runs, a reduction efficiency of 100% was achieved, and in all instances, a reduction efficiency of 90% was achieved when the apparent density of sorbent was maintained at about 0.78 g/mL to about 0.805 g/mL. The average reduction efficiency achieved across all four runs was about 98%.

Correspondingly, FIG. 12B shows the measurement of total hydrocarbon content (THC) at the inlet of the adsorber compared to the outlet of the adsorber. As can be seen, as reduction efficiency increases due to the side stream reactivation of carbon beads in FIG. 12A, the THC at the adsorber outlet decreases nearly to zero, confirming the ability of the pilot system to attain about 100% reduction efficiency.

Based on the model in FIG. 11B, it is estimated that about 2% reactivation of sorbent per day is needed to maintain a consistent reduction efficiency of emissions at >90%. However, the full commercial system is designed to accommodate the capability to reactivate up to 6% sorbent per day on the basis of 10,000 lb. of sorbent (i.e., 600 lb/day or about 25 lb/hr).

In addition to determining the amount of side stream reactivation of sorbent to maintain a reduction efficiency of at least >90%, studies were conducted to determine the effectiveness of a condenser coupled to the desorber and the impact of adsorber differential pressure on emission control. FIG. 13 shows the total hydrocarbon content of the mixed nitrogen and emissions stream exiting the condenser going back to the desorber compared to the chiller temperature providing cooling to the condenser. The apparent density was 0.81 g/mL during testing. As can be noted in FIG. 13, when the chiller temperature is cooler, e.g., at about 40° F., the THC of the condenser outlet stream is correspondingly lower. By contrast, when the chiller temperature is closer to 50° F., there is an upward tick in THC of the condenser outlet stream. This Example demonstrates that operating the chiller, and therefore the condenser, at lower temperature improves condenser effectiveness by condensing more THC content. Additionally, by operating the chiller at lower temperatures, terpene yield from the desorber can be collected and maximized.

Adsorber differential pressure was also measured as compared to THC at the adsorber inlet versus outlet, as well as adsorber emissions control. The apparent density was 0.81 g/mL during testing. FIG. 14A depicts various adsorber differential pressures (from about 2.5 inches of water to about 3.8 inches of water) in comparison to the amount of THC in ppm at the adsorber inlet and outlet. As can be seen, where the adsorber operates with a larger differential pressure, such as at or above 3.4 inches of water, is the outlet THC content is higher than when the adsorber differential pressure is at or below 3.3 inches of water. FIG. 14B confirmed this finding, as between about 2.4 inches of water to about 3.2 inches of water shows an average reduction efficiency, without modeling side stream reactivation, of about 62% to about 70%. However, when adsorber differential pressure is increased to about 3.4 inches of water, reduction efficiency drops to about 55% to about 60%.

Accordingly, in certain embodiments, the adsorber operates such that its differential pressure is maintained between about 2.5 inches of water to about 3.3 inches of water.

It was also noted that some subsequent terpene yield was collected from the desorber of the pilot testing system. The amount of terpene collected in this Example as scaled to anticipated commercial value is approximately 50,000 gallons per year.

Example 8: Emissions Control Via Side Stream Reactivation and Comprehensive Testing This Example was conducted subsequent to Example 7 above to confirm the reduction efficiency results achieved via continuous side stream reactivation of sorbent. Additionally, comprehensive stack testing was conducted for environmental permitting regulations. In particular, the comprehensive stack testing also measured the amount of VOCs by FID, particulate matter, HAPs, $SO_2$, methane ($CH_4$), nitrogen oxides ($NO_x$), oxygen ($O_2$), and carbon monoxide (CO). An apparent density target was selected to achieve >90% reduction efficiency during comprehensive stack testing.

Prior to testing, the adsorber of the present Example was cleaned. During cleaning, the amount of pH of water rinses were monitored. The following table illustrates the adsorber cleaning process. Additionally, airlift systems of the pilot testing system, shown in FIG. 1, for instance, the adsorber eductor and desorber bead transfer line, were dried out to remove water and any organics coalescing.

TABLE 11

| Step | Cleaning Process | Average Solution PH |
|---|---|---|
| 1 | First rinse with approximately 4 gallons of water. | 7.23 |
| 2 | Apply cleaning solution, e.g., 4 liters (about 1 gallon) of 10% trisodium phosphate. | 11.95 |
| 3 | Drain cleaning solution and drain organics from adsorber. | 12.01 |
| 4 | Second rinse with approximately 5 gallons of water. | 10.34 |
| 5 | Third rinse with approximately 5 gallons of water. | 8.81 |
| 6 | Fourth rinse with approximately 5 gallons of water | 8.30 |

New carbon beads were added in various but predetermined amounts over set increments of time (e.g., every 1-5 minutes) to simulate a continuous side stream reactivation of the sorbent. The impacts of adding new carbon, and thus of determining the effect of continuous side stream reactivation as presently disclosed, were assessed based on the time needed to observe reduction of emissions at the adsorber (e.g., less than about 60 minutes) and a downstream desorber (e.g., between about 5-10 hours). Side stream reactivation was adjusted in order to maintain apparent densities ranging from about 0.760 g/mL to about 0.80 g/mL, and subsequently, to achieve the necessary reduction efficiency on emissions of at least 90% from the process exhaust stream.

The trial testing of this Example was conducted over the course of two days, i.e., in two parts. In the first part, this Example aimed to confirm the side stream reactivation conducted in Example 7 above. After a baseline run to startup and acclimate the overall system, two runs were conducted with the parameters specified in the table below. For each run, an orifice was used at the inlet of the adsorber to maintain a desired bead transfer rate to the desorber at about 38 lb/hr (or about 17.2 kg/hr) or at about 44 lb/hr (or about 20.0 kg/hr). The percentage of carbon beads as depicted in Table 12 was calculated based on the lb/hr sorbent bead transfer rate.

TABLE 12

| Run # | Total Sorbent Added [g] | Sorbent Addition Rate [g/min] | Bead Transfer Rate [lb/hr] | Location Where New Sorbent Added | Apparent Density [g/mL] | Percent Sorbent Added |
|---|---|---|---|---|---|---|
| Baseline | 0 | n/a | n/a | n/a | 0.81 | 0% |
| B-1 | 1,179.3 | 39.3 | 38 (17.2 kg/hr) | Desorber Eductor | 0.785 | 12% |
| B-2 | 2,116.8 | 106 | 44 (20.0 kg/hr) | Desorber Eductor | 0.760 | 24% |

In Run B-1, new carbon sorbent beads were added once per minute over 30 minutes. In Run B-2, new carbon was added once per minute over 20 minutes. In both Run B-1 and B-2, new sorbent was introduced desorber eductor directly by introducing into the airstream between the desorber eductor and the desorber separator pot via a pipe and site glass with double block and bleed valves.

Emission measurements, particularly VOCs, were continuously routed to flame ionization detection (FID) from both at the adsorber inlet and at the adsorber outlet. Analysis via flame ionization detection (FID) method was conducted by a certified third-party stack testing company to determine the effectiveness on emission control of the overall system. Moreover, these emissions results were compared to the amount of new carbon beads continuously added during this pilot scale testing (which demonstrated the function of a side stream reactivator) in order to determine an optimal apparent density range and the percentage of sorbent that would need to be reactivated to maintain at least 90% reduction efficiency.

FIG. 15 shows the reduction efficiency as it varied with each of the two runs in this Example. Run B-2 achieved a reduction efficiency of 100%, and in both instances, a reduction efficiency of at least 90% was achieved when the apparent density of sorbent was maintained at about 0.760 g/mL to about 0.785 g/mL.

Further, as observed from FIG. 15, in the first pilot testing part of Example 8, the THC at the adsorber outlet was drastically lower than the amount of THC at the adsorber inlet. This confirms the side stream reactivation of Example 7, as well as this Example, can obtain >90% reduction efficiency of emissions from a process exhaust stream.

Operating conditions during the second part of pilot scale comprehensive testing of this Example are summarized in Table 13 below. Sorbent beads from the adsorber spent about 60 minutes, with a range of between about 30-70 minutes, in the heated section of the desorber.

TABLE 13

| Condition | Target | Range |
|---|---|---|
| Process Exhaust Air at Adsorber Inlet | 300 cfm | 250-325 cfm |
| Adsorber Differential Pressure | 3.2 inches of H$_2$O | 2.5-4.5 inches of H$_2$O |

TABLE 13-continued

| Condition | Target | Range |
|---|---|---|
| Hopper Temperature | 180° F. | 145-170° F. |
| Adsorber Middle and Upper Trays | 90-115° F. | 90-115° F. |
| Sorbent Carbon Bead Transfer Rate | 34 lb/hr | 30-50 lb/hr |
| Desorber Average Temperature | 400° F. | 360-470° F. |
| Condenser Chiller Temperature | 45° F. | 40-50° F. |
| Condenser Chiller Pressure | 43 psi | 41-45 psi |
| Airlift Fan Pressure (Adsorber and Desorber) | 20 inches of H$_2$O | 18-22 inches of H$_2$O |
| Nitrogen Makeup Pressure | 37-43 inches of H$_2$O | 30-50 inches of H$_2$O |
| Nitrogen Recirculation Rate | 9 cfm | 7-11 cfm |
| Nitrogen Blower Outlet Pressure | 28-32 inches of H$_2$O | 26-34 inches of H$_2$O |
| Apparent Density of Spent Sorbent | 0.81-0.813 g/mL | 0.81-0.813 g/mL |
| Apparent Density of Mixed Spent/New Sorbent | (specific to test run) | 0.78-0.81 g/mL |

After a baseline run to startup and acclimate the overall system for comprehensive testing, two test runs were conducted with the parameters specified in the table below. For each run, the bead transfer rate going to and through the adsorber was about 34 lb/hr (or about 15.4 kg/hr). Addition of new sorbent in this second part comprehensive testing was about 43 grams per minute.

TABLE 14

| Run # | Total Sorbent Added [g] | Sorbent Addition Rate [g/min] | Bead Transfer Rate [lb/hr] | Location Where New Sorbent Added | Apparent Density [g/mL] | Percent Sorbent Added |
|---|---|---|---|---|---|---|
| Baseline | 0 | n/a | n/a | n/a | 0.81 | 0% |
| C-1 | 2,585.5 | 43.1 | 34 | Desorber Eductor | 0.780 | 14% |
| C-2 | 2,585.5 | 43.1 | 34 | Desorber Eductor | 0.780 | 14% |

In the baseline and startup run for comprehensive testing in FIG. 16A, side stream reactivation is first performed for the overall system. As can be seen, around a run time of about 12:35, the reduction efficiency begins to increase from about 60% toward >90% as new carbon beads were being added. Simultaneously, the adsorber outlet THC begins to decrease as adsorption of emissions begins to take place in the fluidized bed adsorber. Prior to the three comprehensive testing runs, the system was first brought up to environmental regulations of achieving >90% reduction efficiency.

Two comprehensive runs, C-1 and C-2 were conducted in the second part of this Example for environmental permit submission. For each comprehensive run, the sorbent apparent density was maintained at about 0.78 g/mL via side stream reactivation. Comprehensive run C-1 displayed in FIG. 16B achieved and maintained a target of >90% reduction efficiency over or throughout approximately 1 hour.

Comprehensive run C-2 displayed in FIG. 16C also achieved and maintained a target of >90% reduction efficiency over or throughout approximately 1 hour.

Based on the model in FIG. 11B, it is estimated that about 2% reactivation of sorbent per day is needed to maintain a consistent reduction efficiency of emissions at >90%. However, the full commercial system is designed to accommodate the capability to reactivate up to 6% sorbent per day on the basis of 10,000 lb. of sorbent (i.e., 600 lb/day or about 25 lb/hr).

Some subsequent terpene yield was also collected from the desorber of the pilot testing system in Example 9.

Example 9: Terpene Recovery

In this Example, operational conditions were adjusted in order to maximize terpene yield recovery from the desorber as contemplated by the present disclosure. Table 15 below provides the operational settings for several experimental runs.

TABLE 15

| Condition | Target | Range |
| --- | --- | --- |
| Process Exhaust Air at Adsorber Inlet | 300 cfm | 250-325 cfm |
| Adsorber Differential Pressure | 3.2 inches of H₂O | 2.5-4.5 inches of H₂O |
| Hopper Temperature | 180° F. | 115-144° F. |
| Adsorber Middle Trays | 155° F. | 137-158° F. |
| Adsorber Upper Trays | 130° F. | 126-142° F. |
| Adsorber & Desorber Eductors | 155° F. | — |
| Sorbent Carbon Bead Transfer Rate | 60-80 lb/hr | 50-90 lb/hr |
| Desorber Average Temperature | 400° F., 410° F., 430° F. | 320-530° F. |
| Condenser Chiller Temperature | 45° F., 34° F. | 40-50° F., 32-39° F. |
| Condenser Chiller Pressure | 43 psi | 41-45 psi |
| Airlift Fan Pressure (Adsorber and Desorber) | 20 inches of H₂O | 18-22 inches of H₂O |
| Nitrogen Makeup Pressure | 28-42 inches of H₂O | 25-45 inches of H₂O |
| Nitrogen Recirculation Rate | 8-9 cfm | 8-12 cfm |
| Nitrogen Blower Outlet Pressure | 30-32 inches of H₂O, 35-42 inches of H₂O | 28-34 inches of H₂O, 30-45 inches of H₂O |
| Apparent Density of Spent Sorbent | 0.81 g/mL | — |
| Apparent Density of Mixed Spent/New Sorbent | 0.780 g/mL | — |

A system as described in FIG. 1 was used for pilot operation to recover terpenes from process exhaust streams. In system, from a two-pass condenser water and terpenes samples were measured via a graduated cylinder. Such a condenser also was equipped with two sight glasses to observe condensed materials exiting the two-pass condenser. Unless samples were being collected, condensate was directed via a tube to a 10 gallon drum for collection and storage.

Several runs were conducted over the course of several months in a continuous process. It was observed that terpenes were not immediate to form, and the system, including sorbent beads, required a certain amount of warm-up time. It is theorized that the sorbent beads must cycle through several adsorption and desorption iterations before any terpenes that are formed or existing on the sorbent can be desorbed and collected. Further, it is theorized that the sorbent beads need to reach terpenes equilibrium prior to desorption of terpenes from the sorbent beads. Terpenes equilibrium is a point at which terpenes are equally adsorbed and then desorbed. Prior to terpenes equilibrium, terpenes are preferably adsorbed but not desorbed (i.e., released). Terpenes adsorption onto the sorbent is preferred when the sorbent is new (i.e., exothermic). Further, terpene loading onto the sorbent must reach a weight by weight loading ratio that provides the equilibrium working capacity at desorber temperature. The equilibrium point changes based on the temperature of the desorber temperature.

An experimental run was conducted to assess the effect of time and temperature on terpenes yields based on the following steps. The target apparent density was 0.780 g/mL, and new carbon beads were adjusted twice per day.

TABLE 16

| Step | Duration | Run Details | Chiller Temperature | Recirculation Flow |
| --- | --- | --- | --- | --- |
| 1 | 12 hr | Baseline. Desorber at 400° F. Bead transfer rate at 60-80 lb/hr. | 40-50° F. | 8.5 cfm |
| 2 | 14 hr | Baseline. Adjust chiller to 34° F. | 35° F. | 8.5 cfm |
| 3 | 5 hr | Baseline. Increase N₂ flow. | 35° F. | 12.0 cfm |
| 4 | 20 hr | Repeat baseline. Desorber at 400° F. | 34° F. | 9.0 cfm |
| 5 | 15 hr | Adjust desorber to 410° F. | 34° F. | 8.5 cfm |
| 6 | 1 hr | Temperature excursion up to 437° F. | 34° F. | 8.5 cfm |
| 7 | 12 hr | Adjust desorber to 430° F. | 34° F. | 8.5 cfm |
| 8 | 22 hr | Adjust desorber to 400° F. | 34° F. | 8.0 cfm |
| 9 | 9 hr | Shutdown | 34° F. | 8.0 cfm |

Observation and measurements were taken at the two condenser sight glasses. Water and terpenes were collected via a graduated cylinder. Terpene production was calculated for a full commercial scale system, given that the pilot system is about 1/1,000 the size, and given that a fully commercial plant is anticipated to operate approximate 5,815 hours per year.

FIG. 17 shows the effect of time and sorbent temperature on carbon temperature, percent reduction efficiency and apparent density.

FIG. 18A shows the terpenes yield with time based on the above-specified run. As can be seen in FIG. 18A, when the desorber is operating at about 400-410° F., there is consistent terpene yield of about 40,000 to about 70,000 gallons per year per condenser pass or about 80,000 to about 100,000 total gallons per year. However, when the desorber temperature is increased to about >430° F., terpene yield across both sight glass #1 and sight glass #2 decreased.

FIG. 18B also provides another instance of terpene yield for an experimental run conducted earlier in time than the trial run corresponding to FIG. 18A. By totaling the amount collected at sight glass #1 with the amount collected at sight glass #2, it was possible to extrapolate the pilot runs of terpene yields for annualized terpene yield of a full scale commercial system. This full commercial system and terpenes yields is shown in FIG. 19.

Various experimental runs were further analyzed for specific terpene yields. In a first series, the breakdown between alpha-pinene or beta-pinene versus other terpene products and fatty acids is shown in FIGS. 20A, 20B, and 20C where the desorber is respectively operating at about 425° F., between about 450-600° F., and at about 500° F. Together, FIGS. 20A, 20B, and 20C indicate that during initial desorption, there was lower alpha-pinene and beta-pinene content. However, with later desorption, more alpha- and beta-pinene was present. It is theorized that sorbent beads must undergo several iterations of adsorbing and desorbing before reaching terpenes equilibrium where terpenes will begin to desorb. During this time, it is theorized that exposure to repeated heating cycles can cause thermal deterioration.

FIG. 21 represents a second series of terpene analysis. Again, there was lower alpha- and beta-pinene content during initial desorption, but the alpha- and beta-pinene content increased with later desorption.

FIG. 22 represents terpenes analysis corresponding to a third series as discussed above in Table 16. Here, the pilot system of the present disclosure had a period of time to enter later desorption. FIG. 22 shows alpha-pinene content ranging from approximately 31% to about 35% and beta-pinene content range from approximately 13% to about 17%. Lower value terpenes, such as o-cymene and camphene are a smaller percentage of the total terpene yield as compared to the first series in FIGS. 20A, 20B, and 20C or the second series in FIG. 21.

In addition to terpenes, some carboxylic acid salts were also collected and identified. IR and x-ray analysis indicated collected solid material contained a primary alcohol functional group with small C—H bands.

Based on terpene yields produced, this Example suggests that operating the desorber at a temperature range of about 390° F. to about 430° F. provides desirable terpene desorption. Further, alpha-pinene and/or beta-pinene yield is higher after an initial terpene equilibrium is reached in the desorber. This suggests that longer term operation can yield terpene solutions with approximately 50% or more alpha-pinene and/or beta-pinene.

Additionally, operation measurements were taken of the estimated % reduction efficiency, sorbent (i.e., carbon bead) temperature in a downstream desorber, and sorbent apparent density with time. Side stream reactivation was not performed in these measurements. A plot of the operational measurements is provided at FIG. 23.

As can be seen in FIG. 23, sorbent apparent density increases with time. Decreases in the apparent density curve indicate when spent sorbent was replaced with fresh carbon, which simulates side stream reactivation. As apparent density increases and approaches about 0.8 g/mL, there was generally a corresponding decrease in % reduction efficiency. This supports the theory that as apparent density increases, and sorbent beads begin to adsorb less emissions materials and particulates, the ability for emissions control decreases.

Sorbent temperature was varied between about 300° F. to about 600° F. At higher temperatures of about 600° F., it was discovered that no terpenes were desorbed in a downstream desorber. This supports the theory that higher sorbet temperatures of about 600° F. are not required to desorb spent sorbent and simultaneously recover terpene products. It was theorized that higher desorber temperatures of 600° F. chemical alter would-be terpene products into other non-terpene compounds, causing polymerization and/or thermal degradation. Instead, the desorber can be operated at lower temperatures around 400° F. to desorb spent carbon beads while achieving terpene products from desorbed material.

In addition to the various embodiments depicted and claimed, the disclosed subject matter is also directed to other embodiments having other combinations of the features disclosed and claimed herein. As such, the particular features presented herein can be combined with each other in other manners within the scope of the disclosed subject matter such that the disclosed subject matter includes any suitable combination of the features disclosed herein. The foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the systems and methods of the disclosed subject matter without departing from the spirit or scope of the disclosed subject matter. Thus, it is intended that the disclosed subject matter include modifications and variations that are within the scope of the appended claims and their equivalents.

Various patents and patent applications are cited herein, the contents of which are hereby incorporated by reference herein in their entireties.

What is claimed is:

1. A method for controlling emissions, comprising:
obtaining an exhaust stream from a drying process, the exhaust stream comprising one or more emissions selected from the group consisting of terpenes, formaldehyde, methanol, acetic acid, acetone, and fatty acids;
flowing the exhaust stream through a fluidized bed of sorbent, wherein the sorbent is configured to capture any one or more of the emissions from the exhaust stream at a first temperature;
heating the sorbent at a second temperature sufficient to release any of the captured exhaust compounds from the sorbent to provide a gaseous stream comprising the released exhaust compounds and to provide a partially regenerated sorbent; and
heating the partially regenerated sorbent at a third temperature sufficient to thermally reactivate the partially regenerated sorbent, providing reactivated sorbent; and
returning the reactivated sorbent to the fluidized bed of sorbent.

2. The method of claim 1, wherein the first temperature is about 130° F. to about 220° F., the second temperature is about 302° F. to about 450° F., and the third temperature is about 1,000° F. to about 1,600° F.

3. The method of claim 1, wherein any one or more of the emissions are captured from the exhaust stream by adsorption, absorption or both.

4. The method of claim 1, wherein the terpene comprises alpha-pinene, beta- pinene, or a combination thereof.

5. The method of claim 1, further the sorbent is heated at the first temperature for about 30 minutes to less than about 2 hours.

6. The method of claim 1, wherein the gaseous stream comprising the released exhaust compounds further comprises nitrogen, steam, or both.

7. The method of claim 1, wherein the gaseous stream comprises at least 95 wt % nitrogen.

8. The method of claim 1, wherein the exhaust stream further comprises phenol, acrolein, acetaldehyde, propionaldehyde, or combinations thereof.

9. The method of claim 1, wherein the sorbent comprises carbon, activated carbon, zeolite, silica, fumed silica, silica gel, purolytic synthetic material, polymeric material, activated alumina, bauxite, amorphous clay, crystalline clay, mixed layer clays, iron oxide, magnesium oxide, magnesium silicate, molecular sieves, zirconium oxide, or any combinations thereof.

10. The method of claim 1, wherein the sorbent comprises one or more beads or particles, each having a pore size less than 2 nm, a pore size from 2 nm to 50 nm, or a pore size greater than 50 nm.

11. The method of claim 1, wherein the sorbent comprises activated carbon, bead activated carbon (BAC), or a combination thereof.

12. The method of claim 11, wherein the sorbent is activated carbon in the form of carbon fiber, chop, felt, yarn, powder, granular, pellets, or embedded in a cloth.

13. The method of claim 11, wherein the sorbent comprises bead activated carbon (BAC) having an average diameter of about 10 microns to about 800 microns.

14. A method for controlling emissions, comprising:

obtaining a process exhaust stream comprising one or more VOCs, HAPs, or combinations thereof;

flowing the process exhaust stream through a fluidized bed of sorbent having a first temperature of about 130° F. to about 220° F., the sorbent configured to capture the one or more VOCs, HAPs, or combinations thereof from the process exhaust stream at the first temperature;

heating the sorbent having the captured one or more VOCs, HAPs, or combinations thereof at a second temperature of about 302° F. to about 450° F. to release the captured one or more VOCs, HAPs, or combinations thereof from the sorbent to provide a gaseous stream comprising the released one or more VOCs, HAPs, or combinations thereof;

heating a side stream from the fluidized bed at a third temperature of about 1,000° F. to about 1,600° F. to thermally reactivate the sorbent; and returning the reactivated sorbent to the fluidized bed.

15. The method of claim 14, wherein the process exhaust stream is derived from drying any one or more woods comprising cedars, firs, spruces, pines, larch, hemlock, juniper, redwood, yew, birches, elms, maples, eucalyptus, alder, ash, aspen, oak, poplar, bamboo, basswood, beech, cottonwood, willow, and combinations thereof.

16. The method of claim 14, further comprising chemically treating the side stream from the fluidized bed using steam, super critical carbon dioxide, caustic solution, or any combination thereof.

17. The method of claim 14, wherein the process exhaust stream further comprises air, steam, particulate matter, carbon monoxide, carbon dioxide, NOR, inorganic compounds, or combinations thereof.

18. The method of claim 14, wherein the HAPs are selected from the group consisting of formaldehyde, methanol, phenol, acrolein, acetaldehyde, and propionaldehyde.

19. A method for controlling emissions, comprising:

contacting a process exhaust stream comprising one or more VOCs, HAPs, or combinations thereof with a sorbent at a first temperature, the sorbent configured to capture the one or more VOCs, HAPs, or combinations thereof from the process exhaust stream at the first temperature;

thermally treating the sorbent having the captured VOCs, HAPs, or combinations thereof at a second temperature, the second temperature sufficient to release the captured VOCs, HAPs, or combinations thereof from the sorbent to provide a gaseous stream comprising the released VOCs, HAPs, or combinations thereof and treated sorbent;

thermally reactivating a portion of the treated sorbent at a third temperature sufficient to thermally reactivate the sorbent, the third temperature at least 500° C. greater than the second temperature;

combining the treated sorbent and the reactivated sorbent;

contacting the combined treated sorbent and the reactivated sorbent with the process exhaust stream; and collecting the released VOCs, HAPs, or combinations thereof from the gaseous stream, wherein the gaseous stream comprises at least 90% of the VOCs, HAPs, or combinations thereof from the process exhaust stream.

20. The method of claim 19, further comprising chemically treating the sorbent using steam, super critical carbon dioxide, caustic solution, or any combination thereof while thermally reactivating the sorbent at the third temperature.

\* \* \* \* \*